(12) United States Patent
Shutty et al.

(10) Patent No.: US 11,966,817 B1
(45) Date of Patent: Apr. 23, 2024

(54) TELEPORTING MAGIC STATES FROM A COLOR CODE TO A SURFACE CODE AND DECODING A MERGED SURFACE-COLOR CODE

(71) Applicant: Amazon Technologies, Inc., Seattle, WA (US)

(72) Inventors: Noah John Shutty, Redwood City, CA (US); Christopher Chamberland, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 17/694,399

(22) Filed: Mar. 14, 2022

Related U.S. Application Data

(60) Provisional application No. 63/299,854, filed on Jan. 14, 2022.

(51) Int. Cl.
  *G06N 10/70* (2022.01)
  *G06N 10/20* (2022.01)
  *G06N 10/60* (2022.01)

(52) U.S. Cl.
  CPC ............. *G06N 10/70* (2022.01); *G06N 10/20* (2022.01); *G06N 10/60* (2022.01)

(58) Field of Classification Search
  CPC ......... G06N 10/60; G06N 10/70; G06N 10/20
  See application file for complete search history.

(56) References Cited

U.S. PATENT DOCUMENTS

| | | | | |
|---|---|---|---|---|
| 10,248,491 | B1* | 4/2019 | Zeng | G06N 10/00 |
| 10,352,992 | B1* | 7/2019 | Zeng | G06N 10/00 |
| 11,748,652 | B1* | 9/2023 | Kubica | G06N 10/70 |
| | | | | 714/785 |
| 2019/0044543 | A1* | 2/2019 | Chamberland | G06N 10/00 |
| 2020/0348579 | A1* | 11/2020 | Heuck | G02F 3/00 |
| 2021/0374588 | A1* | 12/2021 | Gidney | G06N 10/70 |
| 2021/0398009 | A1* | 12/2021 | Vuletic | G06N 10/00 |

(Continued)

OTHER PUBLICATIONS

T. J. Yoder and I. H. Kim, :The surface code with a twist, Quantum vol. 1, p. 2 (2017), arXiv:1612.04795v2, pp. 1-19.

(Continued)

*Primary Examiner* — Guy J Lamarre
(74) *Attorney, Agent, or Firm* — Alexander A. Knapp; Kowert, Hood, Munyon, Rankin & Goetzel, P.C.

(57) ABSTRACT

A technique for merging, via lattice surgery, a color code and a surface code, and subsequentially decoding one or more rounds of stabilizer measurements of the merged code is disclosed. Such a technique can be applied to bottom-up fault-tolerant magic state preparation protocol such that an encoded magic state can be teleported from a color code to a surface code. Decoding the stabilizer measurements of the merged code requires a decoding algorithm specific to the merged code in which error correction involving qubits at the border between the surface and color code portions of the merged code is performed. Error correction involving qubits within the surface code portion and within color code portion, respectively, may additionally be performed. In some cases, the magic state is prepared in a color code via a technique for encoding a Clifford circuit design problem as an SMT decision problem.

20 Claims, 20 Drawing Sheets

(56) References Cited

U.S. PATENT DOCUMENTS

| | | | | |
|---|---|---|---|---|
| 2022/0222567 A1* | 7/2022 | Reagor | ................ | G01B 9/0203 |
| 2023/0071000 A1* | 3/2023 | Higgott | .................. | G06N 10/00 |
| 2023/0162081 A1* | 5/2023 | Verresen | ................ | G06N 10/20 |
| | | | | 324/300 |

OTHER PUBLICATIONS

D. Litinski and F. v. Oppen, Lattice Surgery with a Twist: Simplifying Clifford Gates of Surface Codes, Quantum vol. 2, p. 62 (2018), arXiv:1709.02318v2, pp. 1-16.

C. Chamberland, A. Kubica, T. J. Yoder, and G. Zhu, "Triangular color codes on trivalent graphs with flag qubits", New Journal of Physics, vol. 22, 023019, (2020), pp. 1-24.

P. Prabhu and B. W. Reichardt, "Fault-tolerant syndrome extractionand cat state preparation with fewer qubits", (2021). 2108.02184 [quant-ph], arxiv.org/abs/2108.02184, pp. 1-10.

A. M. Steane, "Overhead and noise threshold of fault-tolerant quantum error correction", Phys. Rev. A 68, 042322 (2003), arxiv.org/abs/quant-ph/0207119v4, pp. 1-21.

E. Knill, "Quantum computing with realistically noisy devices", Nature Publishing Group, vol. 434, pp. 39-44 (2005).

P. Aliferis, D. Gottesman, and J. Preskill, "Quantum accuracy threshold for concatenated distance-3 codes", Quant. Inf. Comput. 6, 97 (2006) arxiv.org/pdf/quant-ph/0504218.pdf, pp. 1-58.

R. Chao and B. W. Reichardt, "Quantum error correction with only two extra qubits", Phys. Rev. Lett. 121, 050502 (2018), preprint: https://arxiv.org/pdf/1705.02329.pdf, pp. 1-9.

R. Chao and B. W. Reichardt, "Fault-tolerant quantum computation with few qubits", npj Quantum Information 4, 42 (2018), pp. 1-8.

C. Chamberland and M. E. Beverland, "Flag fault-tolerant error correction with arbitrary distance codes", Quantum vol. 2, p. 53, 2018, arXiv:1708.02246v3, pp. 1-29.

T. Tansuwannont, C. Chamberland, and D. Leung, "Flag fault-tolerant error correction, measurement, and quantum computation for cyclic Calderbank-Shor-Steane codes", Phys. Rev. A 101, 012342 (2020), arXiv:1803.09758v3, pp. 1-17.

B. W. Reichardt, "Fault-tolerant quantum error correction for steane's seven-qubit color code with few or no extra qubits," Quantum Science and Technology 6, 015007 (2020), arXiv:1804.06995v1, pp. 1-11.

C. Chamberland, G. Zhu, T. J. Yoder, J. B. Hertzberg, and A. W. Cross, "Topological and subsystem codes on low-degree graphs with flag qubits," Published by the American Physical Society, Phys. Rev. X 10, 011022 (2020), pp. 1-19.

R. Chao and B.W. Reichardt, "Flag fault-tolerant error correction for any stabilizer code", Published by the American Physical Society, PRX Quantum 1, 010302 (2020), pp. 1-6.

T. Tansuwannont and D. Leung, "Fault-tolerant quantum error correction using error weight parities," arXiv e-prints , arXiv:2006.03068 (2020), arXiv:2006.03068 [quant-ph], pp. 1-13.

T. Tansuwannont and D. Leung, "Achieving fault tolerance on capped color codes with few ancillas", arXiv e-prints , arXiv:2106.02649 (2021), arXiv:2106.02649 [quant-ph], pp. 1-39.

C. Chamberland and A. W. Cross, "Fault-tolerant magic state preparation with flag qubits", Quantum 3, 143 (2019), arXiv e-prints arXiv:1811.00566v2 , pp. 1-26.

C. Chamberland and K. Noh, "Very low overhead fault-tolerant magic state preparation using redundant ancilla encoding and flag qubits," npj Quantum Information 6, 1 (2020), arXiv preprint arXiv:2003.03049, ages 1-27.

L. De Moura and N. Bjørner, "Z3: An efficient smt solver," in International conference on Tools and Algorithms for the Construction and Analysis of Systems (Springer, 2008) pp. 337-340.

H. Bombin and M. A. Martin-Delgado, "Topological quantum distillation," Phys. Rev. Lett. 97, 180501 (2006), arXiv preprint arXiv:quant-ph/0605138, pp. 1-4.

H. Bomb'n, "Gauge color codes: optimal transversal gates and gauge fixing in topological stabilizer codes," New Journal of Physics 17, 083002, IOP Publishing Ltd (2015), pp. 1-14.

A. Kubica and M. E. Beverland, "Universal transversal gates with color codes: A simplified approach," Phys. Rev. A 91, 032330 (2015), arXiv preprint: arxiv.org/abs/1410.0069, pp. 1-13.

F. Thomsen, M. S. Kesselring, S. D. Bartlett, and B. J. Brown, "Low-overhead quantum computing with the color code," (2022), 2201.07806 [quant-ph], pp. 1-8.

A. Y. Kitaev, "Fault-tolerant quantum computation by anyons," Annals of Physics vol. 303, Issue 1, (2003), arXiv preprint: arxiv.org/pdf/quant-ph/9707021.pdf, pp. 1-27.

S. B. Bravyi and A. Y. Kitaev, "Quantum codes on a lattice with boundary," arXiv e-prints: arxiv.org/pdf/quant-ph/9811052 (1998), pp. 1-6.

E. Dennis, A. Kitaev, A. Landahl, and J. Preskill, "Topological quantum memory," Journal of Mathematical Physics 43, 4452, arXiv e-prints: arXiv:quant-ph/0110143v1 (2002), pp. 1-39.

A. G. Fowler, M. Mariantoni, J. M. Martinis, and A. N. Cleland, "Surface codes: Towards practical large-scale quantum computation," Phys. Rev. A 86, 032324 (American Physical Society 2012), pp. 1-48.

J. P. B. Ataides, D. K. Tuckett, S. D. Bartlett, S. T. Flammia, and B. J. Brown, "The xzzx surface code," Nature communications 12, 1 (2021), pp. 1-13.

C. Chamberland, K. Noh, P. Arrangoiz-Arriola, E. T. Campbell, C. T. Hann, J. Iverson, H. Putterman, T. C. Bohdanowicz, S. T. Flammia, A. Keller, G. Refael, J. Preskill, L. Jiang, A. H. Safavi-Naeini, O. Painter, and F. G. S. L. Brandao, "Building a fault-tolerant quantum computer using concatenated cat codes," arXiv e-prints (2020), 2012.04108 [quant-ph], pp. 1-117.

H. Bombin, C. Dawson, R. V. Mishmash, N. Nickerson, F. Pastawski, and S. Roberts, "Logical blocks for fault-tolerant topological quantum computation," (2021), 2112.12160 [quantph], pp. 1-34.

C. Barrett and C. Tinelli, "Satisfiability Modulo Theories," in Handbook of model checking (Springer, 2018) pp. 1-41.

J. Backes, S. Bayless, B. Cook, C. Dodge, A. Gacek, A. J. Hu, T. Kahsai, B. Kocik, E. Kotelnikov, J. Kukovec, et al., "Reachability Analysis for AWS-Based Networks," in International Conference on Computer Aided Verification (Springer, 2019) pp. 1-11.

L. De Moura and N. Bjørner, "Satisfiability modulo theories: introduction and applications," Communications of the ACM vol. 54, Issue 9, pp. 69-77 (2011).

T. Weber, S. Conchon, D. D'eharbe, M. Heizmann, A. Niemetz, and G. Reger, "The SMT competition 2015-2018," Journal on Satisfiability, Boolean Modeling, and Computation 11 (2019), pp. 1-39.

T. Balyo, M. Heule, and M. Jarvisalo, "Sat competition 2016: Recent developments," in Proceedings of the AAAI Conference on Artificial Intelligence, vol. 31 (2017), pp. 1-3.

B. Tan and J. Cong, Optimal layout synthesis for quantum computing, in Proceedings of the 39th International Conference on Computer-Aided Design, ICCAD '20 (Association for Computing Machinery, New York, NY, USA, 2020), pp. 1-9.

J. Ding and S. Yamashita, "Exact synthesis of nearest neighbor compliant quantum circuits in 2-d architecture and its application to large-scale circuits," IEEE Transactions on Computer-Aided Design of Integrated Circuits and Systems 39, 1045 (2019), pp. 1-4.

P. Murali, A. Javadi-Abhari, F. T. Chong, and M. Martonosi, "Formal constraint-based compilation for noisy intermediate-scale quantum systems," Elsevier, Microprocessors and Microsystems 66, 102 (2019), arXiv preprint: arXiv:1903.03276, pp. 1-23.

P. Murali, J. M. Baker, A. Javadi-Abhari, F. T. Chong, and M. Martonosi, "Noise-Adaptive Compiler Mappings for Noisy Intermediate-Scale Quantum Computers," in Proceedings of the Twenty-Fourth International Conference on Architectural Support for Programming Languages and Operating Systems (2019), pp. 1015-1029.

H. P. Nautrup, N. Friis, and H. J. Briegel, "Fault-tolerant interface between quantum memories and quantum processors," Nature communications 8, 1 (2017), pp. 1-8.

S. Bravyi and A. Kitaev, "Universal quantum computation with ideal clifford gates and noisy ancillas," Phys. Rev. A 71, 022316, (2005 The American Physical Society), pp. 1-14.

(56) References Cited

OTHER PUBLICATIONS

A. Paetznick and B. W. Reichardt, "Universal Fault-Tolerant Quantum Computation with Only Transversal Gates and Error Correction", Phys. Rev. Lett. 111, 090505 (2013), arXiv preprint: arxiv.org/abs/1304.3709, pp. 1-5.

J. T. Anderson, G. Duclos-Cianci, and D. Poulin, "Fault-Tolerant Conversion between the Steane and Reed-Muller Quantum Codes," Phys. Rev. Lett. 113, 080501 (2014), arXiv preprint: arXiv:1403.2734v1, pp. 1-6.

H. Bombin, "Dimensional jump in quantum error correction," New Journal of Physics, 18, IOP Institute of Physics, 043038 (2016 6 IOP Publishing Ltd), pp. 1-13.

D. Litinski, "Magic State Distillation: Not as Costly as You Think," Quantum vol. 3, p. 205 (2019), arXiv preprint: arXiv:190.06903v3, pp. 1-22.

M. E. Beverland, A. Kubica, and K. M. Svore, "Cost of Universality: A Comparative Study of the Overhead of State Distillation and Code Switching with Color Codes," PRX Quantum 2, 020341, Published by the American Physical Society (2021), pp. 1-46.

D. Litinski, "A Game of Surface Codes: Large-Scale Quantum Computing with Lattice Surgery," Quantum vol. 3, 128 (2019), arXiv:1808.02892v3, pp. 1-37.

A. G. Fowler and C. Gidney, "Low overhead quantum computation using lattice surgery", arXiv e-prints (2018), 1808.06709 [quant-ph], pp. 1-15.

C. Chamberland and E. T. Campbell, "Universal quantum computing with twist-free and temporally encoded lattice surgery," arXiv e-prints (2021), 2109.02746 [quant-ph], pp. 1-23.

C. Chamberland and E. T. Campbell, "A circuit-level protocol and analysis for twist-based lattice surgery," arXiv e-prints (2022), 2201.05678 [quant-ph], pp. 1-12.

A. Kubica and N. Delfosse, "Efficient color code decoders in $d \geq 2$ dimensions from toric code decoders," arXiv e-prints (2019), 1905.07393 [quant-ph], pp. 1-28.

J. Edmonds, "Paths, trees, and flowers," Canadian Journal of mathematics 17, pp. 449-467 (1965).

V. Strassen, "Gaussian elimination is not optimal," Numerische mathematik, vol. 13, issue 4, pp. 354-356 (1969).

S. Bravyi and D. Gosset, "Improved Classical Simulation of Quantum Circuits Dominated by Clifford Gates," Phys. Rev. Lett. 116, 250501 (2016 American Physical Society, pp. 1-5).

U.S. Appl. No. 17/694,381, filed Mar. 14, 2022, Noah Jon Shutty, et al.

\* cited by examiner

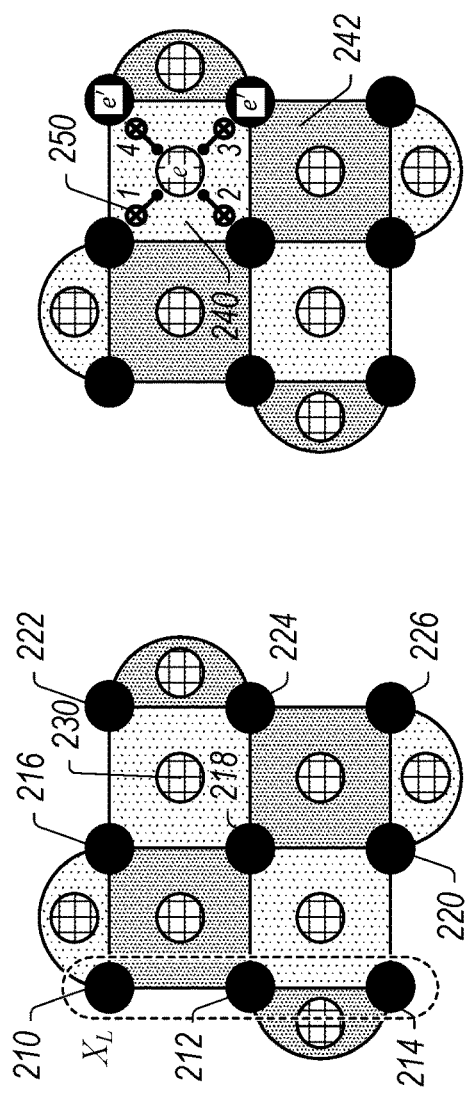
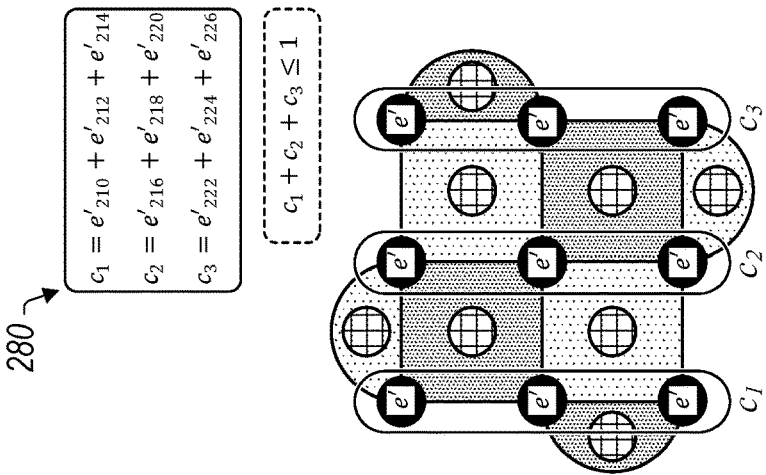
FIG. 2C
FIG. 2B
FIG. 2A

Bottom-up fault-tolerant magic state preparation protocol 400

Algorithm 1 Produces $Z$ and $X$ corrections $\mathcal{E}'_Z, \mathcal{E}'_X$ given $X$ and $Z$ syndromes $S_X(\mathcal{E}_Z), S_Z(\mathcal{E}_X)$ 1: for $P \in \{X, Z\}$ do
2:     Let $P' \in \{X, Z\}, P' \neq P$
3:     $\mathcal{E}'_{P'} \leftarrow \emptyset$, Initialize empty partial correction
4:     Let $A = S_P(\mathcal{E}'_{P'} \mathcal{E}_{P'})$
5:     for $C \in \{L, D, M\}$ do
6:         Let $\{C_1, C_2\} = \{L, D, M\} \setminus \{C\}$
7:         $A_C \leftarrow A \cap \mathcal{L}_{C_1 C_2}^{(MC,P)*}$
8:         $V_C \leftarrow A_C \cup \{v_{C_1}^{(MC,P)}, v_{C_2}^{(MC,P)}\}$
9:         $w_C \leftarrow \emptyset$
10:         for $(u, v) \in V_C \times V_C$ do
11:             $\Gamma_{u,v,C} \leftarrow \text{MinWeightLegalPath}\left(u, v, \mathcal{L}_{C_1 C_2}^{(MC,P)*}\right)$
12:             if $\Gamma_{u,v,C} =$ then
13:                 $w_C(u, v) \leftarrow \infty$
14:             else
15:                 $w_C(u, v) \leftarrow \sum_{e \in \Gamma_{u,v,C}} \text{wt}(e)$
16:         $G_C \leftarrow (V_C, E_C, w_C)$, Initialize Weighted $C$-Matching Graph
17:         $M_C$ min. weight $A_C$-PM of $G_C$ using Algorithm 2
18:         $\Gamma_C \leftarrow \bigoplus_{(u,v) \in M_C} \Gamma_{u,v,C}$
19:     $\Gamma_T \leftarrow \Gamma_L \cup \Gamma_D \cup \Gamma_M$
20:     for $BCC\ \theta = (\{v_i\}, \{\chi_i\})$ do
21:         $\Gamma_\theta \leftarrow \cup_{i=1}^{\ell-1} \Gamma_{v_i, v_{i+1}, \chi_i}$
22:         if $v_\ell \in \{v_D^{(MC,P)}, v_L^{(MC,P)}\}$ then
23:             Set color($\theta$) = $M$
24:         else
25:             Set color($\theta$) = $L$
26:         for $u \in \Gamma_\theta|_{\text{color}(\theta)}$ do
27:             $\mathcal{E}'_{P'} \leftarrow \mathcal{E}'_{P'} \oplus \text{Lift}(u, \Gamma_\theta)$
28:         if color($\theta$) = $L$ then
29:             $\mathcal{E}'_{P'} \leftarrow \mathcal{E}'_{P'} \oplus \text{SCLightGrayLift}(\Gamma_\theta)$
30:         Set $\Gamma_T \leftarrow \Gamma_T \oplus \Gamma_\theta$
31:     for $u \in \Gamma_T|_D$ do
32:         $\mathcal{E}'_{P'} \leftarrow \mathcal{E}'_{P'} \oplus \text{Lift}(u, \Gamma_T)$
33:     $A \leftarrow S_P(\mathcal{E}'_{P'} \mathcal{E}_{P'})$
34:     $\mathcal{E}'_{P'} \leftarrow \text{SurfaceCodeCorrecion}(A)$ Quantum color code stage *1400* (lines 1–30)

Quantum surface code stage *1402* (lines 31–34)

*FIG. 14*

| Algorithm 2 Produces a minimum weight $A$-perfect matching $M \subset E$ of a weighted graph $G = (V, E)$ with $A \subset V$ and edge weights $w(u, v)$ for $(u, v) \in E$ |
|---|
| 1: Set $w(u_1, u_2) = \infty \Leftrightarrow (u_1, u_2) \notin E$ |
| 2: for $v \in A$ do |
| 3:     $q(v) \leftarrow \min_{u \in V \setminus A} w(v, u)$ |
| 4:     $n(v) \leftarrow \mathrm{argmin}_{u \in V \setminus A} w(v, u)$ |
| 5: for $(u_1, u_2) \in E$ do |
| 6:     $L(u_1, u_2) \leftarrow 0$ |
| 7:     $w'(u_1, u_2) \leftarrow q(u_1) + q(u_2)$ |
| 8:     if $w'(u_1, u_2) \leq w(u_1, u_2)$ then |
| 9:        $L(u_1, u_2) \leftarrow 1$ |
| 10:       $w(u_1, u_2) \leftarrow w'(u_1, u_2)$ |
| 11: $G' = (V', E') \leftarrow G \setminus (V \setminus A)$ |
| 12: if $\lvert V' \rvert$ is odd then |
| 13:     $G' \leftarrow G' \cup \{v_0\}$ |
| 14:     for $u \in A$ do |
| 15:        $G' \leftarrow G' + (u, v_0)$ |
| 16:        $w(u, v_0) \leftarrow q(u)$ |
| 17: Find a min. weight PM $M' \subset E'$ |
| 18: $M \leftarrow \emptyset$ |
| 19: for $(u_1, u_2) \in M'$ do |
| 20:     if $v_0 \in \{u_1, u_2\}$ then |
| 21:        Let $u \in \{u_1, u_2\} \setminus \{v_0\}$ |
| 22:        $M \leftarrow M \cup (u, n(u))$ |
| 23:     else |
| 24:        if $L(u_1, u_2) \neq \bot$ then |
| 25:           $M \leftarrow M \cup (u_1, n(u_1))$ |
| 26:           $M \leftarrow M \cup (u_2, n(u_2))$ |
| 27:        else |
| 28:           $M \leftarrow M \cup (u_1, u_2)$ |

*FIG. 15*

TELEPORTING MAGIC STATES FROM A COLOR CODE TO A SURFACE CODE AND DECODING A MERGED SURFACE-COLOR CODE

RELATED APPLICATION

This application claims benefit of priority to U.S. Provisional Application Ser. No. 63/299,854, entitled "Finding Clifford Circuit Solutions Using SMT Solvers, Teleporting Magic States from a Color Code to a Surface Code, and Decoding a Merged Surface-Color Code," filed Jan. 14, 2022, and which is incorporated herein by reference in its entirety.

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects like photons, molecules, atoms, and electrons.

A quantum computer is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply a qubit, is a list of two complex numbers whose squares sum up to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g., a traditional zero or one bit) and the qubit is that a probabilistic bit represents a lack of information about a two-level classical system, while a qubit contains maximal information about a two-level quantum system.

Quantum computers are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

A quantum algorithm is a reversible transformation acting on qubits in a desired and controlled way, followed by a measurement on one or multiple qubits. For example, if a system has two qubits, a transformation may modify four numbers; with three qubits this becomes eight numbers, and so on. As such, a quantum algorithm acts on a list of numbers exponentially large as dictated by the number of qubits. To implement a transform, the transform may be decomposed into small operations acting on a single qubit, or a set of qubits, as an example. Such small operations may be called quantum gates and the arrangement of the gates to implement a transformation may form a quantum circuit.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms.

For some types of quantum computations, such as fault tolerant computation of large-scale quantum algorithms, overhead costs for performing such quantum computations may be high. For example, for types of quantum gates that are not naturally fault tolerant, the quantum gates may be encoded in error correcting code, such as a surface code. However, this may add to the overhead number of qubits required to implement the large-scale quantum algorithms. Also, performing successive quantum gates, measurement of quantum circuits, etc. may introduce probabilities of errors in the quantum circuits and/or measured results of the quantum circuits. In some situations, error rates for a quantum algorithm may be reduced by increasing a number of times measurements are repeated when executing the quantum algorithm. However, this may increase a run-time for executing the quantum algorithm. Thus, overhead may be evaluated as a space-time cost that takes into account both run-times and qubit costs to achieve results having at least a threshold level of certainty (e.g., probability of error less than a threshold amount).

BRIEF DESCRIPTION OF THE DRAWINGS

FIG. 2A illustrates a 3×3 quantum surface code with a logical operator $X_L$, according to some embodiments.

FIG. 2B illustrates a 3×3 quantum surface code with a given error after a given time step such that the error is propagated in parallel with the logical operator $X_L$ described in FIG. 2A, according to some embodiments.

FIG. 2C illustrates how error arising from a given fault in a 3×3 quantum surface code described in FIG. 2B may be symbolically propagated when one or more given fault propagation constraints are imposed, according to some embodiments.

FIG. 14 illustrates an algorithm for decoding one or more rounds of stabilizer measurements of a merged surface and color quantum code, according to some embodiments.

FIG. 15 illustrates a 'Lift' subroutine of the algorithm described in FIG. 14, pertaining to minimum-weight perfect-matching done in a quantum color code, according to some embodiments.

Figure 1A:
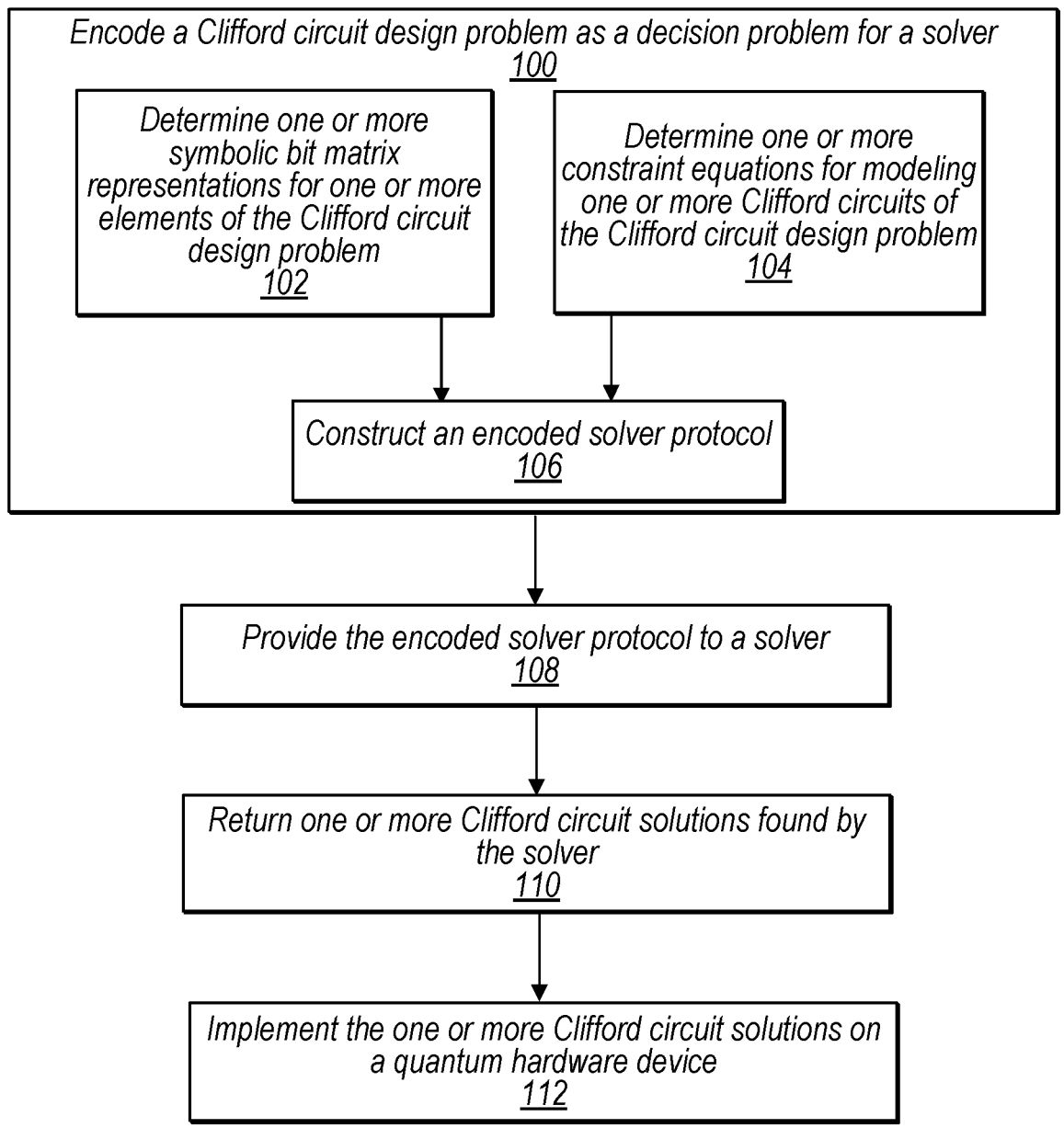
FIG. 1A is a flow diagram illustrating a process of encoding a Clifford circuit design problem as a decision problem for a solver via constructing an encoded solver protocol for the decision problem, providing the encoded solver protocol to a solver, and implementing one or more Clifford circuit solutions of the solver on a quantum hardware device, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for finding and implementing Clifford circuit solutions using a solver, such as a Satisfiability Modulo Theories (SMT) solver, teleporting magic states from Clifford circuit solutions in a quantum color code to a quantum surface code, and decoding the resulting merged surface-color code, according to various embodiments.

Many problems in quantum computing require the construction of Clifford circuits with some targeted properties. For instance, in topological quantum error correction, multi-qubit gates used to measure the stabilizers of a code are implemented in a particular order to prevent errors from propagating in a non-fault-tolerant way. More generally, designing fault-tolerant circuits for syndrome extraction often requires the use of extra ancilla qubits whose roles are to detect and/or prevent the propagation of a small number of faults to large number of data qubit errors. For instance, flag qubits could be used to fault-tolerantly prepare high-fidelity magic states without the use of top-down magic state distillation. In many cases, such fault-tolerant circuits are constructed from either first principles or brute force numerical methods, which are time consuming and/or costly to implement.

An approach to protecting logical information afflicted by noise during a computation is to use a two-dimensional topological quantum error-correcting code, such as the quantum surface code. Currently, the quantum surface code combined with magic state distillation and lattice surgery is a leading candidate for performing universal quantum computation. In particular, the quantum surface code has several advantages over the quantum color code. Firstly, the quantum surface code has a higher noise threshold than the quantum color code. Furthermore, the quantum surface code can achieve a targeted logical error rate using fewer qubits than the quantum color code for noise rates expected in near term architectures. Variations of the quantum surface code, such as the XZZX code, may provide some advantages over the quantum surface code in settings where the underlying noise model exhibits some bias. However, the quantum surface code still provides the lowest overhead cost to achieve a given logical error rate for most studied realistic noise models.

Magic state distillation, however, may require that states are distilled over many rounds of magic state distillation in order to reach a targeted logical failure rate and to generate high fidelity magic states. In some embodiments, this limitation is overcome by using a bottom-up fault-tolerant magic state preparation protocol in the quantum color code, a code in which the logical Hadamard gate is transversal, along with other Clifford operations. One or more constraints (or properties) of Clifford circuits are formulated such that they can be provided to a solver such as an SMT solver. In some embodiments, such techniques are used to construct fault-tolerant circuits for preparing magic states, such as Hadamard ($|H\rangle$-type) magic states, encoded in the quantum color code. For such embodiments, the embodiments herein demonstrate how magic states encoded in the quantum color code can then be converted to magic states encoded in the quantum surface code, in order to take advantage of the benefits of the quantum surface code described above. The schemes involve a teleportation protocol that is implemented using lattice surgery methods. In particular, using gauge fixing to perform an $X \otimes X$ logical Pauli measurement, the quantum color code and quantum surface code are merged into one code. (It should be noted that similar methods comprising $Z \otimes Z$ logical Pauli measurement may also result in such a merged code, and are encompassed in the embodiments herein.) However, known decoders for surface codes and color codes are not suitable for correcting errors of the merged code. As such, the embodiments herein present a decoding algorithm which can be used to decode the merged code, which is used for successfully converting states encoded in the quantum color code to states encoded in the quantum surface code.

An Introduction to Encoding a Clifford Circuit Design Problem as an SMT Decision Problem In general, quantum computers require high-level quantum algorithms to be compiled to low-level gate implementations that are efficient, fault-tolerant, and compatible with the hardware constraints. This compilation to a physically-implementable circuit is a topic of scientific research pertaining to reducing the gate count and depth required to implement quantum algorithms.

Many of the core primitives in a quantum computation are, or can be viewed as, the implementation of Clifford circuits. For example, bottom-up magic state preparation protocol may be used to design a non-Clifford circuit involving controlled-Hadamard gates, which is viewed as a Clifford circuit suitably conjugated by T gates. Unlike a general n-qubit unitary operation, which is specified by an exponential number of real values, an arbitrary n-qubit Clifford circuit can be specified by just $O(n^2)$ bits.

However, the simulation of Clifford circuits and subsequent verification that the resulting circuits possess the targeted computational and fault-tolerant properties is time-consuming, unpredictable, and limited in flexibility. In some embodiments, the encoding of a Clifford circuit design problem as an SMT decision problem describes, therefore, how constraints imposed on a quantum circuit design are formulated as an SMT decision problem which can then be provided to an SMT solver, such as Z3. SMT solvers can scale to solve problems containing thousands of variables in diverse domains through careful tuning of problem encoding and solver techniques, making them applicable for solving Clifford circuit design problems. Much of the embodiments presented herein pertain to embodiments that use an SMT solver. However, it should be understood that other types of solvers that solve Clifford circuit design problems may be applied to the description herein.

SMT Decision Problem Notations and Definitions

Elements of a Clifford circuit design problem may comprise arbitrary computations from the Clifford Group that may be represented by bit-matrices. Boolean formulas comprise expressions such as the following:

$$F=(X_1 \vee X_2) \wedge (X_2 \vee X_3) \wedge (\neg X_2 \vee X_1).$$

These expressions involve some Boolean, or binary, variables $X_i$, such as $X_1$, $X_2$, $X_3$, and $X_4$ from the above equation, along with logical operators such as logical AND ($\wedge$), Logical OR ($\vee$), Logical XOR ($\oplus$), and Logical NOT ($\neg$). A Boolean formula such as F may be considered "satisfiable" if there is a way to assign 0 or 1 to each of the Boolean variables $X_i$ such that F evaluates to 1. The assignment of bits to respective Boolean variables $X_i$ may be called a "satisfying assignment," according to some embodiments.

Satisfiability modulo theories (SMT) extend the notion of a Boolean formula to an SMT formula such as the following:

$$F_{SMT}=(X_1+(X_1 \otimes X_2)) \wedge (X_1+X_2+(X_3 \neq 0)+X_4) \leq 1) \leq 3.$$

These SMT formulas support variables and clauses over larger non-Boolean domains, such as integers. SMT formulas also support operators such as integer arithmetic ($+$, $-$, $\times$, $\div$), comparison ($=$, $\neq$, $\leq$, $\geq$) along with the Boolean operators described above. The "type" of an SMT expression is determined by the topmost operator in the parse tree. For example, the above $F_{SMT}$ formula evaluates to a Boolean due to the comparison 23 operator.

An SMT decision problem, therefore, is an SMT formula such as $F_{SMT}$ which evaluates to a Boolean $\in \{0,1\}$, according to some embodiments. The SMT formula may then be provided to an SMT solver, such as Z3. An SMT solver is a software program that uses heuristic strategies to find either a satisfying assignment of values to all of the variables $X_i$, such that $F_{SMT}(\{X_i\})$ evaluates to 1, or a formal proof that no such assignment exists, according to some embodiments. SMT solvers exhibit good performance for a wide range of problems from program verification to network engineering. The system and/or methods described herein may be used to determine the bit-matrix representation(s) of Clifford operations to then efficiently encode whole-circuit design problems which have been subjected to a given set of constraints. In some embodiments, the constraints may pertain to fault tolerance, quantum circuit synthesis, gate scheduling, and/or qubit routing. The constraints then may be used to enable synthesis of large fault-tolerant circuits from scratch such that nontrivial Clifford operations may be implemented while maintaining compatibility with 2D hardware.

The Clifford group on n qubits is isomorphic to the binary symplectic group $Sp(2n, \mathbb{F}_2)$ whose elements may be considered as matrices in $\mathbb{F}_2^{2n \times 2n}$ which preserve the symplectic inner product. In the context of quantum computation, these matrices may be thought of as acting on a bit-vector representation $x \in \mathbb{F}_2^{2n}$ of a Pauli group stabilizer $\prod_{i=1}^{n} X_i^{x_i} Z_i^{x_{n+i}}$ of a quantum state, modulo an unimportant global phase. For example, the CNOT gate acts on the basis $\{X_1, X_2, Z_1, Z_2\}$ of the vector space over $\rangle_2$ of the Pauli group (modulo phase) on two qubits such that the binary matrix representing the CNOT gate, $\overline{CNOT}$, is:

$$\overline{CNOT} = \begin{pmatrix} 1 & 0 & 0 & 0 \\ 1 & 1 & 0 & 0 \\ 0 & 0 & 1 & 1 \\ 0 & 0 & 0 & 1 \end{pmatrix}.$$

Given a Pauli operator with bit-vector e acting on the input state to a Clifford circuit C, the operator may be propagated through the circuit as $e' = \overline{C}e$ such that the bit-vector is left-multiplied by the bit-matrix representation of the Clifford operation implemented by the circuit. The reduced bit-matrices $\overline{CNOT}|_X$ and $\overline{CNOT}|_Z$, which characterize the action of the Clifford operation when one Pauli type (X or Z) is disregarded, are therefore:

$$\overline{CNOT}|_X = \begin{pmatrix} 1 & 0 \\ 1 & 1 \end{pmatrix} = \overline{CNOT}|_Z^T.$$

Expanding this concept, the bit-matrix representation $\overline{C}$ of an entire Clifford circuit C consisting of a series of gates g with bit-matrices $G_1, \ldots, G_g$ may be solved for by multiplying all of the gates in time order, $\prod_{i=1}^{g} \overline{G}_i$. This requires g matrix multiplications, where there are g gates in the circuit. Then, the resulting matrices for the given SMT decision problem of Clifford circuit C may be symbolic matrices, meaning that their entries may be SMT formulas of some given abstract variables. These may be multiplied and added modulo 2 using the SMT operators $\wedge$ and $\oplus$. However, performing matrix multiplications on symbolic matrices is time consuming due to the symbolic computations required by the SMT solver software. Furthermore, the symbolic entries of the resulting matrices grow to large SMT formulas, leading to large and difficult SMT decision problems.

In some embodiments, therefore, a minimization of the number of symbolic matrix multiplications in computing the bit-matrix of the circuit C is made such that the bit-matrix for C is constructed with only N matrix multiplications, where N is the number of time steps of C. This technique works by effectively adding modulo 2 instead of multiplying the matrices for gates which act simultaneously on disjointed sets of qubits. This decreases formula sizes and increases solver performance.

Given a bit-matrix representation $\overline{G} \in \rangle_2^{2n \times 2n}$ of a Clifford gate G acting on n qubits, which acts trivially on the eth qubit, $$\overline{G}_{ij} = \delta_{ij} \forall i,j \in (\{\ell, \ell+n\} \times [2n]) \cup ([2n] \times \{\ell, \ell+n\}),$$

where $[n] := \{1, \ldots, n\}$. This indicates that a Pauli X or Z operator on the $\ell^{th}$ qubit is mapped to itself by the gate with bit-matrix G, and does not propagate to any other qubits besides $\ell$. Furthermore, Pauli operators on all other qubits $\ell' \neq \ell$ do not propagate to Pauli operators on qubit e such that the matrix $\overline{G}$ must leave invariant all possible Pauli operators on the $\ell^{th}$ qubit:

$$\Delta \overline{G} := \overline{G} \otimes I_{2n \times 2n}.$$

From the previous observation, it can seen that the matrix $\Delta \overline{G}$ is supported only in the combinatorial rectangle with rows and columns indexed in the set S of qubits supporting the gate corresponding to G. Therefore, the product of two gates $G_1 G_2$ simplifies when acting on disjointed sets of qubits:

$$\overline{G}_1 \overline{G}_2 = (I \otimes (\overline{G}_1 \otimes I))(I \otimes (\overline{G}_2 \otimes I)) = I \otimes (\overline{G}_1 \otimes I) \otimes ( \overline{G}_2 \otimes I) \otimes (\overline{G}_1 \otimes I)(\overline{G}_2 \otimes I) = 0 = I \otimes \Delta \overline{G}_1 \otimes \Delta \overline{G}_2.$$

In general, for m simultaneous Clifford gates $G_1, \ldots, G_m$ acting on pairwise disjoint sets of qubits, the composite bit-matrix of these gates may be computed as the following product-sum relation:

$$\prod_{i=1}^{m} \overline{G}_i = 1 \oplus \bigoplus_{i=1}^{m} \Delta \overline{G}_i.$$

For example, for a given set of 3 qubits, a given CNOT gate acts on qubits 1 and 2, $CNOT_{1,2}$, and a given Hadamard (H) gate acts on qubit 3, $H_3$. Following the elementary propagation rules of a CNOT gate and the relations HX=ZH and XH=HZ, the bit-matrices for these gates are as follows:

$$\overline{CNOT_{1,2}} = \begin{pmatrix} 1 & 0 & 0 & 0 & 0 & 0 \\ 1 & 1 & 0 & 0 & 0 & 0 \\ 0 & 0 & 1 & 0 & 0 & 0 \\ 0 & 0 & 0 & 1 & 1 & 0 \\ 0 & 0 & 0 & 0 & 1 & 0 \\ 0 & 0 & 0 & 0 & 0 & 1 \end{pmatrix},$$

$$\overline{H_3} = \begin{pmatrix} 1 & 0 & 0 & 0 & 0 & 0 \\ 0 & 1 & 0 & 0 & 0 & 0 \\ 0 & 0 & 0 & 0 & 0 & 1 \\ 0 & 0 & 0 & 1 & 0 & 0 \\ 0 & 0 & 0 & 0 & 1 & 0 \\ 0 & 0 & 1 & 0 & 0 & 0 \end{pmatrix}.$$

Then, following the above proof for the product of two gates $G_1 G_2$, $$(\overline{H_3} \oplus I)(\overline{CNOT_{1,2}} \oplus I) = \begin{pmatrix} 1 & 0 & 0 & 0 & 0 & 0 \\ 1 & 1 & 0 & 0 & 0 & 0 \\ 0 & 0 & 1 & 0 & 0 & 0 \\ 0 & 0 & 0 & 1 & 1 & 0 \\ 0 & 0 & 0 & 0 & 1 & 0 \\ 0 & 0 & 0 & 0 & 0 & 1 \end{pmatrix} \begin{pmatrix} 1 & 0 & 0 & 0 & 0 & 0 \\ 0 & 1 & 0 & 0 & 0 & 0 \\ 0 & 0 & 0 & 0 & 0 & 1 \\ 0 & 0 & 0 & 1 & 0 & 0 \\ 0 & 0 & 0 & 0 & 1 & 0 \\ 0 & 0 & 1 & 0 & 0 & 0 \end{pmatrix} = 0_{6 \times 6}.$$

As per the above product-sum relation $\prod_{i=1}^{m} \overline{G}_i = I \otimes \otimes_{i=1}^{m} \Delta \overline{G}_i$, the verification of $I \otimes \Delta \overline{CNOT_{1,2}} \otimes \Delta \overline{H_3} = \overline{CNOT_{1,2} H_3}$ may also be made.

Solving for Clifford Circuits

In order to enable characterization of a given Clifford circuit design problem to be encoded as an SMT decision problem, many characteristics, properties, and/or constraints are first re-formalized as SMT formulas that may be provided to an SMT solver. For instance, a Clifford circuit design problem may require a format for encoding an arbitrary circuit supported by quantum hardware in terms of some Boolean variables $X_i$, according to some embodiments. This refers to the gate-time encoding of a circuit, which will be detailed in the following paragraphs.

Suppose a given quantum computer has n qubits, that it supports w distinct fundamental gate operations, $G_1, \ldots, G_w$, and that it should encode a given circuit with at most N time steps. The circuit may then be encoded by wN symbolic Boolean variables indexed as $X_{ij}$, where $i \in [w]$ and $j \in [N]$. By convention, the gate $G_i$ is applied at time step j if and only if $X_{ij}=1$. The Boolean values $X_{ij}$ then specify an arbitrary depth N circuit $C_X$ consisting of $G_i$ gates.

For example, consider a layout of three qubits labeled 1, 2, and 3 such that qubit 1 is connected to qubit 2, qubit 2 to qubit 3, and qubit 3 to qubit 1 via graph edges. In some embodiments, this may be referred to as gate connectivity information. This then is represented on a physical device on a 2D surface, where the qubits have nearest-neighbor interactions shown by the graph edges. In some embodiments, this may be referred to as a qubit interaction graph, such as qubit interaction graph 410 in FIG. 4B. For the sake of this following example, assume that, for any pair of qubits connected by an edge, such as for the graph edge connections described above, a CNOT gate may be implemented on that given pair of qubits, or any single qubit Pauli X, Y, Z, Hadamard H, or phase S gate may also be implemented. This results in w=6+3+3+3+3+3=21 distinct gates $G_1, \ldots, G_w$, and with the following gate set:

$$\{G_1, \ldots, G_w\} = \{CNOT_{1,3}, CNOT_{3,1}, CNOT_{1,2},$$
$$CNOT_{2,1}, CNOT_{2,3}, CNOT_{3,2}, X_1, X_2, X_3, Z_1, Z_2, Z_3,$$
$$Y_1, Y_2, Y_3, H_1, H_2, H_3, S_1, S_2, S_3\}.$$

Figure 4A:
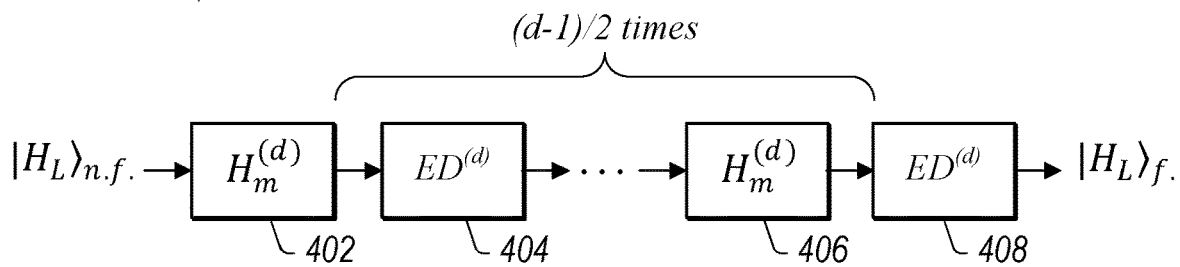
FIG. 4A is a flow diagram illustrating a process of preparing a fault-tolerant Hadamard magic state via a bottom-up procedure, according to some embodiments.
Figure 4B:
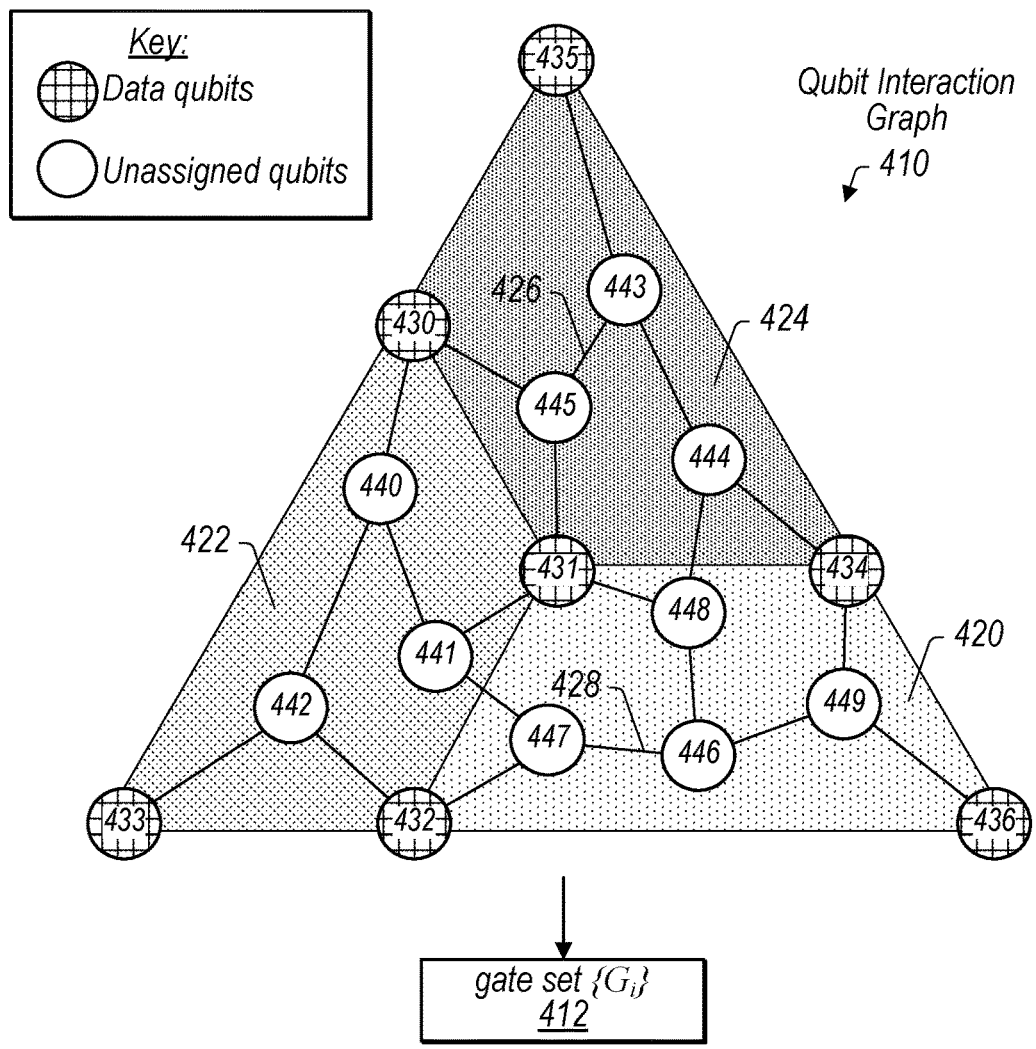
FIG. 4B illustrates an example of how, for a given Clifford circuit design problem of determining how a Hadamard magic state may be implemented via one or more Clifford circuits using a quantum color code, gate connectivity information to be used as a constraint in the SMT protocol may be taken from a qubit interaction graph that has been designed for said Clifford circuit design problem, according to some embodiments.

In addition, an example embodiment of a gate set $\{G_i\}$ 412 is shown in FIG. 4B.

The product-sum relation then gives a symbolic expression for the bit-matrix of the Clifford operation $\overline{C}$ performed by the circuit C in terms of Boolean variables $X_{ij}$ and the bit-matrices for the individual gates $\overline{G}_i$. Such an expression is given by:

$$\overline{C} = \prod_{j=1}^{N}\left(I \oplus \bigoplus_{i=1}^{w} X_{ij} \Delta \overline{G}_i\right).$$

In some embodiments, the process of encoding a Clifford circuit design problem as an SMT decision problem therefore comprises constructing a symbolic bit-matrix P which is simply the bit-matrix $\overline{C}$ of the circuit C, but where the entries $\overline{C}_{ij}$ are now formulas involving the variables $X_{kl}$ that determine the circuit C, and the constants 0, 1. Supposing some Clifford operation O whose bit-matrix is $\overline{O}$, said operation may be enforced such that the circuit implements the target Clifford operation by requiring that $\overline{C}=\overline{O}$. Additional requirements on the circuit may be added by conjuncting this core equality with any number of additional constraints.

For each $i \in [w]$ there may be a bit-matrix representation $\overline{G}_i \in \mathbb{F}^{2n \times 2n}$ of the ith gate. The product-sum relation may then be used to express the symbolic bit-matrix for the circuit specified by $X_{ij}$:

$$\overline{C} = \prod_{j=1}^{N}\left(I \oplus \bigoplus_{i=1}^{w} X_{ij} \Delta \overline{G}_i\right).$$

More generally, a sequence of symbolic bit-matrices for the partial circuits consisting of the last N−k steps of the circuit C may be written as:

$$\overline{C}^{(k)} := \prod_{j=k+1}^{N}\left(I \oplus \bigoplus_{i=1}^{w} X_{ij} \Delta \overline{G}_i\right).$$

Furthermore, $\overline{C}=\overline{C}^{(0)}$, and all of the matrix multiplications over $\mathbb{F}_2$ may be implemented with a given solver, such as an SMT solver, using the fundamental operations of multiplication (e.g., logical AND) and addition mod 2 (e.g., exclusive-or XOR) on the formulas constituting the symbolic matrix, according to some embodiments. For simplification, an SMT solver is described. However, it should be understood that other types of solvers may also be used.

SMT solvers operate in two stages, according to some embodiments. In the first stage, the formula is constructed to be solved according to the user's wishes. In the second stage, the solver applies a heuristic set of approaches to simplify the formula, derive lemmas, and eventually solve the formula or prove that it is unsatisfiable. Furthermore, in some embodiments, the formula given by the user in the first stage is left "as-is" during the first stage—even simple formulas such as the parity expression $0 \otimes 0 \otimes 0 \otimes \ldots \otimes 0 \otimes 1$. This may lead to a slowdown in constructing the SMT decision problem, as manipulating these large symbolic formulas has a much larger memory and time overhead than directly manipulating single bits. In some embodiments, the SMT solver's simplification routines may be manually triggered on the partial expressions that build up a formula, but this brings its own associated slowdowns since in some cases the solver spends time performing nontrivial simplifications. Moreover, a pre-simplified formula may take longer to solve, as it is generally better to leave decisions about nontrivial simplifications, substitution, etc., to the finely tuned heuristics of the solver at solving time rather than to manually force potentially nontrivial simplifications during problem construction.

To avoid slowdowns when manipulating large symbolic bit-matrices, variadic subroutines 'FastAnd,' 'FastOr,' and 'FastXor' may be implemented, which pool all constant arguments and only call the symbolic SMT boolean functions when needed. For example, by applying the 'FastAnd' function to two Boolean variables X and Y, argument 'X$\wedge$0$\wedge$1$\wedge$1' may simplify to '0.' Similarly, argument 'X$\wedge$Y$\wedge$1$\wedge$1' may simplify to 'X$\wedge$Y,' and '1$\wedge$1$\wedge$1$\wedge$1' to '1.' Examples of 'FastOr' and 'FastXor' may similarly be shown.

In some embodiments, this type of optimization may lead to a ×100 speedup in the construction of the matrices $P^{(k)}$, and is thus important for scaling up to large circuits involving dozens of qubits and time steps. For example, when evaluating one term in the inner sum of $\overline{C}=\prod_{j=1}^{N}(I \otimes \otimes_{i=1}^{w} X_{ij} \Delta \overline{G}_i)$, the product $X_{ij} \Delta \overline{G}_i$ must be symbolically computed, in which $X_{ij}$ is a Boolean variable and $\Delta \overline{G}_i$, wherein $\Delta \overline{G}_i = \begin{pmatrix} 0 & 1 \\ 1 & 0 \end{pmatrix}$ in this case, is a bit-matrix of (literal) Boolean values. By performing the multiplication using 'FastAnd,' the result is $$X_{i,j} \Delta \overline{G}_i = \begin{pmatrix} X_{ij} & 0 \\ 0 & X_{ij} \end{pmatrix},$$

whereas using a given SMT solver's logical operators would give:

$$X_{i,j} \Delta \bar{G}_i = \begin{pmatrix} 'X_{ij} \wedge 0' & 'X_{ij} \wedge 1' \\ 'X_{ij} \wedge 1' & 'X_{ij} \wedge 0' \end{pmatrix}.$$

In some embodiments, valid circuits must generally satisfy some gate exclusion relations as well, which may be described in terms of a set of SMT assertions $\{f_i\}$ that are conjuncted into the constraint satisfaction problem as $\wedge_i f_i$. According to a given example setup, there may be at most one gate acting on each qubit at any one time step. This may be captured as, for a time step $t \in [N]$ and a qubit $q \in [n]$, $$f^{(t,q)} = \left( \sum_{i \in [w], q \in supp(G_i)} X_{it} \leq 1 \right).$$

In which the sum is over the integers (e.g., not modulo 2). The combined valid circuit constraints may then be obtained as the following, wherein the constraints are defined as a function of 'IsValidCircuit':

$$\text{IsValidCircuit}(\{X_{ij}\}) = \bigwedge_{t \in [N], q \in [n]} f^{(t,q)}.$$

In some embodiments, the gate exclusion relations may be modified, and the following paragraphs provide a few examples of gate exclusion relations that may be advantageous to implement for given circuit designs. For example, particular gates may be chosen to be represented by products of those in the given gate set $G_1, \ldots, G_w$ described above, e.g., the Pauli Y gate on a single qubit may be represented as acting with both the X and Z gates simultaneously. This would decrease the number of distinct gates w, making the circuit representation more efficient.

In some embodiments, the gate exclusion relations may be modified to limit the number of gates of a particular type that are applied. This may be relevant, for example, if the noise rate or overhead cost is especially high for that gate type.

In some embodiments, the gate exclusion relations may be modified such that few or no idling locations occur, as idling qubits may add additional fault locations to the circuit.

In some embodiments, the gate exclusion relations may be modified to limit the number of distinct qubits with which any one qubit interacts with, so as to minimize the degree of the connectivity graph, which will be further described in a later section.

In some embodiments, the gate exclusion relations may be modified to limit the number of distinct long range gates between distant qubits, such as in cases where only a few distinct long range gates may be implemented and therefore it is advantageous to use them sparingly.

Finally, in some embodiments the gate exclusion relations may be modified to co-design multiple protocols simultaneously such that the gates of one Clifford circuit design problem may be used for a second Clifford circuit design problem, with a global degree or other gate constraint enforced jointly across both protocols. These relations represent some examples of gate exclusion relations that may be used in combination or separately, in order to encode gate exclusion relations $f_i$ as SMT decision formulas, according to some embodiments. The relations also are not meant to be seen as the definitive list of all possible gate exclusion relations.

FIG. 1A is a flow diagram illustrating a process of encoding a Clifford circuit design problem as a decision problem for a solver via constructing an encoded solver protocol for the decision problem, providing the encoded solver protocol to a solver, and implementing one or more Clifford circuit solutions of the solver on a quantum hardware device, according to some embodiments.

The embodiments described in FIG. 1A may be implemented via the system and/or methods described herein. In addition, non-transitory, computer-readable media that store program instructions may cause one or more processors to execute program instructions that pertain to said system and/or methods.

In block 100, in order to encode a Clifford circuit design problem as a decision problem for a solver, one or more symbolic bit matrix representations for one or more elements of the Clifford circuit design problem in block 102, such as those that have been described above, and one or more constraint equations for modeling one or more Clifford circuits of the Clifford circuit design problem in block 104, also described above, are first determined. The bit matrix representations of block 102 and constraint equations of block 104 are then used to construct an encoded solver protocol in block 106. The resulting encoded solver protocol is then provided to a solver, such as an SMT solver, in block 108, and the solver returns one or more Clifford circuit solutions in block 110. Finally, the Clifford circuit solutions may be implemented on a quantum hardware device in block 112, according to some embodiments. In some embodiments, the solver may be an SMT solver, such as Z3. Much of the embodiments presented herein pertain to embodiments that use an SMT solver. However, it should be understood that other types of solvers that produce Clifford circuit solutions may be applied to the protocols described herein.

Figure 1B:
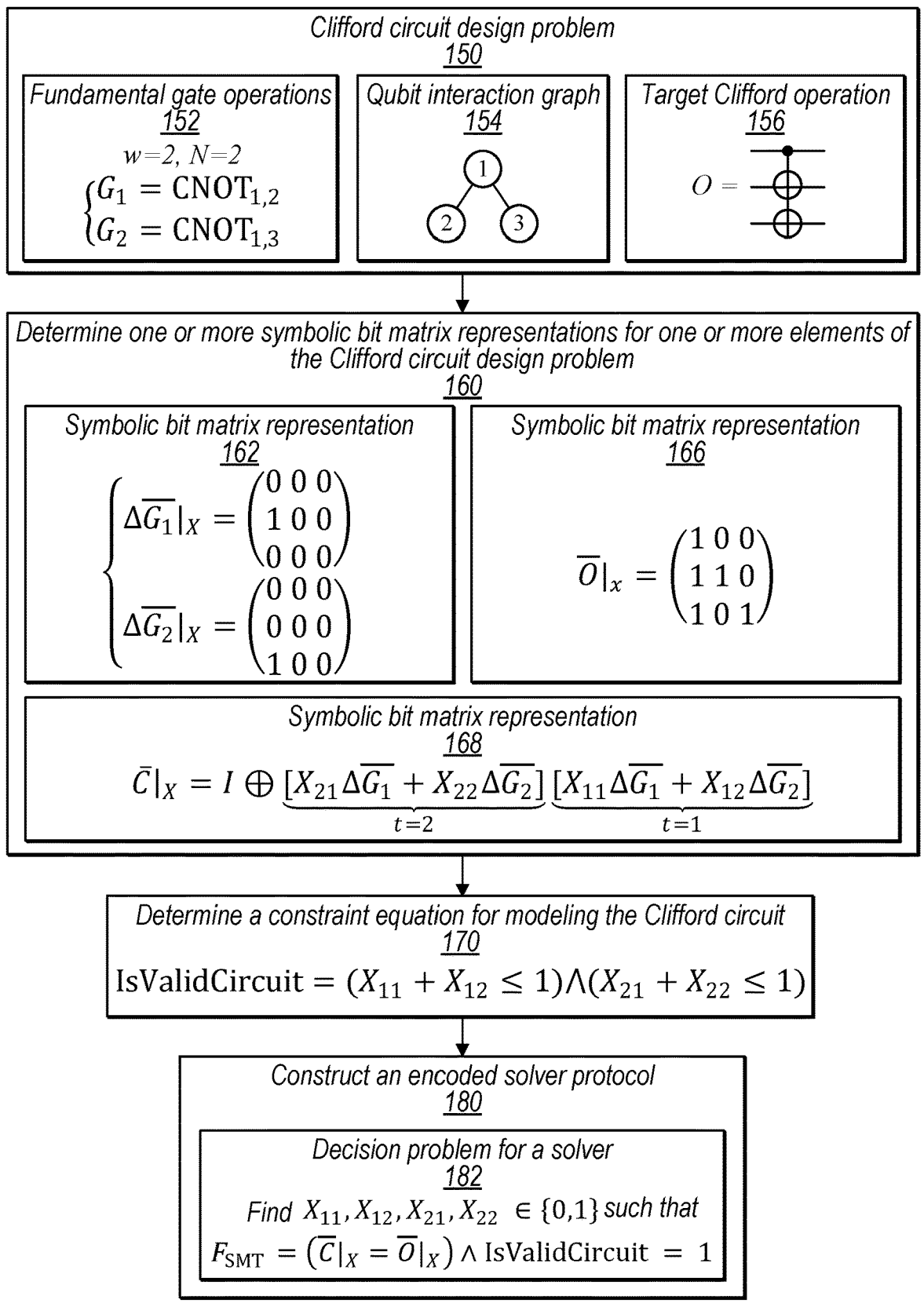
FIG. 1B is a flow diagram illustrating a process of encoding a Clifford circuit design problem as a decision problem for a solver via constructing an encoded solver protocol for the decision problem and following a process similar to the process described in FIG. 1A, according to some embodiments.

FIG. 1B is a flow diagram illustrating a process of encoding a Clifford circuit design problem as a decision problem for a solver via constructing an encoded solver protocol for the decision problem and following a process similar to the process described in FIG. 1A, according to some embodiments.

In some embodiments, block 100 of FIG. 1A may be described by the process described in FIG. 1B. Clifford circuit design problem 150 may define a simple set of circuit design objectives which may comprise fundamental gate operations 152, qubit interaction graph 154, and target Clifford operation 156. The circuit design objectives of Clifford circuit design problem 150 may relate to the implementation of a target Clifford operation O, such as target Clifford operation 156, which should be implemented using a quantum hardware layout of 3 qubits, such as the layout shown in qubit interaction graph 154, and using 2 fundamental quantum gates $\{G_1, G_2\}$, such as fundamental gate operations 152, in N=2 timesteps.

In block 160, one or more of the elements introduced above may be encoded as symbolic bit matrix representations. Symbolic bit matrix representation 162 is a symbolic bit matrix representation of fundamental gate operations 152, according to some embodiments. As fundamental gate operations 152 comprises two CNOT gates $\{G_1, G_2\}$, off diagonal blocks of the involved bit matrices are 0, resulting in symbolic bit matrix representation 162. Symbolic bit matrix representation 166 is a symbolic bit matrix representation of target Clifford operation 156, which may be referred to as $\overline{O}|_X$, according to some embodiments. Symbolic bit matrix representation 168 is a symbolic bit matrix of Clifford circuit design problem 150, which may be referred to as $\overline{C}|_X$, according to some embodiments. Symbolic bit matrix representation 168 may comprise Boolean variables $X_{11}$, $X_{12}$, $X_{21}$, and $X_{22}$ in order to encode Clifford circuit design problem 150, wherein $X_{ti}=1$ only if gate i is applied at timestep t.

In block 170, a solver formula for modeling the Clifford circuit of Clifford circuit design problem 150, such as solver formula $F_{SMT}$, may comprise constraint equation 'IsValidCircuit,' which evaluates to 1 only if each qubit is acted on by at most one gate at each timestep, according to some embodiments. Then, in block 180, an encoded solver protocol for a solver, such as an SMT solver, is constructed for Clifford circuit design problem 150. This may comprise decision problem for a solver 182, such that $F_{SMT}$ evaluates to 1 only if the $\{X_{ti}\}$ variables encode a physically implementable circuit for target Clifford operation 156. In some embodiments, the encoded solver protocol for a solver may then be provided to a solver, and the Clifford circuit solutions found by the solver may then be implemented into a quantum hardware device, according to blocks 108, 110, and 112 of FIG. 1A.

In general, constraint equations may comprise constraints such as those described above, e.g. 'IsValidCircuit,' among others. Furthermore, in some embodiments, the Clifford circuit design problem may comprise additional constraints within the overall constraint equation for the Clifford circuit design problem that require the one or more circuits to have fault-tolerant properties. For instance, symbolic fault propagation may be applied to design fault-tolerant syndrome extraction circuits for topological codes and/or error correction codes such as a quantum surface code, which will now be described in the following paragraphs.

Since arbitrary noise operators may be expressed as linear combinations of Pauli operators, the noise may be modeled as a distribution on Pauli operators at each spacetime location (e.g., idle, gate, state-preparation and measurement) in a given circuit. Specifically, a Pauli noise operator (ignoring global phases) may be described as a column vector $e \in \mathbb{F}_2^{2n}$ in which the first n rows correspond to X errors on the n qubits, and the second n rows correspond to Z errors.

For example, suppose that a noise process occurs at time step k resulting in some initial Pauli noise operator vector e. The error arising from the fault may be symbolically propagated through the remainder of the circuit by computing the symbolic vector $e'=\overline{C}^{(k)}e$, where the partial circuit bit-matrices are defined according to $\overline{C}^{(k)} := |_{j=k+N}(I \otimes \otimes_{i=1}^{w}X_{ij}\Delta \overline{G}_i)$. One or more constraints are then imposed as needed on the final propagated error to ensure that the scheme is fault-tolerant up to the full code distance.

In some embodiments, the combined fault propagation constraint equation is therefore $$\bigwedge_{\text{single fault } e} \neg \text{NotFaultTolerant}(e').$$

in which 'NotFaultTolerant' is a Boolean formula of NotFaultTolerant($e'_1, \ldots, e'_{2n}$) on 2n variables which decides whether the propagated error at the single fault location invalidates the targeted fault-tolerant properties of the circuits. For instance, continuing with the symbolic fault propagation within a quantum surface code example described above, 'NotFaultTolerant' may comprise a constraint such that gate scheduling chosen for the syndrome extraction circuit of the quantum surface code (or other such topological codes) must satisfy the property of having errors propagating perpendicularly to the appropriate logical operator, according to some embodiments. This concept is shown in FIG. 2A-2C.

FIG. 2A illustrates a 3×3 quantum surface code with a logical operator $X_L$, according to some embodiments.

In some embodiments, a given fault propagation constraint may be placed on a quantum surface code such as the distance 3 (e.g. d=3) quantum surface code shown in FIG. 2A with logical operator $X_L$. In the following example, FIGS. 2A, 2B, and 2C are meant to portray the same embodiment of a quantum surface code, in which the following labels carry through. Following the Key shown above FIG. 2A, the quantum surface code in FIG. 2A comprises ancilla qubits, such as ancilla qubit 230, and data qubits, such as data qubits 210, 212, 214, 216, 218, 220, 222, 224, and 226. Alternating X-type stabilizers, such as X-type stabilizer 240 (shown in FIG. 2B for convenience), and Z-type stabilizers, such as Z-type stabilizer 242 (shown in FIG. 2B for convenience), of the syndrome extraction circuit are differentiated by the Key shown above FIG. 2A. In addition, FIG. 2B and FIG. 2C illustrate a process of how a fault propagation constraint may be used to find a fault-tolerant gate scheduling for a given quantum surface code such that at most (d−1)/2 faults can occur without resulting in a logical error. For the example distance 3 quantum surface code shown in FIG. 2A, the fault propagation constraint ensures that at most 1 fault can be tolerated without resulting in a logical error.

FIG. 2B illustrates a 3×3 quantum surface code with a given error after a given time step such that the error is propagated in parallel with the logical operator $X_L$ described in FIG. 2A, according to some embodiments.

Following the description of FIG. 2A, X-type stabilizer 240 of the syndrome extraction circuit comprises CNOT gates, such as CNOT gate 250 between data qubit 216 and ancilla qubit 230, which are measured at time steps 1, 2, 3, and 4 as shown in the figure. In some embodiments, assignment of a CNOT gate measurement to a given time step may be referred to as gate scheduling. For example, CNOT gate 250 may be scheduled to be measured in time step 1, according to some embodiments such as the one shown in FIG. 2B. In order to demonstrate how one or more gate scheduling constraints may be implemented into 'NotFaultTolerant,' as introduced above, assume that a single fault occurs after time step 2 that results in an X error e on ancilla qubit 230. The error then propagates to a weight-two X error on data qubit 222 and data qubit 224, which are parallel to the logical $X_L$ operator. Error e which is propagated onto data qubit 222 and data qubit 224 is represented by e'.

FIG. 2C illustrates how error arising from a given fault in a 3×3 quantum surface code described in FIG. 2B may be symbolically propagated when one or more given fault propagation constraints are imposed, according to some embodiments.

As shown in FIG. 2C, the error e arising from the fault at the given spacetime location described in FIG. 2B may be symbolically propagated as $e'=\overline{C}^{(2)}e$ in order to ensure that conditions for 'NotFaultTolerant' are met, according to some embodiments. In such embodiments, the fault propagation constraint equation may then comprise the following fault propagation constraints $c_1$, $c_2$, and $c_3$ in order to meet criteria for 'NotFaultTolerant.' In FIG. 2C, data qubits that are affected by a given fault propagation constraint are respectively encircled by a solid line, as shown in the figure. These solid lines match the following fault propagation constraints, wherein, for example, $e'_{210}$ represents propagated error e' onto data qubit 210:

$$c_1 = e'_{210} + e'_{212} + e'_{214}$$

$$c_2 = e'_{216} + e'_{218} + e'_{220}$$

$$c_3 = e'_{222} + e'_{224} + e'_{226}$$

$$c_1 + c_2 + c_3 \leq 1.$$

In this example, $c_1+c_2+c_3 \leq 1$ ensures that the at most one fault is not allowed to propagate parallel to a logical operator. By imposing this constraint for each possible fault location for X-type errors, it is ensured that no single faults in the syndrome extraction circuit propagate parallel to a $X_L$ logical operator. Similar constraints for a given fault propagation constraint equation may be written to prevent Z-type errors from propagating parallel to a $Z_L$ logical operator. It should also be understood that fault propagation constraints $c_1$, $c_2$, and $c_3$ may apply to other error scenarios besides the one example shown in FIGS. 2A-2C, and that other types of fault propagation constraints may be added or subtracted in order to meet the criteria for 'NotFaultTolerant' for a given Clifford circuit design problem.

More generally speaking, in some embodiments of a noise model in which two-qubit gates are affected by two-qubit Pauli errors, it may be advantageous to enforce these types of fault propagation constraints only for faults occurring on two-qubit gates whose associated Boolean variables $X_{ij}$ are set to 1. In such embodiments, the combined fault propagation constraint equation may be amended to be:

$$\bigwedge_{\text{single fault } e \text{ after timestep } k} \neg$$

NotFaultTolerant(e')$\lor$IsInvalidFaultLocation(X,e,k), in which 'IsInvalidFaultLocation(X,e,k)' is a Boolean formula which decides whether the error e may have occurred at the given spacetime location.

In some embodiments, a Clifford circuit design problem may comprise yet additional constraints that pertain to additional properties related to fault tolerance that may be included within the overall constraint equation for the Clifford circuit design problem. The following paragraphs will describe another symbolic fault propagation constraint pertaining to the construction of v-flag circuits that may be used to fault-tolerantly measure a given operator, such as a stabilizer of an error correcting quantum code, according to some embodiments.

In some embodiments, a v-flag circuit may be used for measuring a given stabilizer $g_i$. In some embodiments, error correction of an error correcting quantum code comprises identifying one or more locations of non-trivial stabilizer measurement outcomes (indicating the presence of at least one fault) via minimum (min)-weight (wt) perfect matching, which may also be referred to as MWPM and may use notation such as wt(P), which corresponds to the weight of a given operator P.

In terms of v-flag circuits, this may describe that, for any set of $t \leq v$ faults resulting in the error E such that min(wt (E),wt(Eg_i))>t, at least one of a given number of designated flag qubits is measured non-trivially. In some embodiments, this may lead to a description of a given circuit being "flagged" if at least one of the given flag qubits is measured non-trivially. In more detail, for each qubit i which is to be measured, $P_i \in \{X,Y,Z\}$ represents the Pauli measurement basis. As the $P_i$-basis measurement of given qubit i deterministically gives a trivial +1 measurement outcome in the absence of any faults, the initial stabilizers of the input state are then mapped by the target Clifford operation C to a set of stabilizer generators, which includes the stabilizer $P_i$ on the final state.

To symbolically verify whether a propagated error resulting from t-faults causes the circuit to "flag," the symbolic propagated error may first be obtained, and then it is secondly verified whether or not any given flag qubit i gives a nontrivial $P_i$-basis measurement outcome. For example, if qubit i is measured in the $P_i$=X basis, it is verified whether or not there is a Z or Y error on given qubit i in the symbolically propagated error e'.

In some embodiments a system that encodes a Clifford circuit design problem as an SMT decision problem, the SMT solver may decide which qubits are to play the role of flag qubits. In such embodiments, a Boolean variable IsFlag$_i$ is added to each possible flag qubit i, where IsFlag$_i$ may be set to 1 if and only if qubit i is a flag qubit in the final constraint equation. Similarly, the SMT solver may be allowed to choose the measurement basis $P_i$ for each measured qubit i by adding Boolean variables MeasuredInX$_i$ and MeasuredInZ$_i$, with the convention that the Y basis is chosen if both are set to 1, and with an added constraint that MeasuredInX$_i$$\lor$MeasuredInZ$_i$=1, according to some embodiments. In some embodiments, $P_i$ may still refer to this encoded Pauli variable. As mentioned above, the $P_i$ basis Pauli measurement outcome deterministically gives +1 when there are no faults, and therefore the target Clifford operation C must be compatible with the choice of $P_i$ and IsFlag$_i$, according to some embodiments. In such embodiments, the solution, therefore, may be to make C itself depend on the setting of these variables, so that the circuit does not "flag" when there are no faults.

Furthermore, for each possible fault in the circuit, a tuple (k, e, e', S) is associated, wherein $k \in [N]$ is the time step such that the fault occurs, $e \in \mathbb{F}_2^{2n}$ is the vector representation of the Pauli noise operator resulting from the fault, $e' = \overline{C^{(k)}} e$ and S is the stabilizer circuit in which the fault occurred.

In some embodiments, a system that encodes a Clifford circuit design problem as an SMT decision problem may use functions, such as the ones described in the following paragraphs, may be used to return SMT formulas that may then be used in the SMT protocol for the SMT solver. For instance, the 'MinWt' function returns a formula which evaluates to the minimum integer weight of the propagated noise operator resulting from a given set of t faults when multiplied by the $\ell$ distinct stabilizers $\{Q_1, \ldots, Q_\ell\} = \{S_i : i \in [t]\}$ in whose measurement circuits the t faults occurred:

$$\text{MinWt}(\{(k_i, e_i, e'_i, \overline{S}_i) : i \in [t]\}) = \min_{x \in \{0,1\}^\ell} \prod_{j=1}^{\ell} \overline{S}_j^{x_j} \sum_{i=1}^{t} e'_i.$$

Note that the integer 'min' function may be implemented as an SMT formula using the comparison operators and the If-Then-Else operator, according to some embodiments.

A second example function is the NontrivialOutcome(i, $P_i$, e') function, which returns a formula which evaluates to 1 if the Pt-basis measurement outcome of qubit i gives a nontrivial −1 outcome in the presence of the error e'. As the operation C is guaranteed to give a +1 measurement outcome when there are no faults, this is easily computed as:

NontrivialOutcome($i$, MeasuredInX$_i$, MeasuredInZ$_i$, $e'$)=($e'_i$ ∧ MeasuredInZ$_i$) ⊗ ($e'_{n+i}$ ∧ MeasuredInX$_i$).

A third example function is the 'IsFlagged' function, which returns a formula which evaluates to a Boolean 1 value if and only if there is a flag qubit which gives a nontrivial measurement outcome:

$$\text{IsFlagged}(e', \{\text{IsFlag}_1, \ldots, \text{IsFlag}_n\}) = \bigvee_{i=1}^{n}$$

$$\text{IsFlag} \wedge \text{NontrivialOutcome}(i, P_i, e'),$$

Where, for brevity, the variables MeasuredInX$_i$ and MeasuredInZ$_i$ have been abbreviated as $P_i$.

A fourth example function is the 'IsValidFaultSet' function, which returns a formula which evaluates to 1 if and only if the faults occur at a valid origin point:

$$\text{IsValidFaultSet}(\{(k_i, e_i, e'_i, \overline{S}_i) : i \in [t]\}) = \bigwedge_{i=1}^{t} \bigwedge_{\substack{j=1 \\ \text{supp}(G_j) \supseteq \text{supp}e_i}}^{w} X_{i,j},$$

where the support of a gate supp(G) is the set of qubits on which it acts, and the support of a noise operator with bit-vector $e \in \mathbb{F}_2^{2n}$ is simply supp(e)={$i \in [n]$:$e_i \vee e_{n+i}$}. Note that e is not a free variable, as it is known at the time of SMT decision problem creation, according to some embodiments. Therefore, the 'IsValidFaultSet' function returns a small SMT formula, or constraint equation, since the logical OR in the formula above is efficiently implemented by the SMT protocol, rather than symbolically encoded in the formula itself.

A fifth example is the 'IsNotTFlagFaultTolerant' function, which returns a formula which evaluates to 1 if and only if the passed error violates the t-flag property of the circuit. That is, IsNotTFlagFaultTolerant($\{(k_i, e_i, e'_i, \overline{S}_i): i \in [t]\}$)= (MinWt>$t$)∧(¬IsFlagged)∧IsValidFaultSet, where all arguments except 'IsNotTFlagFaultTolerant' have been suppressed for brevity.

A sixth example is the 'IsVFlag' function, which may be used to design a v-flag circuit such as in the embodiments discussed above. In such embodiments, the 'IsVFlag' function comprises one or more fault tolerance constraints, and returns a formula evaluating to 1 if and only if the circuit is v-flag:

$$\text{IsVFlag}(\{X_{ij}\}, \{P_i\},$$

$$\{\text{IsFlag}_i\}) = \bigwedge_{t \leq v} \bigwedge_{\{(k_i, e_i, e'_i, \overline{S}_i): i \in [t]\}} \neg \text{IsNotTFlagFaultTolerant},$$

where again certain arguments have been omitted for brevity, and it should be understood that the conjunction is over all possible sets of t≤v errors which occur at t distinct fault locations.

The examples described above represent a selection of possible functions that can be used with an SMT solver to solver a given Clifford circuit design problem. The examples should not be read as an exclusive list, but rather as examples of functions that may be relevant, or not, to a given Clifford circuit design problem. The above examples may be used exclusively, or in combination with each other, along with other examples not listed.

In some embodiments, such as for Calderbank-Shor-Steane (CSS) code syndrome measurement circuits built comprising CNOT gates, one of the error types of concern is the propagating error type (e.g., X-type errors when measuring X stabilizers). For this purpose, it may be useful to consider the restricted bit matrices $p^{(k)}|_X$, in order to decrease the size of the symbolic bit-matrices $\overline{C}^{(k)}$.

An Iterative Solving Approach to Encoding a Clifford Circuit Design Problem as an SMT Decision Problem A circuit with depth N on n qubits with w possible gates at each time step, has at most N(w+q) distinct fault locations. In some embodiments of a system that encodes a Clifford circuit design problem as an SMT decision problem, such as those described above, an SMT formula such as IsVFlag ($\{X_{ij}\}, \{P_i\}, \{\text{IsFlag}_i\}$) for an SMT protocol of said system may be constructed, which evaluates to 1 if and only if the found circuit is v-flag. However, this formula may have size (number of clauses in the logical AND) that scales with the number of fault locations in the circuit. Specifically, there are up to $$\sum_{t=1}^{v} \binom{N(w+q)}{t}$$

distinct fault combinations which give constraints in IsVFlag($\{X_{ij}\}, \{P_i\}, \{\text{IsFlag}_i\}$). This large number of possible fault combinations may result in a large SMT decision problem, which is difficult and time-consuming to construct. To address this problem, some embodiments of a system that encodes a Clifford circuit design problem as an SMT decision problem may use an iterative approach to solve for the v-flag property.

Figure 3:
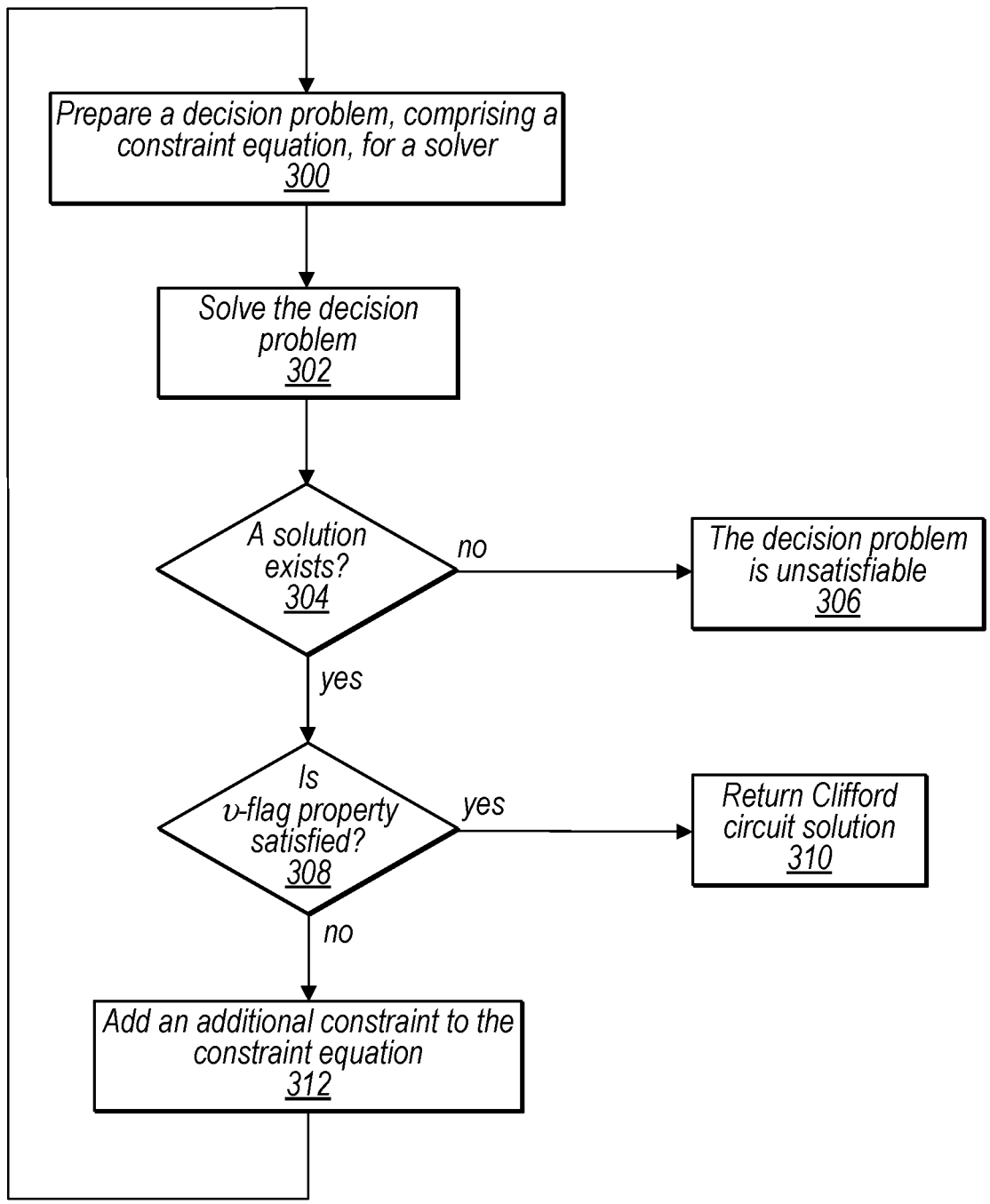
FIG. 3 is a flow diagram illustrating a method of iterative solving for a v-flag property of a Clifford circuit design problem such that it may be encoded as a decision problem for a solver, according to some embodiments.

FIG. 3 is a flow diagram illustrating a method of iterative solving for a v-flag property of a Clifford circuit design problem such that it may be encoded as a decision problem for a solver, according to some embodiments.

In block 300, a decision problem for a solver is prepared with a given constraint equation. Such a process may be described by FIG. 1A, blocks 100-108. In some embodiments, the decision problem is an SMT decision problem, constructed via an SMT protocol for a given Clifford circuit design problem, and the solver is an SMT solver. The first time going through block 300, preparing a decision problem for a solver may involve constructing a constraint equation, such as F$_{SMT}$ described above, which may comprise one or more constraints, but none pertaining to fault-tolerance. As it will be described in the remaining blocks of FIG. 3, fault-tolerance may then be solved for iteratively through a process of checking that the v-flag property is satisfied after receiving one or more solutions from the solver. The construction of constraint equation F$_{SMT}$ without any fault-tolerant constraints may resemble $$F_{SMT} = (\overline{O} = \overline{C}).$$

The decision problem is then solved in block 302. In block 304, if no solution exists, then, in block 306, the decision problem is deemed unsatisfiable and is aborted, according to some embodiments. If, however, at least one solution does exist, then it is checked that the v-flag property is satisfied is block 308. In some embodiments, the v-flag property may then be checked for all sets of t≤v errors occurring at t distinct fault locations. These sets of errors may correspond to the clauses within IsVFlag({$X_{ij}$}, {$P_i$}, {IsFlag$_i$}), which is described above. If any set ($k_i$, $e_i$, $e'_i$, $\overline{S}_i$):i∈[t]} is found to violate the v-flag constraint, this may be described in terms of setting 'IsNotTFlagFaultTolerant' equal to 1, which was also described above:

IsNotTFlagFaultTolerant({($k_i,e_i,e'_i,\overline{S}_i$):i∈[t]})=1.

In some embodiments, if the v-flag property is satisfied, then, as shown above, 'IsVFlag,'

$$IsVFlag(\{X_{ij}\}, \{P_i\}, \{IsFlag_i\}) = \bigwedge_{t \leq v} \bigwedge_{\{(k_i,e_i,e'_i,\overline{S}_i):i\in[t]\}} \neg IsNotTFlagFaultTolerant,$$

returns a 1, and the solver returns a Clifford circuit solution in block 310. In some embodiments, this step may also be described by block 110 in FIG. 1A. If, however, the v-flag property is not satisfied, then an additional constraint may be added to the constraint equation in block 312 such that the constraint equation is updated and fed back into the SMT protocol, in block 300. In some embodiments, the additional constraint may be defined as AdditionalConstraint=¬IsNotTFlagFaultTolerant({($k_i$, $e_i,e'_i,\overline{S}_i$):i∈[t]}), which is then added to the constraint equation $F_{SMT}$, which may be updated as $F_{SMT} \leftarrow F_{SMT} \wedge$ AdditionalConstraint.

The system of encoding a Clifford circuit design problem as an SMT decision problem adds the additional constraint and resubmits the problem with the additional constraint to the solver, and the solver then re-solves the updated constraint equation $F_{SMT}$ in block 302. This process may be repeated until either the decision problem is shown to be unsatisfiable, which also may be referred to as being "undecidable," or no fault combinations are present in the Clifford circuit solution which violate the v-flag property. In such embodiments, this iterative solving approach ensures that the Clifford circuit solution complies with the v-flag property.

In some embodiments, an iterative solving approach, such as the ones described above, may provide increased efficiency over specifying all constraints individually within the SMT protocol. As a first example, if two faults locations are considered to be sufficiently isolated from each other within the circuit solution such that the two faults may not "flag" the same flag qubit during a given time step, specifying an individual constraint for each of those two fault scenarios in addition to a constraint in which the combination of both faults also flags may be considered as redundant, and an iterative solving approach may be preferred.

Now that embodiments of encoding a circuit design problem into a decision problem have been introduced, the next section will describe embodiments of a Clifford circuit design problem pertaining to preparation of fault-tolerant magic states, such as Hadamard magic states, in a quantum color code.

Fault-Tolerant Hadamard Magic State Preparation in a Quantum Color Code: An Example of a Clifford Circuit Design Problem One approach to implementing quantum algorithms on a universal fault-tolerant quantum computer is to use magic state distillation (MSD) in combination with lattice surgery techniques. Alternative approaches to MSD for achieving universality, such as code-switching, may also be applied. However, such alternative approaches are not always compatible with 2D quantum hardware constraints and have been shown to require larger resource overhead costs in their implementation. In some such examples, T-type magic states (with |T⟩ =(|0⟩ +$e^{i\pi/4}$|1⟩ )/$\sqrt{2}$) may be used as a resource state to fault-tolerantly implement logical T gates. For example, |T⟩ states may be prepared by first encoding several |T⟩ states in given distance (e.g. d=1) surface codes using non-fault-tolerant methods and growing the codes to a final distance d'≫1. Afterwards, such states encoded in a distance d' surface code may be injected in an MSD protocol to distill them to a target logical failure rate determined by the size of the quantum algorithm being implemented. However, since the growing scheme is not fault-tolerant, a single fault (in the input |T⟩ state) may result in a logical error in the injected magic states prior to the implementation of the MSD protocol. Consequently, many rounds of MSD are required, where each operation may be encoded in a large distance surface code in order to generate high fidelity magic states such that the generated high fidelity magic states may be used in a quantum algorithm.

In contrast, an alternative approach to overcome this problem is put forth in the embodiments described herein. In some embodiments, the relation between T-type magic states and H and S, or Hadamard and phase, gates may be used, in which |T⟩ =($e^{i\pi/8}$HS$^\dagger$|H⟩ ). In some such embodiments, an encoded |H⟩ -type magic state with code distance d>1 is prepared using a fault-tolerant protocol, meaning that any errors arising from at most (d−1)/2 faults may not lead to a logical error. This is considered to be a bottom-up approach without the use of MSD. Such protocols may make use of the quantum color code, in which the logical H gate is transversal, along with other Clifford operations. This may be advantageous to some Clifford circuit design problems, according to some embodiments.

In some embodiments, such a protocol comprises a physical (distance d=1)|H⟩ state which is grown, using non-fault-tolerant methods, to a d'>1 encoded |H⟩ state. Subsequently, the grown state is injected in a bottom-up fault-tolerant magic state preparation protocol, where (d−1)/2 rounds of transversal logical Hadamard measurements and color code syndrome measurements are performed. If any of the syndrome or flag-qubit measurements during the magic state preparation protocol are non-trivial, indicating the presence of at least one fault, the protocol is aborted and begins anew, according to some embodiments. FIG. 4A is an example flow diagram of the sequence of such an embodiment.

FIG. 4A is a flow diagram illustrating a process of preparing a fault-tolerant Hadamard magic state via a bottom-up procedure, according to some embodiments.

In bottom-up fault-tolerant magic state preparation protocol 400, an example of how to construct v-flag circuits $H_m^{(d)}$ and ED$^{(d)}$ for measuring logical Hadamard magic states, $H_L$, and stabilizers of the quantum color code, respectively, is shown. In some embodiments, the process begins with |H$_L$⟩ $_{n.f.}$, a non-fault-tolerant magic state grown using non-fault-tolerant methods. Beginning, therefore, with circuits $H_m^{(d)}$ 402 and ED$^{(d)}$ 404, the grown |H$_L$⟩ $_{n.f.}$ state is injected into bottom-up fault-tolerant magic state preparation protocol 400. Over the course of (d−1)/2 rounds of transversal logical Hadamard measurements and color code syndrome measurements, the bottom-up fault-tolerant magic state preparation protocol 400 constructs fault-tolerant state $|H_L\rangle_f$ from $|H_L\rangle_{n,f}$, resulting in circuits $H_m^{(d)}$ 406 and $ED^{(d)}$ 408. According to some embodiments, and as described above, this occurs if and only if the syndrome and flag-qubit measurements made during bottom-up fault-tolerant magic state preparation protocol 400 are all measured trivially, meaning that there was no indication of the presence of a fault.

In some such embodiments, bottom-up fault-tolerant magic state preparation protocol 400 may reduce overhead costs compared to some MSD protocols, which may, in turn, achieve a logical failure rate below a desired threshold. One reason for the overhead reduction when using the embodiments described in this disclosure is due to the fault tolerant nature of the preparation circuits, which can be implemented using physical Clifford operations. In some embodiments, once the above protocol is complete, the prepared magic states may be injected in an MSD protocol if higher fidelities of the prepared magic states are required for a given Clifford circuit design problem, such as a quantum algorithm. In such embodiments, only a small number of rounds of MSD may be required due to the already high fidelity of the prepared magic states according to the above protocol.

Although bottom-up protocols have shown promising results in providing low cost methods for preparing high fidelity magic states, one of the main challenges stems from finding flag-based circuits with the targeted fault-tolerant properties. Firstly, in some embodiments pertaining to preparing $|H\rangle$-type magic states encoded in a distance d color code, v-flag circuits may be required for measuring the circuits $H_m^{(d)}$ and $ED^{(d)}$, respectively, as shown in FIG. 4A, for example. Secondly, for some hardware architectures, the qubits in such flag-based circuits are constrained to be laid out on a two-dimensional plane, where the qubits may only interact with their nearest neighbors. Thirdly, it is advantageous that the degree of the interactions between qubits remains low. This may also be referred to as connectivity constraints. In the following section of the disclosure, it is shown how some embodiments of protocols introduced above may be used to construct $H_m^{(d)}$ and $ED^{(d)}$ circuits in the quantum color code with the use of a constraint equation designed to construct v-flag circuits that comply with nearest-neighbor and low degree connectivity constraints imposed by some quantum hardware architectures.

Fault-Tolerant Hadamard Magic State Preparation in a Quantum Color Code: The Qubit Interaction Graph Continuing with the example above of constructing $H_m^{(d)}$ and $ED^{(d)}$ circuits with n qubits in the quantum color code, the n qubits may be denoted by a given set of integers 1 through n, or $[n]=\{1, \ldots, n\}$, and a subset of [n] may be designated as subset $A \subset [n]$ of qubits of the set [n] which are prepared in Pauli eigenstates, and measured. In some embodiments pertaining to $H_m^{(d)}$ and $ED^{(d)}$ circuits, this subset comprises flag qubits, ancilla qubits, and root ancilla qubits, which, in the embodiments described herein, may be referred to as the A-qubits. The data qubits are then [n]\A. Since, as described above, a target hardware may be a 2D device where only nearest-neighbor qubits can interact, a planar graph $G_{qubits}=([n], E)$ is created in which the vertices of the graph correspond to qubits, and the edges of the graph are between qubits that support two-qubit gates. (A more in-depth explanation of vertices and edges will be given in the following paragraphs.) In some embodiments, this graph may be referred to as the qubit interaction graph. An example of such a qubit interaction graph is shown in FIG. 4B.

FIG. 4B illustrates an example of how, for a given Clifford circuit design problem of determining how a Hadamard magic state may be implemented via one or more Clifford circuits using a quantum color code, gate connectivity information to be used as a constraint in the SMT protocol may be taken from a qubit interaction graph that has been designed for said Clifford circuit design problem, according to some embodiments.

FIG. 4B depicts qubit interaction graph 410, which describes the layout and gate connectivity of a given distance 3 quantum color code, according to some embodiments. The three "colors," or stabilizer code sections, of the quantum color code shown in FIG. 4B may be referred to as light gray 420, medium gray 422, and dark gray 424, respectively. As described above, qubits are placed at vertices of qubit interaction graph 410. A certain selection of the qubits shown in FIG. 4B may also be assigned a role, or functionality, at this step, according to some embodiments. For instance, data qubits 430, 431, 432, 433, 434, 435, and 436, by definition of a quantum color code, are assigned to the intersection point vertices of the three color sections of qubit interaction graph 410, as shown in FIG. 4B. Also in FIG. 4B, other qubits may remain unassigned at this step, such as unassigned qubits 440, 441, 442, 443, 444, 445, 446, 447, 448, and 449. (A procedure for further qubit role assignments will be discussed in FIG. 4C.) Edges of qubit interaction graph between qubits support two-qubit gates, as described above. Examples of edges, such as edge 426 and edge 428, have been labeled in FIG. 4B as well. Qubit interaction graphs, such as qubit interaction graph 410, may also be designed with certain constraints in mind. For example, a qubit interaction graph such as qubit interaction graph 410 may ensure that no two data qubits share an edge, as two-qubit gates are prohibited between data qubits, according to some embodiments. The layout of qubits and two-qubit gates, which may also be referred to as vertices and edges, is used to construct gate connectivity information, which leads to the definition of a gate set such as gate set $\{G_i\}$ 412 shown in FIG. 4B. This will be further described in the following paragraphs.

In some embodiments, a qubit interaction graph such as qubit interaction graph 410 may be designed by hand and then provided as input to an SMT solver along with additional constraint and bit-matrix representation information pertaining to a given Clifford circuit design problem, wherein the qubit interaction graph comprises gate connectivity information, which may also be referred to as gate connectivity constraints. In other embodiments, the designing of a qubit interaction graph such as qubit interaction graph 410 may be performed in software that then provides this design as input to an SMT solver. In some embodiments, certain aspects of the design of a qubit interaction graph may be provided as input to an SMT solver, and the SMT solver may design the layout of the qubit interaction graph based in part on the design aspects input. Such aspects may comprise constraints for the construction of $H_m^{(d)}$ and $ED^{(d)}$ circuits, such as a constraint for a low degree of connectivity, also referred to as interaction, between qubits. A given qubit interaction graph may also ensure that no two data qubits share an edge, as described above. Also as described above, constraints for a given constraint equation for an SMT solver may be used in combination with one another, or separately. A given constraint equation may be customized for a given Clifford circuit design problem. The constraints pertaining to the design of a qubit interaction graph may similarly be used as input when designing the qubit interaction graph by hand, when performing the design in software, or when providing constraints to an SMT solver. Furthermore, it is advantageous to provide constraints that aid in allowing an SMT solver to provide a Clifford circuit solution that, in the absence of faults, should be possible to implement on 2D quantum hardware.

Once a qubit interaction graph, such as qubit interaction graph 410, has been designed, a set of gates for the Clifford circuits may be assembled. As described above, the Clifford operations for $H_m^{(d)}$ and $ED^{(d)}$ may be implemented using preparation and measurement in the Pauli X and Z bases and CNOT gates, producing a gate set $\{G_i\}=\{G_1, \ldots, G_w\}$ that consists only of CNOT gates, according to some embodiments. In FIG. 4B, this may refer to gate set $\{G_i\}$ 412, and is based at least in part on the gate connectivity information extracted from qubit interaction graph 410.

Gate sets such as gate set $\{G_i\}$ 412 may also be described by the following: for each edge $(u, v) \in E$ where $u, v \in A$, $CNOT_{u,v}$ and $CNOT_{v,u}$ are added to the given gate set $\{G_i\}$. For edges $(u, v) \in E$ in which one of $u, v$ is a data qubit ($u \notin A$ or $v \notin A$), a CNOT gate is only added between a given non-data qubit E A and the given data qubit. Furthermore, in some embodiments, the $H_m^{(d)}$ operation may be viewed as comprising one or more Clifford operations only when data qubit wires are conjugated by the T gates. In some embodiments, this may imply that a $H_m^{(d)}$ circuit may require T gate conjugation on the data qubits. However, as this does not affect the fault-tolerant properties of the circuit, the protocols described herein may be applied to design the conjugated circuit, following the application of the T conjugation to the resulting circuit.

It may be noted at this point that, in some embodiments, controlled-Hadamard gates are equivalent to CNOT gates up to conjugation by a single-qubit non-Clifford gate. These single-qubit corrections may not propagate errors and may be placed at the beginning and end of the $H_m^{(d)}$ circuit. In such embodiments, when deriving fault-tolerant $H_m^{(d)}$ circuits, it suffices to treat all controlled-Hadamard gates as CNOT gates.

Fault-Tolerant Hadamard Magic State Preparation in a Quantum Color Code: A Constraint Equation for Logical Hadamard Circuit and Stabilizer Circuit Synthesis FIG. 4C illustrates an example of how, for a given Clifford circuit design problem of determining how a Hadamard magic state may be implemented via one or more Clifford circuits using a quantum color code, the SMT protocol comprises gate connectivity information, bit-matrix descriptions of the targeted quantum computations, and one or more additional constraints specific to the Clifford circuit design problem such that the SMT solver returns Hadamard magic state circuit $H_m^{(d)}$ and corresponding error detection circuit $ED^{(d)}$, according to some embodiments.

Figure 4C:
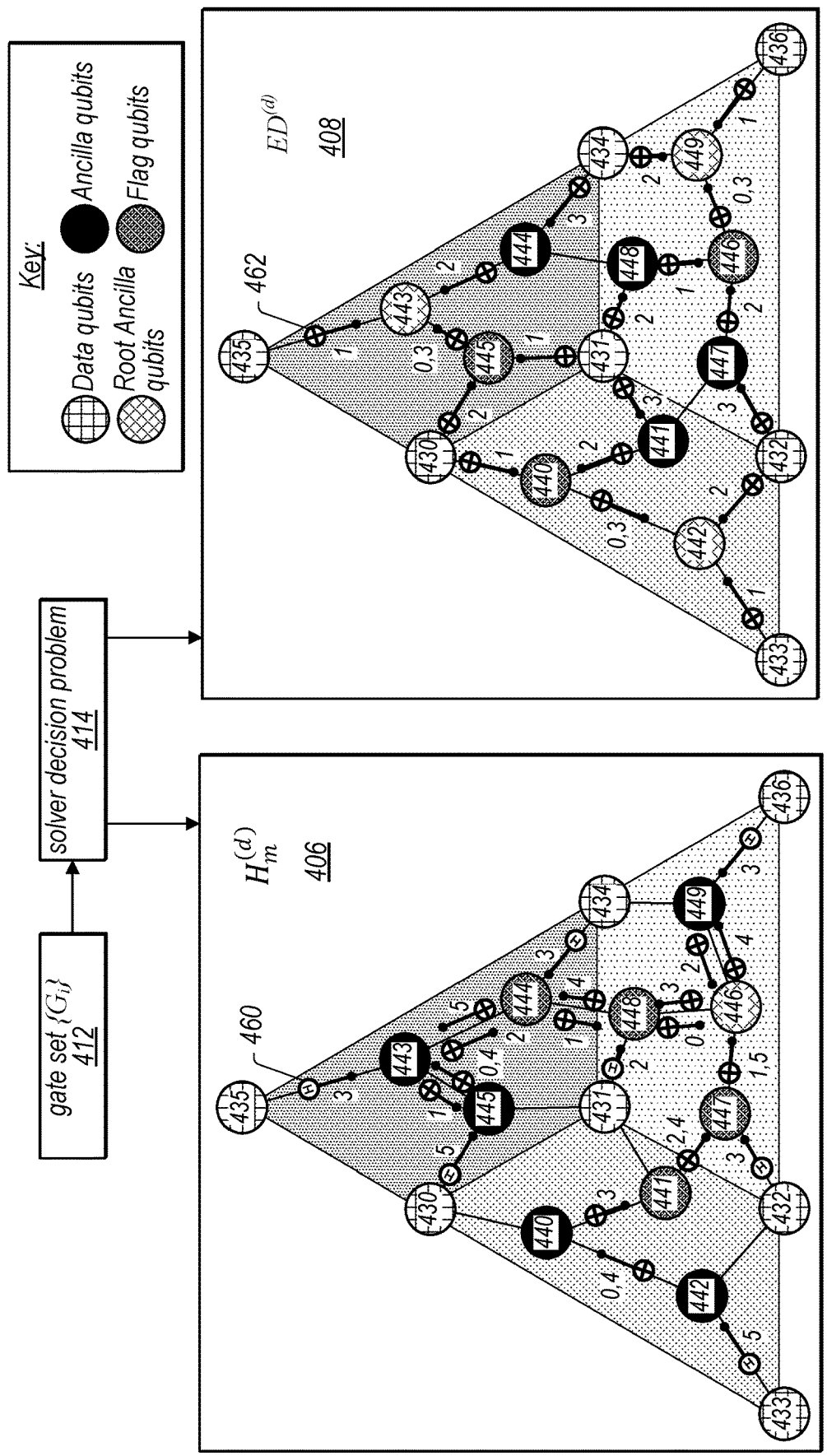
FIG. 4C illustrates an example of how, for a given Clifford circuit design problem of determining how a Hadamard magic state may be implemented via one or more Clifford circuits using a quantum color code, the SMT protocol comprises gate connectivity information of the qubit interaction graph, bit-matrix descriptions of the targeted quantum computations, and one or more additional constraints specific to the Clifford circuit design problem such that the SMT solver returns Hadamard magic state circuit $H_m^{(d)}$ and corresponding error detection circuit $ED^{(d)}$, according to some embodiments.

FIG. 4C describes an embodiment in which gate set $\{G_i\}$ 412 is provided to an SMT solver as part of an encoded solver protocol, e.g. blocks 100-108 of FIG. 1A. Solver decision problem 414 then returns two Clifford circuit solutions, e.g. block 110 of FIG. 1A, in the forms of $H_m^{(d)}$ 406 and $ED^{(d)}$ 408, which were introduced in FIG. 4A. In some embodiments, the data qubits, such as data qubits 430-436 in FIG. 4B, are assigned their roles during the qubit interaction graph step, and other qubits, such as unassigned qubits 440-449, are assigned their roles by the SMT solver. Additionally, the SMT solver may decide the time steps in which CNOT gates are measured within $H_m^{(d)}$ 406 and $ED^{(d)}$ 408, and which time step the logical Hadamard measurement in each of the stabilizer code sections light gray 420, medium gray 422, and dark gray 424, such as logical Hadamard measurement 460, is made within $H_m^{(d)}$ 406.

These decisions of the SMT solver are based in part on constraint equations (or formulas) of the SMT protocol that are provided to the SMT solver, as shown in blocks 100-108 of FIG. 1A. The following paragraphs describe embodiments of such types of constraint equations, and a particular focus may be given to constraints pertaining to logical Hadamard circuit and stabilizer circuit synthesis.

For example, in some embodiments the SMT solver is constrained to assigning each qubit of unassigned qubits 440-449 of qubit interaction graph 410 exactly one role in circuits $H_m^{(d)}$ 406 and $ED^{(d)}$ 408 respectively, e.g. root ancilla qubit, ancilla qubit, or flag qubit. Examples of root ancilla qubit role assignments are shown for qubits 442, 443, and 449 in circuit $ED^{(d)}$ 408. Examples of ancilla qubit role assignments are shown for qubits 441, 444, 447, and 448 in circuit $ED^{(d)}$ 408. Examples of flag qubit role assignments are shown for qubits 440, 445, and 446 in circuit $ED^{(d)}$ 408.

In some embodiments, the SMT solver may be constrained to assigning the role of root ancilla qubit to only one qubit in each of the stabilizer code sections light gray 420, medium gray 422, and dark gray 424. This is the case for circuit $ED^{(d)}$ 408, in which qubits 442, 443, and 449 have been assigned the role of root ancilla qubit. However, a different constraint exists for the circuit $H_m^{(d)}$ 406, in which only one role of root ancilla qubit has been assigned for the entire circuit, e.g. qubit 446.

As a final example, in some embodiments the SMT solver is constrained to assign at most one gate to act on a respective qubit during a given time step. However, other constraints and combinations of constraints may also be applied in such embodiments, and the following paragraphs should not be read as an exhaustive list. The SMT protocol may comprise some or all of the constraint equations discussed above. Some of these constraints may be referred to as 'IsValidRoleAssignment,' 'GateExclusion,' 'HasDesiredEffect,' and 'IsVFlag,' such that the combined constraint equation $F_{SMT}$ may be written as:

$$F_{SMT} = \text{IsValidRoleAssignment} \wedge \text{GateExclusion} \wedge \text{HasDesiredEffect} \wedge \text{IsVFlag}.$$

However, this list of constraints should not be read as an exhaustive list, and constraints may be added or removed to constraint equation $F_{SMT}$ according to the given Clifford circuit design problem. It should be noted that the iterative solving approach described above may also be applied to $F_{SMT}$. The descriptions of 'IsValidRoleAssignment,' 'GateExclusion,' and 'HasDesiredEffect' will now be expanded upon in following paragraphs. The constraint 'IsVFlag' pertains to v-flag constraints, which was already described above.

In some embodiments, a constraint within $F_{SMT}$ such as 'IsValidRoleAssignment' may pertain to role assignment of qubits of the qubit interaction graph, such as qubit interaction graph 410. In embodiments, such as FIGS. 4A-4C, pertaining to construction of $H_m^{(d)}$ and $ED^{(d)}$ circuits, the A-qubits, or qubits 440, 441, 442, 443, 444, 445, 446, 447, 448, and 449, may be assigned exactly one of three roles in each of the $H_m^{(d)}$ 406 and $ED^{(d)}$ 408 circuits: ancilla qubit, root ancilla qubit, or flag qubit. The functionality of a flag qubit is related to the v-flag circuit description already provided above. The functionalities of ancilla qubits and root ancilla qubits will be described in the following paragraphs.

In some embodiments, the parity of the measurement outcomes of the root ancilla qubit as well as all other ancilla qubits which are not flag qubits is used to obtain the measurement outcome for the operator being measured. Specifically, the measured operator, which is either a code stabilizer section, such as light gray 420, medium gray 422, and dark gray 424, for the $ED^{(d)}$ 408 circuit, or the logical Hadamard measurement for the $H_m^{(d)}$ 406 circuit, has a measurement outcome encoded as the product of the measurement outcomes across all the ancilla qubits (including the root ancilla qubit).

In some embodiments, the root ancilla qubit is distinguished from the other ancilla qubits since, for $H_m^{(d)}$ 406 and X-type stabilizer circuits in $ED^{(d)}$ 408, it is initialized in a +1 X eigenstate, whereas the other ancilla qubits are initialized in +1 Z eigenstates. In some embodiments, an SMT solver may choose which qubits have the role of flag, ancilla, or root ancilla qubit based on constraints provided within the SMT protocol and by consequentially creating Boolean variables $\{IsFlag_i: i \in [A]\}$ and $\{IsRoot_i: i \in [A]\}$. This may be encoded as the following: for a qubit i, if i is a root ancilla qubit, then $IsRoot_i=1$, $IsFlag_i=0$. If i is a non-root ancilla qubit, then $IsRoot_i=0$, $IsFlag_i=0$. If i is a flag qubit, then $IsRoot_i=0$, $IsFlag_i=1$. Within the overall constraint equation, a constraint which sets these requirements may be defined by 'IsValidRoleAssignment,' which evaluates to 1 if and only if there is exactly one root ancilla qubit in each code stabilizer section for the syndrome measurement circuits (or for the entire protocol in the case of the $H_m^{(d)}$ 406 circuit), and that the ancilla qubits, root ancilla qubits, and flag qubits are all distinct.

Furthermore, in some embodiments for an X-type stabilizer measurement and logical $H_L$ measurement, the root ancilla qubit may be prepared in a +1 eigenstate of the X operator. It then follows that the non-root ancilla qubits and flag qubits may be prepared in a +1 eigenstate of the Z operator. Therefore, the root and non-root ancilla qubits may be measured in the X basis, and the flag qubits in the Z basis. In some embodiments therefore of a Z-type stabilizer measurement, the X and Z bases may be all swapped: for an Z-type stabilizer measurement and logical $H_L$ measurement, the root ancilla qubit may be prepared in a +1 eigenstate of the Z operator. It then follows that the non-root ancilla qubits and flag qubits may be prepared in a +1 eigenstate of the X operator. Finally, the root and non-root ancilla qubits may therefore be measured in the Z basis, and the flag qubits in the X basis. Here, as in the above description, it is clarified that the measurement bases of each qubit comprises $\{P_i\}$, with the understanding that this denotes a pair of symbolic Boolean values ($IsMeasuredInXBasis_i$, $IsMeasuredInZBasis_i$) as explained above. In such embodiments, a given qubit's preparation and measurement basis, $\{P_i\}$, is the same.

In some embodiments, a constraint within $F_{SMT}$ such as 'GateExclusion' may pertain to constraints such as IsValidCircuit($\{X_{ij}\}$) and the example embodiments described above. In such embodiments, $\{X_{ij}\}$ may refer to gate-time encoding variables $\{X_{ij}^{(H)}\}$ and $\{X_{ij}^{(ED)}\}$ for $H_m^{(d)}$ 406 and $ED^{(d)}$ 408 circuits, respectively, which are set according to a given number of time steps each circuit is measured to generate syndrome measurements. Then, according to the relation $\overline{C}=\overline{O}$, which was introduced above, the bit-matrix $\overline{O}$ describes the target Clifford operation to be implemented. In embodiments in which an SMT solver chooses which qubits are flag qubits, ancilla qubits, and root ancilla qubits, the SMT protocol may prepare a symbolic matrix for the SMT solver which may represent $\overline{O}$, also as detailed in above paragraphs. Utilizing variables $P_i$ for the preparation and measurement basis, as described above, a bit-vector $S_i$ is constructed for each qubit $i \in A$, which describes the initial stabilizer of the input state acting on this given qubit. As this depends on $P_i$, a symbolic bit-vector may be used so that it represents the appropriate initial Pauli stabilizer depending on the role of the given qubit, according to some embodiments.

In some embodiments, to understand how to construct the targeted symbolic bit-matrix $\overline{O}$, it may be helpful to consider its four quadrants in which the upper left quadrant may correspond to X to X propagation and the lower right quadrant may correspond to Z to Z propagation, which may correspond to reduced bit-matrices $\overline{O}|_X$ and $\overline{O}|_Z$, respectively. The off-diagonal quadrants may then be set to 0. In some embodiments comprising only CNOT gates, it follows that $\overline{O}|_X = \overline{O}|_Z^T$ due to the symmetry of CNOT gate propagation for X and Z type Paulis. By this symmetry, it may be necessary to specify only one of the two quadrants. The following example follows how to construct the $\overline{O}|_X$ quadrant. It follows that a similar example may be shown for the construction of $\overline{O}|_Z$.

Furthermore, for the construction of $\overline{O}|_X$, it may not be necessary to fully specify $\overline{O}|_X$, as the value of $(\overline{O}|_X)_{j,i}$ may not matter for any i which may be a non-root ancilla qubit or a flag qubit with $j \neq i$, according to some embodiments of the particular input state that is chosen. The off-diagonal values $(\overline{O}|_X)_{j,i}$ for non-root columns i may be set arbitrarily by right-multiplying $\overline{O}$ by $\overline{CNOT_{i,j}}$. In some embodiments, this leads to the $CNOT_{i,j}$ gates having no effect on the input state, since the non-root qubits are initialized in the $|0\rangle$ state, and since the symbolic bit-matrix $\overline{O}$ is only specified up to right-multiplication by an arbitrary Clifford operation which may, by definition, stabilize the incoming state. Therefore, in some embodiments, these rows of the symbolic bit-vector for this column may be set to a wildcard value *.

In some embodiments, the remaining columns of $\overline{O}|_X$ are then associated with the root ancilla qubits of all stabilizers and the data qubits, which must be constrained such that the initial X stabilizer on the root ancilla qubit must propagate to an X type Pauli operator supported on all ancilla qubits, comprising as well the root ancilla qubit, in its stabilizer, along with the data qubits comprised in that stabilizer. Therefore, for each $i \in A$, if $IsRoot_i=1$, the $i^{th}$ column of $\overline{O}_{XX}$ may be set equal to the vector supported on all the root and non-root ancilla qubits and data qubits of this stabilizer. This vector may be constructed symbolically using the $IsRoot_i$, $IsFlag_i$ variables to determine whether it is supported on an A-qubit, according to some embodiments. Furthermore, in some embodiments, for all the data qubits $i \in [n] \backslash A$, there should be no propagation of X errors from the data qubits onto the A-qubits, as the data qubits may be the target of CNOT gates. Therefore, for each $i \in [n] \backslash A$, the $i^{th}$ column of $\overline{O}_{XX}$ should be zero except for a one in the $i^{th}$ row, according to some embodiments.

In some embodiments, a constraint within $F_{SMT}$ such as 'HasDesiredEffect' may pertain to the relation $\overline{C}=\overline{O}$. When going column-by-column through the restricted bit-matrix columns of $\overline{C}|_X$, for the $i^{th}$ column, a symbolic bit-vector is constructed which is determined symbolically by $IsRoot_i$ and $IsFlag_i$, as discussed above, using standard If-Then-Else support from a given SMT solver. Then, the non-wildcard rows of this symbolic bit-vector may be set equal to the corresponding rows of the symbolic bit-matrix of the entire circuit as computed by the product-sum formula $\overline{C}=\prod_{j=1}^{N}(I \otimes \otimes_{i=1}^{w} X_{ij} \Delta \overline{G}_i)$, as described above.

Finally, it should be noted by example of FIG. 4C that qubit role assignments, gate assignments, and gate measurement time step assignments may be the same or different across circuits $H_m^{(d)}$ 406 and $ED^{(d)}$ 408. For example, qubit 443 has been assigned the role of ancilla qubit in $H_m^{(d)}$ 406 and the role of root ancilla qubit in ED$^{(d)}$ 408. The edge between qubit 443 and data qubit 435 is used for a logical Hadamard measurement at time step 3 in H$_m^{(d)}$ 406, but is used for a CNOT gate measurement at time step 1 in ED$^{(d)}$ 408. Additional examples may be taken from FIG. 4C.

Teleportation of an Encoded Magic State from a Quantum Color Code to a Quantum Surface Code In some of the embodiments described above, encoding a Clifford circuit design problem as an SMT decision problem may be used to fault-tolerantly prepare |H⟩-type magic states encoded in a quantum color code. However, it may be advantageous to utilize a protocol to teleport said magic states to a quantum surface code, as quantum surface codes may offer improved performance for quantum memory and computation implemented via lattice surgery, according to some embodiments. It may additionally be advantageous as then the prepared magic states may be used in a competitive scheme for universal fault-tolerant quantum computation.

The following section pertains to embodiments of a protocol for teleporting states encoded in a quantum color code into states encoded in a quantum surface code. Such a protocol may require the use of lattice surgery techniques comprising gauge fixing, wherein gauge fixing results in a merged surface and color quantum code. This may also be referred to as a merged surface-color code, and it should be understood that such a merged code comprises a quantum surface code portion and a quantum color code portion. The two-qubit teleportation step is then terminated after the codes are split up again. In some embodiments of such a protocol, additional data qubits, such as routing qubits, are not required for the merged surface-color code besides the already existing qubits in the quantum surface code and quantum color code portions of the merged code. Additionally, the protocol may comprise a decoder for the merged surface-color code, which be the focus of the next section.

Once a circuit solution of an SMT decision problem for a given Clifford circuit design problem of encoding a magic state using a quantum color code has been implemented using the quantum color code, the encoded magic state may be teleported from the quantum color code to a quantum surface code via lattice surgery, according to some embodiments. During lattice surgery, the quantum color code and quantum surface code may merge into a merged surface-color code, which then additionally requires a decoding process specific to a merged surface-color code. In some of such embodiments, this process is described by FIG. 5.

Figure 5:
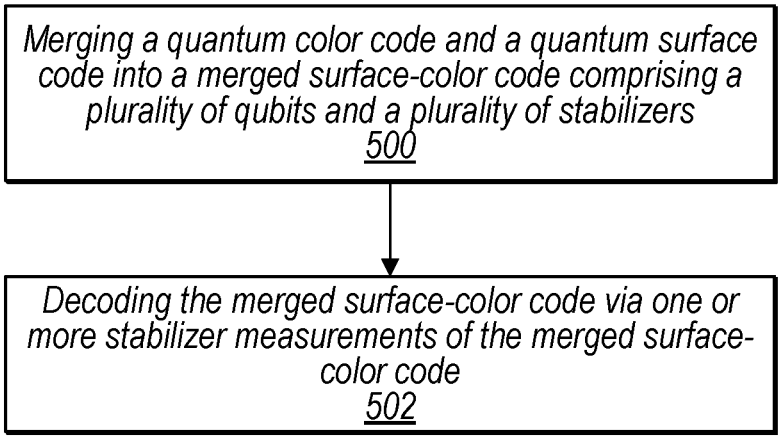
FIG. 5 is a flow diagram illustrating a process of merging a quantum color code and a quantum surface code into a merged surface-color code and decoding one or more stabilizer measurements of said merged surface-color code, according to some embodiments.

FIG. 5 is a flow diagram illustrating a process of merging a quantum color code and a quantum surface code into a merged surface-color code and decoding one or more stabilizer measurements of said merged surface-color code, according to some embodiments.

In block 500, a quantum color code and a quantum surface code are merged into a merged surface-color code that comprises qubits and stabilizers. This merging may occur via lattice surgery in which an encoded magic state is prepared in a quantum color code using a bottom-up procedure without magic state distillation, according to some embodiments. The encoded magic state is then teleported from the quantum color code to a quantum surface code, during which process the merging of the surface and color codes occurs. (This will be further detailed in FIG. 6 and FIG. 7.) In some embodiments, the process described in FIG. 1A for encoding a Clifford circuit design problem as an SMT decision problem may be used to implement a Clifford circuit for preparing a magic state in a quantum color code, which is then teleported to a quantum surface code via block 500. However, it should be understood that other methods of generating a magic state may be used and then applied using the embodiments described in FIG. 5.

The merged surface-color code is then decoded via one or more stabilizer measurements of the merged surface-color code in block 502. Error correction then comprises identifying one or more locations of non-trivial stabilizer measurement outcomes via minimum-weight perfect matching (MWPM), according to some embodiments. When one or more of those locations occur within the quantum surface code portion of the merged surface-color code such that a connectivity path must be mapped across both the quantum surface and color code portions of the merged surface-color code, a connectivity path is mapped such that its origin is at a first virtual stabilizer of the merged surface-color code and its terminus is at a second virtual stabilizer of the merged surface-color code. Finally, the error correction is performed onto selected qubits located at the border between the quantum surface code and quantum color code portions of the merged surface-color code that are located between the origin and the terminus of the connectivity path, according to some embodiments. Note that in some situations the minimum-weight perfect matching (MWPM) may identify paths between the locations of the non-trivial stabilizer measurement outcomes such that the connectivity path is mapped across the border of the quantum surface and color code portions of the merged surface-color code, as described above. In other situations, the minimum-weight perfect matching (MWPM) may identify paths or edges within the quantum surface code, in which case a different quantum surface code decoding technique may be used for the paths/edges that are fully within the quantum surface code.

Figure 6:
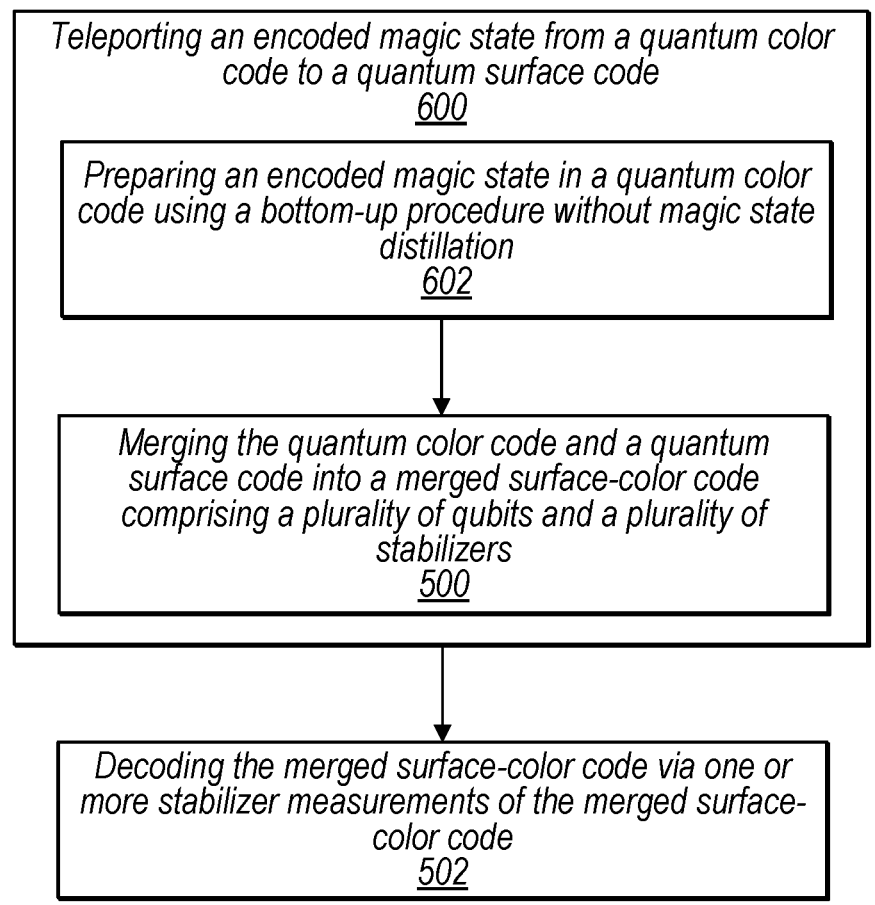
FIG. 6 is a flow diagram illustrating a process of teleporting an encoded magic state from a quantum surface code to a quantum color code, wherein the process of teleporting comprises merging the quantum color code and the quantum surface code into a merged surface-color code and decoding one or more stabilizer measurements of said merged surface-color code, according to some embodiments.

FIG. 6 is a flow diagram illustrating a process of teleporting an encoded magic state from a quantum surface code to a quantum color code, wherein the process of teleporting comprises merging the quantum color code and the quantum surface code into a merged surface-color code and decoding one or more stabilizer measurements of said merged surface-color code, according to some embodiments.

In some embodiments, block 500 of FIG. 5 is comprised within block 600 of FIG. 6, in which a magic state is encoded in a quantum color code and teleported to a quantum surface code. Block 602 describes the process of preparing said magic state using a bottom-up procedure without MSD, as described above. The prepared magic state is then teleported to the quantum surface code via block 500, in which the quantum surface and quantum color codes are merged. The merged surface and color quantum code may then be decoded in a series of stabilizer measurements in block 502. This process will be further detailed in FIGS. 7-15.

Figure 7:
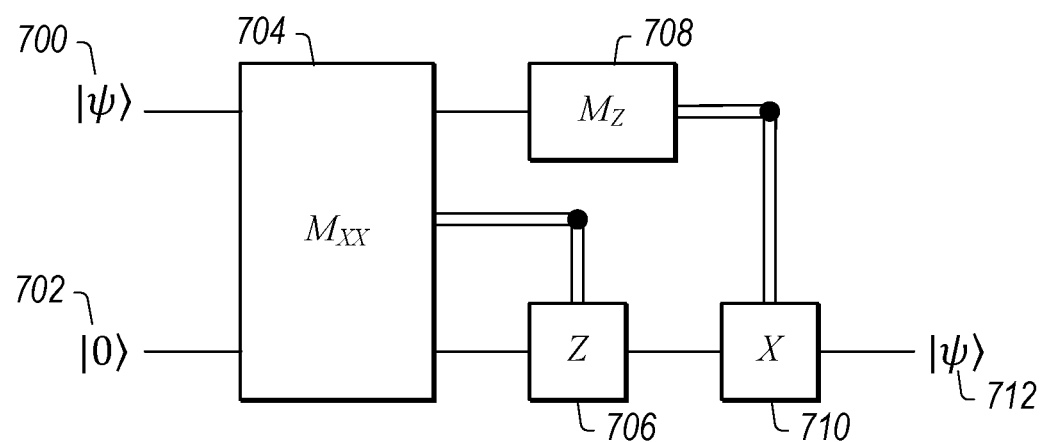
FIG. 7 illustrates a circuit diagram for teleporting a logical state $|\psi\rangle$ from a quantum color code to a quantum surface code, according to some embodiments.

FIG. 7 illustrates a circuit diagram for teleporting a logical state |ψ⟩ from a quantum color code to a quantum surface code, according to some embodiments.

The process of magic state teleportation from a quantum color code to a quantum surface code may further be described by the teleportation circuit shown in FIG. 7, according to some embodiments. More specifically, incoming logical state |ψ⟩ 700 is prepared in a quantum color code, and logical state |0⟩ 702 is prepared in a quantum surface code. In some embodiments, logical state |ψ⟩ 700 may represent a logical Hadamard magic state that has been prepared in a quantum color code. To implement a given circuit fault-tolerantly using the hardware constraints mentioned above, lattice surgery may be used to measure the two-qubit X⊗X operator, e.g. $M_{XX}$ 704. After measuring X⊗X, repeated rounds of error correction are performed on the merged code in order to prevent both time-like and space-like errors from giving the wrong parity of the measurement outcome. As such, a decoder is required to process the stabilizer syndrome measurements of the merged code during the lattice surgery protocol. FIG. 7 represents some embodiments in which two-qubit X⊗X operator is measured. However, other embodiments in which two-qubit Z⊗Z operator is measured in order to complete teleportation may be used and are therefore encompassed in the embodiments herein.

Additionally, when performing gauge fixing to merge the quantum surface and color codes, the X-operator measurements at the boundaries of the quantum surface code and quantum color code portions of the merged surface-color quantum code anticommute with some Z stabilizers, such as Z stabilizers 706, of the original portions of code (before the merge), causing them to merge into elongated stabilizers. (An example of a resulting merged surface-color code will be described in FIG. 8.) Also shown in FIG. 7, Z-operator measurements 708 are made on X stabilizers 710. Logical state $|\psi\rangle$ 712 then represents logical state $|\psi\rangle$ 700 which has been successfully teleported to a quantum surface code.

Figure 8:
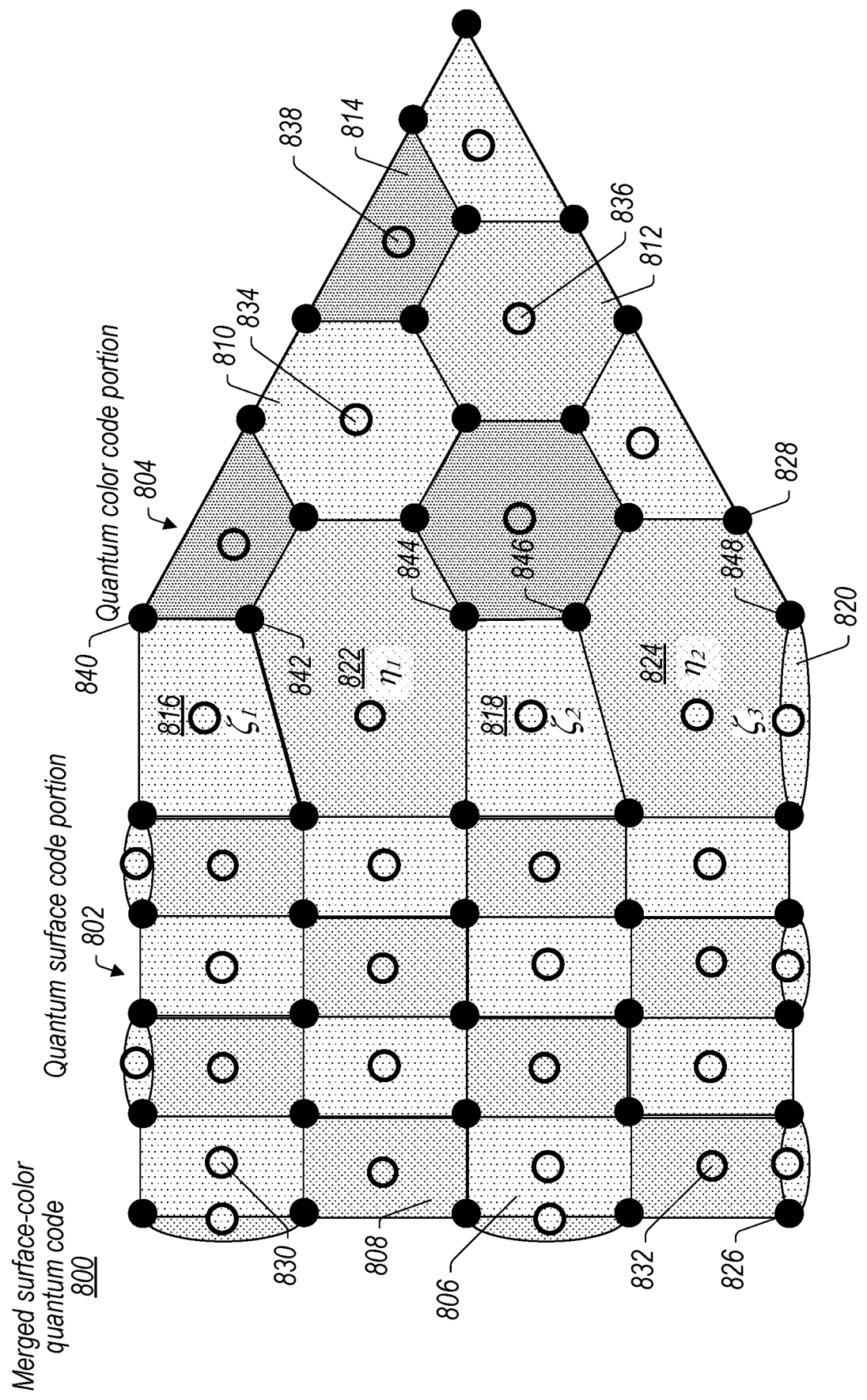
FIG. 8 illustrates an example of how a quantum surface code and a quantum color code may be merged via lattice surgery such that a merged surface-color code is created, according to some embodiments.

FIG. 8 illustrates an example of how a quantum surface code and a quantum color code may be merged via lattice surgery such that a merged surface-color code is created, according to some embodiments.

Merged surface-color quantum code 800 may have been merged via the processes described above and in FIGS. 5-7, according to some embodiments. Merged surface-color quantum code 800 comprises quantum surface code portion 802 and quantum color code portion 804. In the example embodiment shown in the figure, both quantum surface code portion 802 and quantum color code portion 804 are distance 5 CSS codes. However, other embodiments of distance d surface and color quantum code portions may also be merged according to the processes described above and in FIGS. 5-7, such as the distance 3 quantum surface codes shown in FIGS. 2A-2C and the distance 3 quantum color codes shown in FIGS. 4A-4C.

Merged surface-color quantum code 800 comprises the following types of stabilizers in quantum surface code portion 802: X-type stabilizers, such as X-type stabilizer 806, and Z-type stabilizers, such as Z-type stabilizer 808. In quantum color code portion 804 of merged surface-color quantum code 800, the three types of stabilizer generators, or stabilizer code sections, may be referred to as light gray, such as light gray stabilizer 810, medium gray, such as medium gray stabilizer 812, and dark gray, such as dark gray stabilizer 814. By definition of a quantum color code, X-type stabilizers and Z-type stabilizers are identical. It is noted that X-type stabilizers of quantum surface code portion 802 are given the same "color" as light gray stabilizers of quantum color code portion 804, and that Z-type stabilizers of quantum surface code portion 802 are given the same "color" as medium gray stabilizers of quantum color code portion 804. Also as described above, some embodiments of the magic state teleportation procedure result in elongated stabilizers at the border between quantum surface code portion 802 and quantum color code portion 804. In FIG. 8, this is shown via elongated X-type stabilizers 816, 818, and 820, with $\zeta_1$, $\zeta_2$, and $\zeta_3$ operators, respectively, and Z-type stabilizers 822 and 824, with $\eta_1$ and $\eta_2$ operators, respectively.

Merged surface-color quantum code 800 also comprises qubits, such as data qubits, ancilla qubits, and/or root ancilla qubits. In some embodiments, data qubits are found between edges at vertices of merged surface-color quantum code 800, such as data qubit 826 of the quantum surface code portion 802 and qubit 828 of the quantum color code portion 804, and ancilla qubits may found at the center of a given stabilizer, such as ancilla qubits 830 and 832 of the quantum surface code portion 802. Qubits found at the center of a light gray, medium gray, or dark gray stabilizer of the quantum color code portion 804 may be referred to as face qubits, such as face qubits 834, 836, and 838, respectively. However, embodiments with other combinations of qubit layouts may be used, depending on a given qubit interaction graph. In some embodiments, additional qubits are also located at a border between a given merged surface-color quantum code, according to the merging procedures described in FIGS. 5-7. For example, in merged surface-color quantum code 800, qubits 840, 842, 844, 846, and 848 are located at the border between quantum surface code portion 802 and quantum color code portion 804. In some embodiments, qubits such as qubits 840, 842, 844, 846, and 848 may require an error correction procedure specific to their placement at the border within a merged surface-color quantum code. This will be described in the following section.

Decoding a Merged Surface and Color Quantum Code

Figure 9:
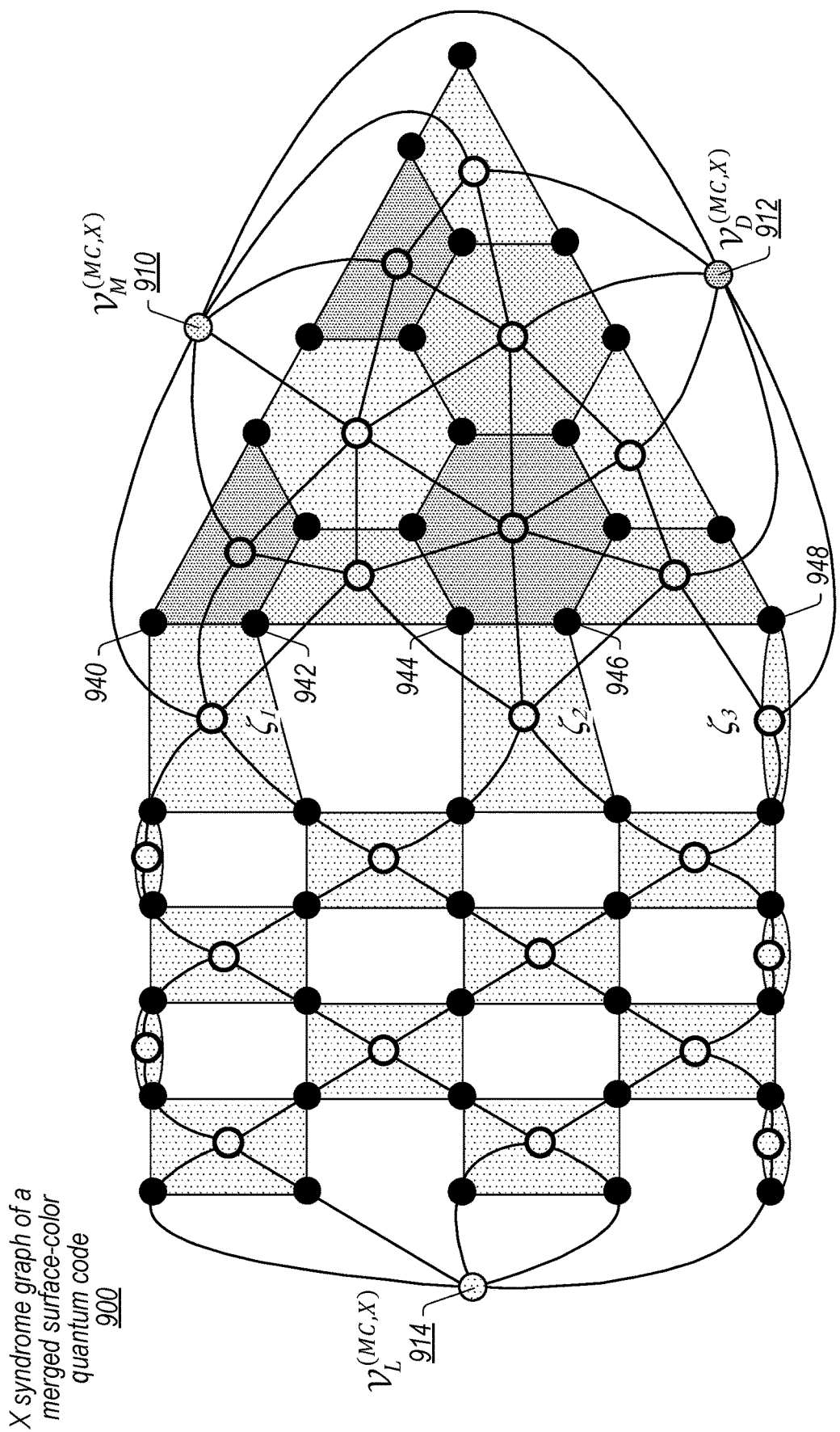
FIG. 9 illustrates a syndrome graph of a merged surface and color quantum code for a given set of X stabilizer measurements, according to some embodiments.
Figure 10:
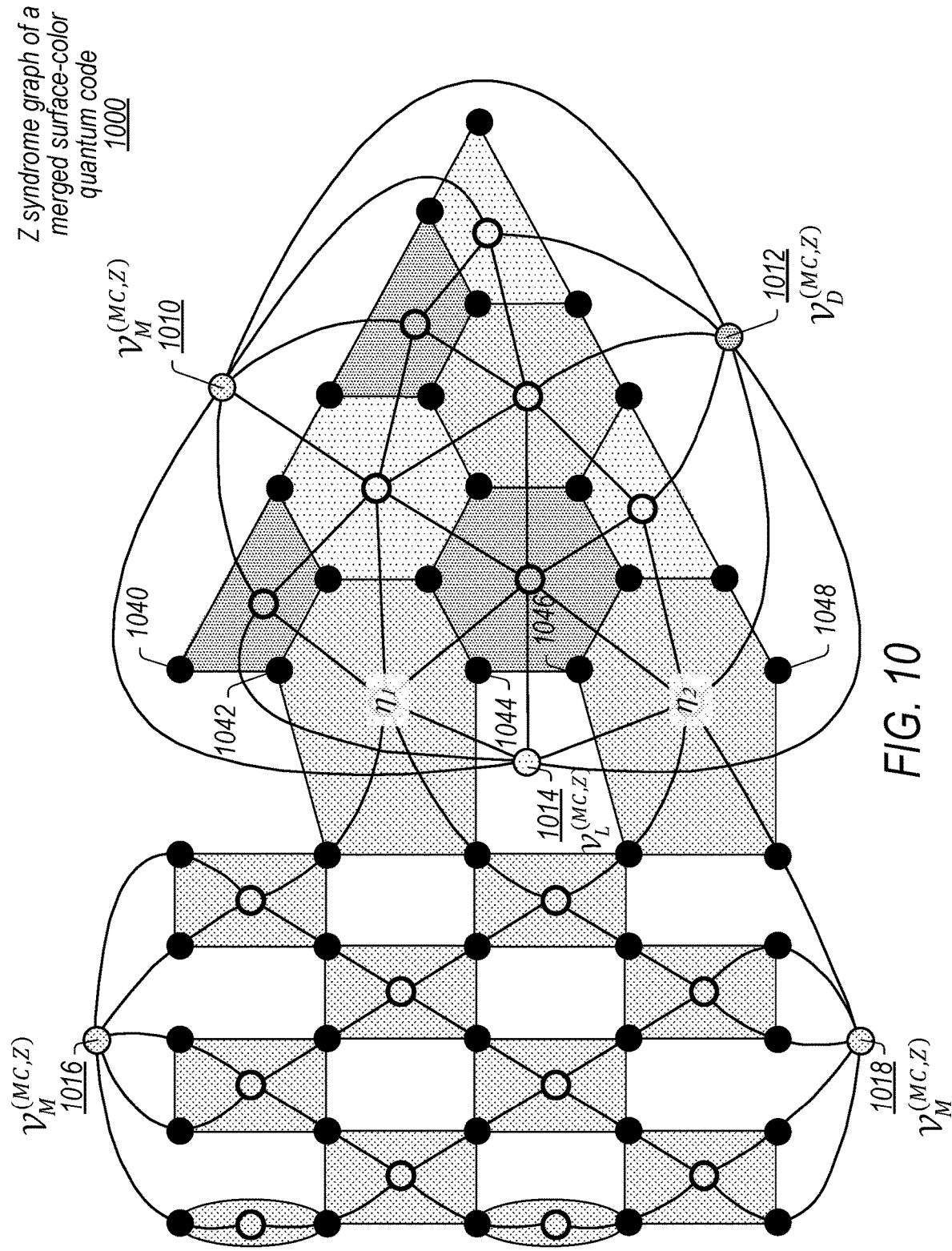
FIG. 10 illustrates a syndrome graph of a merged surface and color quantum code for a given set of Z stabilizer measurements, according to some embodiments.
Figure 11:
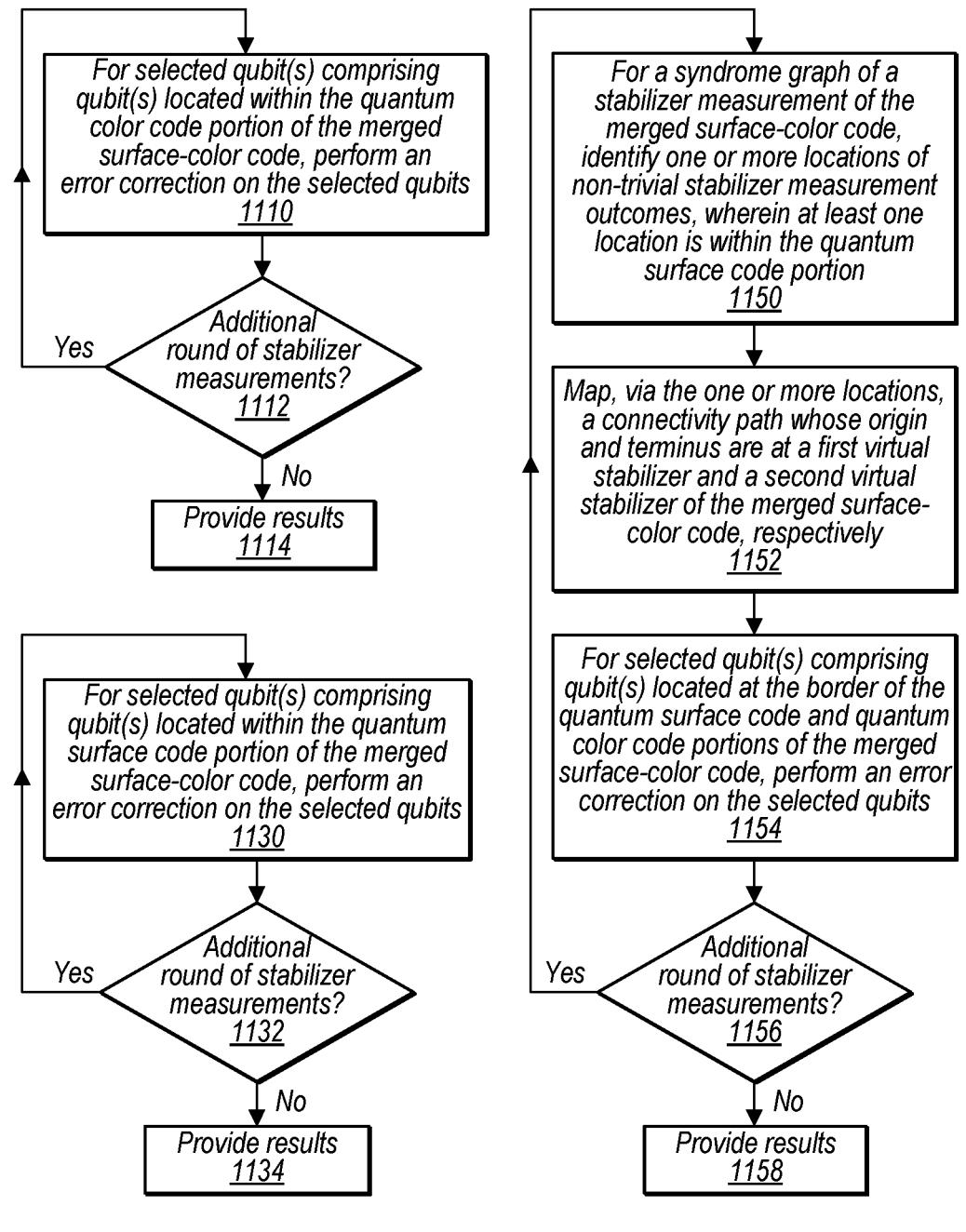
FIG. 11 illustrates a flow diagram for decoding one or more rounds of stabilizer measurements of a merged surface and color quantum code in which error correction is made for selected qubits contained within a quantum surface code portion of the code, selected qubits contained within a quantum color code portion of the code, and selected qubits along the border between the quantum surface and color code portions of the code, according to some embodiments.

In some embodiments, error correction for a merged surface and color quantum code, such as merged surface-color quantum code 800, may require several error correction processes for a given set of stabilizer measurements. FIGS. 9 and 10 illustrate embodiments of syndrome graphs for a given set of X stabilizer measurements and a given set of Z stabilizer measurements of a merged surface and color quantum code, respectively. FIG. 11 then illustrates embodiments of different error correction processes that may be required for a given merged surface and color quantum code.

The following definitions within this paragraph refer to one or more syndrome graphs of a quantum surface code and a quantum color code prior to their merging into a merged surface and color quantum code. Using the definitions herein, for P∈{X,Z}, P-syndrome graph of a quantum color code (CC) may be defined as $\mathcal{L}^{(CC,\mathcal{P})*}$, and P-syndrome graph of the quantum surface code (SC) may be defined as $\mathcal{L}^{(CC,\mathcal{P})*}$, whose vertices are associated with stabilizer measurement outcomes of P-type stabilizers of the color and surface quantum codes, respectively. In addition to the vertices described above, virtual boundary vertices may correspond to virtual stabilizers, whose "color" is indicated by its subscript. In some embodiments of a quantum color code, three P-type virtual stabilizers may be defined as $\mathcal{L}^{(CC,\mathcal{P})*}:\{v_L^{(CC,P)}, v_D^{(CC,P)}, v_M^{(CC,P)}\}$, wherein "L," "D," and "$M$," correspond to light gray, dark gray, and medium gray, respectively. In some embodiments of a quantum surface code, one or more virtual stabilizers may be added to syndrome graphs $\mathcal{L}^{(SC,CC,\mathcal{Z})*}$ and $\mathcal{L}^{(SC,CC,\mathcal{Z})*}$. For example, X-type light gray (L) virtual stabilizer $v_L^{(SC,X)}$ may be added to $\mathcal{L}^{(SC,CC,\mathcal{Z})*}$ and Z-type medium gray (M) virtual stabilizer $v_M^{(SC,Z)}$ may be added to $\mathcal{L}^{(SC,\mathcal{Z})*}$. It is reiterated that edges of syndrome graphs $\mathcal{L}^{(CC,\mathcal{P})*}$ and $\mathcal{L}^{(SC,\mathcal{P})*}$ are added between all pairs of stabilizers of a given quantum color code and a given quantum surface code, respectively, that share one or more common qubits. This includes virtual stabilizers. Furthermore, virtual boundary vertices have edges with a given set of qubits of the quantum color code which are not contained in any "real"

light, medium, or dark gray stabilizers ("real" as being contrasted to "virtual"). Virtual boundary vertices $v_L^{(SC,X)}$ and $v_M^{(SC,Z)}$ of the quantum surface code have edges with given sets of qubits which are contained in exactly one "real" X-type stabilizer and Z-type stabilizer, respectively. For example, FIG. 9 and FIG. 10 illustrate embodiments of syndrome graphs for a merged surface and color quantum code.

The following definitions within this paragraph for merging a quantum surface code and a quantum color code now expand on the setup and definitions from the previous paragraph. In some embodiments, gauge fixing may be implemented to combine a quantum surface code and a quantum color code into a merged surface-color quantum code. In FIG. 8, X-type operators on the side of the quantum surface code portion 802 that merges with quantum color code portion 804 are denoted as elongated X-type stabilizers 816, 818, and 820, with $\zeta_1, \zeta_2$, and $\zeta_3$ operators, respectively. These are formed by gauge fixing the $\zeta_1, \zeta_2$, and $\zeta_3$ operators during the process of the merge such that said operators become $\zeta_1, \zeta_2$, and $\zeta_3$ operators of the merged code.

Also in FIG. 8, Z-type operators of the merged surface-color quantum code, may be referred to as Z-type stabilizers 822 and 824, with $\eta_1$ and $\eta_2$ operators, respectively, and are formed during the process of gauge fixing the $\zeta_1, \zeta_2$, and $\zeta_3$ operators. Before merging the two portions, Z-type operators of the quantum surface code on the side that will merge with the quantum color code may be denoted as $\alpha_1$ and $\alpha_2$. The Z-type operators of the quantum color code on the side that will merge with the quantum surface code may be denoted as $\beta_1$ and $\beta_2$. In the process of gauge fixing the $\zeta_1, \zeta_2$, and $\zeta_3$ operators, $\zeta_1$ anticommutes with both $\alpha_1$ and $\beta_1$, but commutes with $\alpha_1\beta_1$. Therefore, upon measuring $\zeta_1$ during gauge fixing, operator $\eta_1 = \alpha_1\beta_1$ becomes the stabilizer of the newly merged surface-color quantum code, and similarly for operator $\eta_2 = \alpha_2\beta_2$. This process is represented in the example embodiments of FIG. 8. However, similar examples of $\zeta_1, \ldots, \zeta_{(d-1)/2}$ operators that form from $\alpha_1, \ldots, \alpha_{(d-1)/2}$ operators of a distance d quantum surface code and $\beta_1, \ldots, \beta_{(d-1)/2}$ operators of a distance d quantum color code may follow a similar process of gauge fixing as is described herein.

This leads to the following definitions of the resulting merged surface-color quantum code (MC). For $P \in \{X, Z\}$, the merged surface-color quantum code syndrome graph $\mathcal{L}^{(\mathcal{MCC} \cdot \mathcal{P})*}$ is defined as follows: the vertices of $\mathcal{L}^{(\mathcal{MCC} \cdot \mathcal{P})*}$ are associated with the P-type stabilizers of the merged surface-color quantum code. For the merged surface-color quantum code, three P-type virtual stabilizers $\{v_L^{(MC,P)}, v_D^{(MC,P)}, v_M^{(MC,P)}\}$ are added to $\mathcal{L}^{(\mathcal{MCC} \cdot \mathcal{P})*}$. The six total types of virtual stabilizers of $\mathcal{L}^{(\mathcal{MCC} \cdot \mathcal{Z})*}$ and $\mathcal{L}^{(\mathcal{MCC} \cdot \mathcal{Z})*}$ are therefore:

$$\{v_L^{(MC,X)}, v_D^{(MC,X)}, v_M^{(MC,X)}, v_L^{(MC,Z)}, v_D^{(MC,Z)}, v_M^{(MC,Z)}\}.$$

All of the MC virtual stabilizers except for $v_L^{(MC,X)}$ have the qubit support given by the union of the corresponding original code supports. Specifically, $$\forall (P,C) \neq (X,L), \text{support}(v_C^{(MC,P)}) = \text{support}(v_C^{(CC,P)}) \cup \text{support}(v_C^{(SC,P)}),$$

with the convention that $$\text{support}(v_M^{(SC,X)}) = \emptyset$$

$$\text{support}(v_L^{(SC,Z)}) = \emptyset$$

$$\text{support}(v_D^{(SC,X)}) = \emptyset$$

$$\text{support}(v_D^{(SC,Z)}) = \emptyset$$

as these virtual stabilizers were never defined for the quantum surface code prior to merging.

The support of the final virtual stabilizer $v_L^{(MC,X)}$ is the set of quantum surface code qubits which are contained in the support of exactly one light gray surface code stabilizer, and no light gray, dark gray, or medium gray stabilizers in the merged surface-color quantum code. (These qubits correspond to qubits connected by edges to $v_L^{(MC,X)}$ 914 in FIG. 9.)

Finally, edges are added to the syndrome graph $\mathcal{L}^{(\mathcal{MCC} \cdot \mathcal{P})*}$ between pairs of stabilizers (including virtual stabilizers) sharing one or more common qubits. Example embodiments of syndrome graph $\mathcal{L}^{(\mathcal{MCC} \cdot \mathcal{P})*}$ may be discussed in FIG. 9 and FIG. 10. In some embodiments, it is also helpful to define a classification of the qubits of the merged surface-color code as either face qubits or edge qubits. For a given qubit q, its classification is determined by the number t of stabilizers (including virtual stabilizers) which contain q. In the embodiments shown in FIG. 8, either t=2 or t=3 for qubits shown in merged surface-color quantum code 800. Therefore, for embodiments of FIG. 8, a given edge qubit q may be defined as having t=2, and, therefore if t=3, a given qubit q may be defined as a face qubit. The one-boundary of face qubit q may then be denoted as $\partial_2 q$, or the set of the 3 edges in $\mathcal{L}^{(\mathcal{MCC} \cdot \mathcal{P})*}$ which connect the 3 stabilizers of q. For a set of face-qubits $S = \{q_1, \ldots, q_l\}$, however, the one-boundary may be denoted as $\partial_2 S$ as $$\partial_2 S = \bigoplus_{q \in S} \partial_2 q,$$

in which $\otimes$ denotes the symmetric difference of sets, and $\partial_2 q$ may be the one-boundary of the individual face qubit q. The edges $e \in \mathcal{L}^{(\mathcal{MCC} \cdot \mathcal{P})*}$ are given a real-valued weight which are then denoted as wt(e), or a set to one of some fixed parameters $w_1, w_2 \in \mathbb{R}$ in which $w_1$ sets the weight of edges in the quantum surface code, while $w_2$ sets the weight of edges in the quantum color code, according to some embodiments. More specifically, if the stabilizers associated with vertices u and v share any face qubits, then the weight of (u, v) may be set to $w_2$, and otherwise the weight may be set to $w_1$.

In some embodiments, optimal values for $w_1$ and $w_2$ may be found numerically by computing the logical error rates of the merged surface-color quantum code for a given noise model. For instance, in FIG. 8, the Z distance, $d_Z$, of merged surface-color quantum code 800 is two times the X distance, $d_X$. Note that this may be an advantageous configuration for biased noise models in which Z errors are more likely than X errors. In other embodiments, the orientation may be swapped such that the X distance is larger in the case of X-biased noise.

For each $P \in \{X, Z\}$, three restricted graphs $\mathcal{L}_{LM}^{(\mathcal{MCC} \cdot \mathcal{P})*}, \mathcal{L}_{LD}^{(\mathcal{MCC} \cdot \mathcal{P})*}$, and $\mathcal{L}_{DM}^{(\mathcal{MCC} \cdot \mathcal{P})*}$ may also be defined as subgraphs of the full merged surface-color quantum code syndrome graph $\mathcal{L}_{LM}^{(\mathcal{MCC} \cdot \mathcal{P})*}$. These graphs may be defined such that:

1. $\mathcal{L}_{LM}(\mathcal{MCC}\cdot\mathcal{P})* = \mathcal{L}_{LD}(\mathcal{MCC}\cdot\mathcal{P})* = \mathcal{L}(\mathcal{MCC}\cdot\mathcal{P})*$ 2. $\mathcal{L}_{C_1C_2}(\mathcal{MCC}\cdot\mathcal{P})*$ contains all vertices of color $C \in \{C_1, C_2\}$ and edges between these vertices.

FIG. 9 illustrates a syndrome graph of a merged surface and color quantum code for a given set of X stabilizer measurements, according to some embodiments.

In FIG. 9, X syndrome graph of a merged surface-color quantum code 900 may refer to an X syndrome graph of merged surface-color quantum code 800. In such embodiments, the descriptions of different qubits and stabilizers of quantum surface code portion 802 and quantum color code portion 804 apply to FIG. 9 as well. As shown in FIG. 9, virtual boundary vertices of the merged code (MC) exist that follow from virtual boundary vertices of the quantum surface and color codes before said codes were merged. These include $v_M^{(MC,X)}$ 910, $v_D^{(MC,X)}$ 912, and $v_L^{(MC,X)}$ 914. Qubits 940, 942, 944, 946, and 948 have also been labeled. Similarly to qubits 840, 842, 844, 846, and 848 of FIG. 8, these qubits may require an error correction specific to their placement at the border within the merged surface-color quantum code.

FIG. 10 illustrates a syndrome graph of a merged surface and color quantum code for a given set of Z stabilizer measurements, according to some embodiments.

In FIG. 10, Z syndrome graph of a merged surface-color quantum code 1000 may refer to a Z syndrome graph of merged surface-color quantum code 800. In such embodiments, the descriptions of different qubits and stabilizers of quantum surface code portion 802 and quantum color code portion 804 apply to FIG. 10 as well. As shown in FIG. 10, virtual boundary vertices of the merged code (MC) exist that follow from virtual boundary vertices of the quantum surface and color codes before said codes were merged. These include virtual stabilizers $v_M^{(MC,Z)}$ 1010, $v_D^{(MC,Z)}$ 1012, $v_L^{(MC,Z)}$ 1014, $v_M^{(MC,Z)}$ 1016, and $v_M^{(MC,Z)}$ 1018. Qubits 1040, 1042, 1044, 1046, and 1048 have also been labeled. Similarly to qubits 840, 842, 844, 846, and 848 of FIG. 8, these qubits may require an error correction specific to their placement at the border within the merged surface-color quantum code.

FIG. 11 illustrates a flow diagram for decoding one or more rounds of stabilizer measurements of a merged surface and color quantum code in which error correction is made for selected qubits contained within a quantum surface code portion of the code, selected qubits contained within a quantum color code portion of the code, and selected qubits along the border between the quantum surface and color code portions of the code, according to some embodiments.

In FIG. 11, decoding one or more rounds of syndrome measurements of a merged surface-color quantum code, such as X syndrome graph of a merged surface-color quantum code 900 and Z syndrome graph of a merged surface-color quantum code 1000, may comprise several error correction processes that may be implemented via program instructions executable using one or more processors. It should be understood that, depending on the number of rounds of stabilizer measurements that a given merged surface-color quantum code is subjected to, these error correction processes may be repeated more than once. In the following paragraphs, the three processes correspondingly shown in block 1100 of FIG. 11 will be described, and these processes represent some embodiments of performing error correction on a merged surface-color quantum code. However, other combinations of error correction processes may similarly be used based on the embodiments described herein. In addition, for a given round of syndrome measurements, any combination of all or some of the three error correction processes may be used in any order.

In some embodiments, a first process may pertain to error correction on a selected number of qubits found within a quantum color code portion of a merged surface-color quantum code, such as quantum color code portion 804 of merged surface-color quantum code 800. In block 1110, a selected number of qubits comprising the qubits found in a given quantum color code portion are determined to require error correction, and said error correction is completed. This process may be repeated for multiple rounds of stabilizer measurements according to block 1112. If at least one additional round of stabilizer measurements remains, then the process described in block 1110 repeats. If not, then the results of the one or more rounds of stabilizer measurements are provided in block 1114. In some embodiments, different qubits may be determined to require error correction in different respective rounds of stabilizer measurements, or no qubits may be determined to require error correction for a given round of stabilizer measurement.

In some embodiments, a second process may pertain to error correction on a selected number of qubits found within a quantum surface code portion of a merged surface-color quantum code, such as quantum surface code portion 802 of merged surface-color quantum code 800. In block 1130, a selected number of qubits comprising the qubits found in a given quantum surface code portion are determined to require error correction, and said error correction is completed. This process may be repeated for multiple rounds of stabilizer measurements according to block 1132. If at least one additional round of stabilizer measurements remains, then the process described in block 1130 repeats. If not, then the results of the one or more rounds of stabilizer measurements are provided in block 1134. As described above, in some embodiments, different qubits may be determined to require error correction in different respective rounds of stabilizer measurements, or no qubits may be determined to require error correction for a given round of stabilizer measurement.

In some embodiments, a third process may pertain to error correction on a selected number of qubits found at the border between a quantum surface code portion and a quantum color code portion of a merged surface-color quantum code, such as qubits 840, 842, 844, 846, and 848, which are located at the border between quantum surface code portion 802 and quantum color code portion 804 in FIG. 8. In block 1150, one or more locations of non-trivial stabilizer measurement outcomes may be identified within a syndrome graph of a given round of stabilizer measurements, such as X syndrome graph of a merged surface-color quantum code 900 and Z syndrome graph of a merged surface-color quantum code 1000. In such embodiments, at least one location may be within the quantum surface code portion of the merged surface-color quantum code. These locations may refer to specific stabilizers where it has been determined that one of the data qubits with an edge between itself and the given stabilizer has anticommuted with said stabilizer. These locations may then be referred to as marked stabilizers or highlighted stabilizers.

In block 1152, a connectivity path may be mapped such that it passes through each of the marked stabilizers. It may begin at a first virtual stabilizer of the merged surface-color quantum code and end at a second virtual stabilizer of the merged surface-color quantum code, wherein the first and second virtual stabilizers may refer to a combination of virtual stabilizers such as $v_M^{(MC,X)}$ 910, $v_D^{(MC,X)}$ 912, $v_L^{(MC,X)}$ 914, $v_M^{(MC,Z)}$ 1010, $v_D^{(MC,Z)}$ 1012, $v_L^{(MC,Z)}$ 1014, $v_M^{(MC,Z)}$ 1016, and $v_M^{(MC,Z)}$ 1018. Then, in block 1154, for qubits that are located along the border between the quantum surface code and quantum color code portions of the merged surface-color quantum code and that fall in between the mapping of the connectivity path, an error correction may be performed. For example, in X syndrome graph of a merged surface-color quantum code 900, qubits 940, 942, 944, 946, and 948 are located between quantum surface code portion 802 and quantum color code portion 804. A selected number of these qubits may lie between the mapping of a given connectivity path, such that said qubits receive Z-type error correction. Similarly, a selected number of qubits out of qubits 1040, 1042, 1044, 1046, and 1048 in Z syndrome graph of a merged surface-color quantum code 1000 may be selected to receive X-type error correction. Example embodiments of such a connectivity path and subsequent qubit selections may be described in FIGS. 12A-12C.

This process may be repeated for multiple rounds of stabilizer measurements according to block 1156. If at least one additional round of stabilizer measurements remains, then the process described in blocks 1150, 1152, and 1154 repeats. If not, then the results of the one or more rounds of stabilizer measurements are provided in block 1158. As described above, in some embodiments, different qubits may be determined to require error correction in different respective rounds of stabilizer measurements, or no qubits may be determined to require error correction for a given round of stabilizer measurement.

Figure 12A:
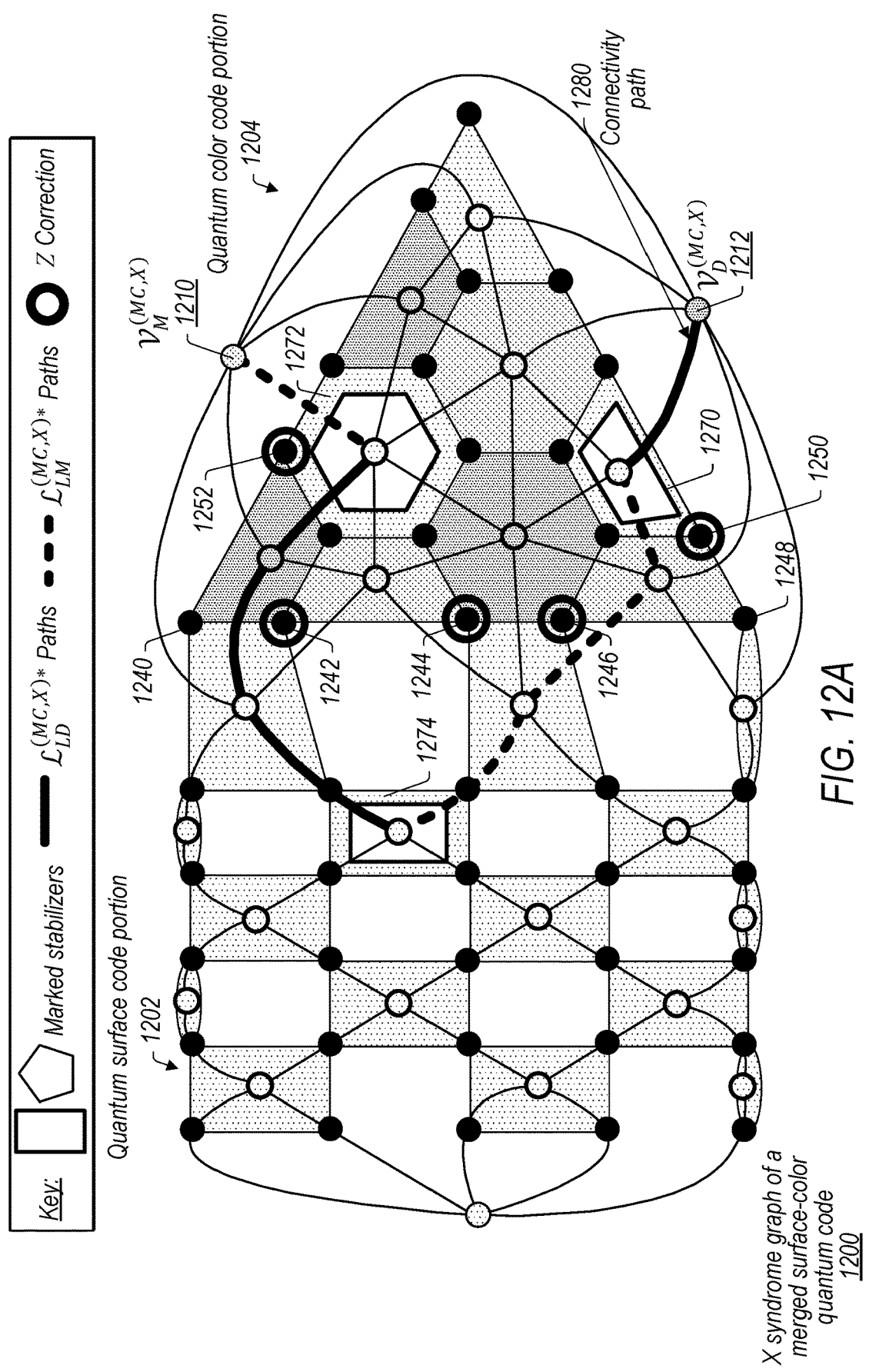
FIG. 12A illustrates a procedure for performing error correction on a syndrome graph of a merged surface and color quantum code for a given set of X stabilizer measurements, wherein the procedure comprises determining a connectivity path that crosses through both the quantum surface code and quantum color code portions of the merged code, and the procedure comprises determining specific qubits that receive error correction based on the connectivity path, according to some embodiments.

FIG. 12A illustrates a procedure for performing error correction on a syndrome graph of a merged surface and color quantum code for a given set of X stabilizer measurements, wherein the procedure comprises determining a connectivity path that crosses through both the quantum surface code and quantum color code portions of the merged code, and the procedure comprises determining specific qubits that receive error correction based on the connectivity path, according to some embodiments.

FIG. 12A illustrates X syndrome graph of a merged surface-color quantum code 1200 during the process of error correction of a given round of stabilizer measurements. The embodiments shown in FIG. 12A also relate to the error correction process described in blocks 1150, 1152, 1154, 1156, and 1158 of FIG. 11. As described in block 1150, locations of an anticommute between a given data qubit and respective stabilizer are referred to as marked stabilizers, and FIG. 12A describes an example embodiment of a situation where a connectivity path, also referred to as a connectivity component, may be mapped across marked stabilizers that occur both in quantum surface code portion 1202 and in quantum color code portion 1204. FIG. 12A is meant to provide an example of such an embodiment, but other embodiments in which a connectivity path begins at one of the virtual boundary vertices of quantum color code portion 1204 and crosses through quantum surface code portion 1206 may also require the error correction process described herein.

In the example of FIG. 12A, there are three light gray marked stabilizers: marked stabilizer 1270 and marked stabilizer 1272 are located in quantum color code portion 1204, and marked stabilizer 1274 is located in quantum surface code portion 1202. A connectivity path, such as connectivity path 1280, has an origin at a first stabilizer of the merged surface and color code depicted in FIG. 12A and a terminus at a second stabilizer of the merged surface and color code. In more detail, connectivity path 1280 begins (ends) at virtual stabilizer $v_M^{(MC,X)}$ 1210 and ends (begins) at $v_D^{(MC,X)}$ 1212 while mapping across marked stabilizers 1270, 1272, and 1274 (in the respective order of the origin and terminus of connectivity path 1280). Connectivity path 1280 has segments of the path that correspond to $\mathcal{L}_{LD}(\mathcal{M}\mathcal{CC}, \mathcal{Z})^*$ paths, depicted as solid line segments of connectivity path 1280 in FIG. 12A, and $\mathcal{L}_{LM}(\mathcal{M}\mathcal{CC}, \mathcal{Z})^*$ paths, depicted as dashed line segments of connectivity path 1280 in FIG. 12A.

Next, as detailed for block 1154 of FIG. 11 above, a check is made to see if any qubits that are located at the border between quantum surface code portion 1202 and quantum surface code portion 1204, such as qubits 1240, 1242, 1244, 1246, and 1248, lie between the mapping of connectivity path 1280. If there are any such qubits, Z-type correction is applied to said qubits. In the embodiment shown in FIG. 12A, qubits 1242, 1244, and 1246 receive Z-type correction, but qubits 1240 and 1248, which lie outside of the mapping of connectivity path 1280, do not receive error correction due to connectivity path 1280.

Additionally, for marked stabilizers within quantum color code portion 1204, such as marked stabilizer 1270 and marked stabilizer 1272, a second type of error correction is performed. This type of error correction may refer to the process described by blocks 1110, 1112, and 1114 of FIG. 11, and also to the process of 'Lift,' as described below in the section pertaining to Algorithm 2. According to this second type of error correction, Z-type correction is applied to qubits 1250 and 1252. This is depicted by encircling qubits 1250 and 1252 in FIG. 12A. It should be understood that similar embodiments of connectivity paths may be mapped for a round of Z-type stabilizer measurements, such as for Z syndrome graph of a merged surface-color code 1000.

Figure 12B:
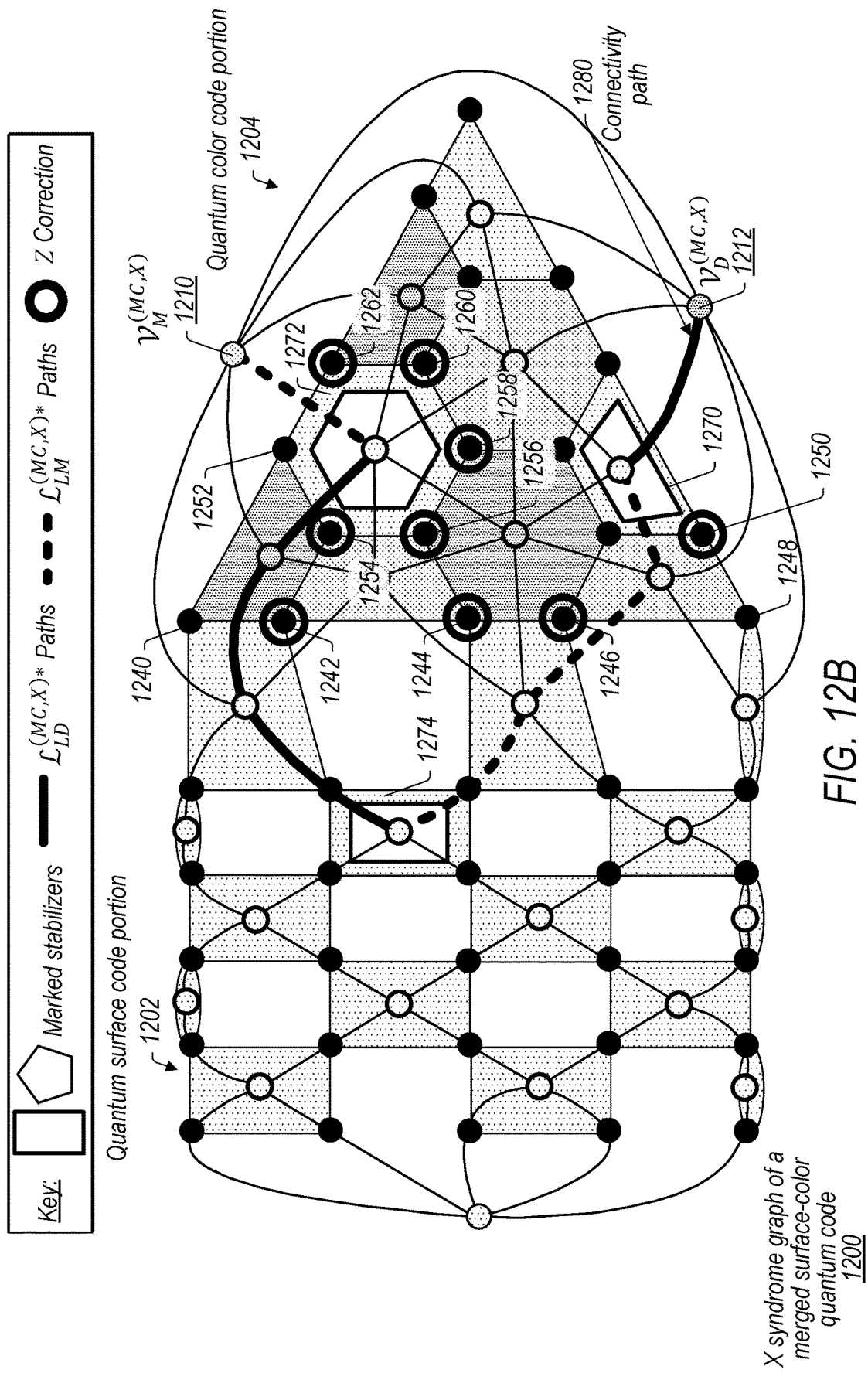
FIG. 12B illustrates another procedure for performing error correction on a syndrome graph of a merged surface and color quantum code for a given set of X stabilizer measurements, wherein the procedure comprises determining a connectivity path that crosses through both the quantum surface code and quantum color code portions of the merged code, and the procedure comprises determining specific qubits that receive error correction based on the connectivity path, according to some embodiments.

FIG. 12B illustrates another procedure for performing error correction on a syndrome graph of a merged surface and color quantum code for a given set of X stabilizer measurements, wherein the procedure comprises determining a connectivity path that crosses through both the quantum surface code and quantum color code portions of the merged code, and the procedure comprises determining specific qubits that receive error correction based on the connectivity path, according to some embodiments.

FIG. 12B follows a similar procedure as that of FIG. 12A for identifying marked stabilizers 1270, 1272, and 1274, mapping connectivity path 1280, and applying Z-type correction to qubits 1242, 1244, 1246, and 1250. FIG. 12B illustrates that, when selecting qubits within quantum color code portion 1204 to apply Z-type correction to due to the mapping of connectivity path 1280, it is equivalent to apply Z-type correction to qubits 1254, 1256, 1258, 1260, and 1262 instead of qubit 1252. (This error correction process for quantum color code portion 1204 may be referred to as completing a 'Lift' subroutine, which is described by Algorithm 2 in the following section.)

Figure 12C:
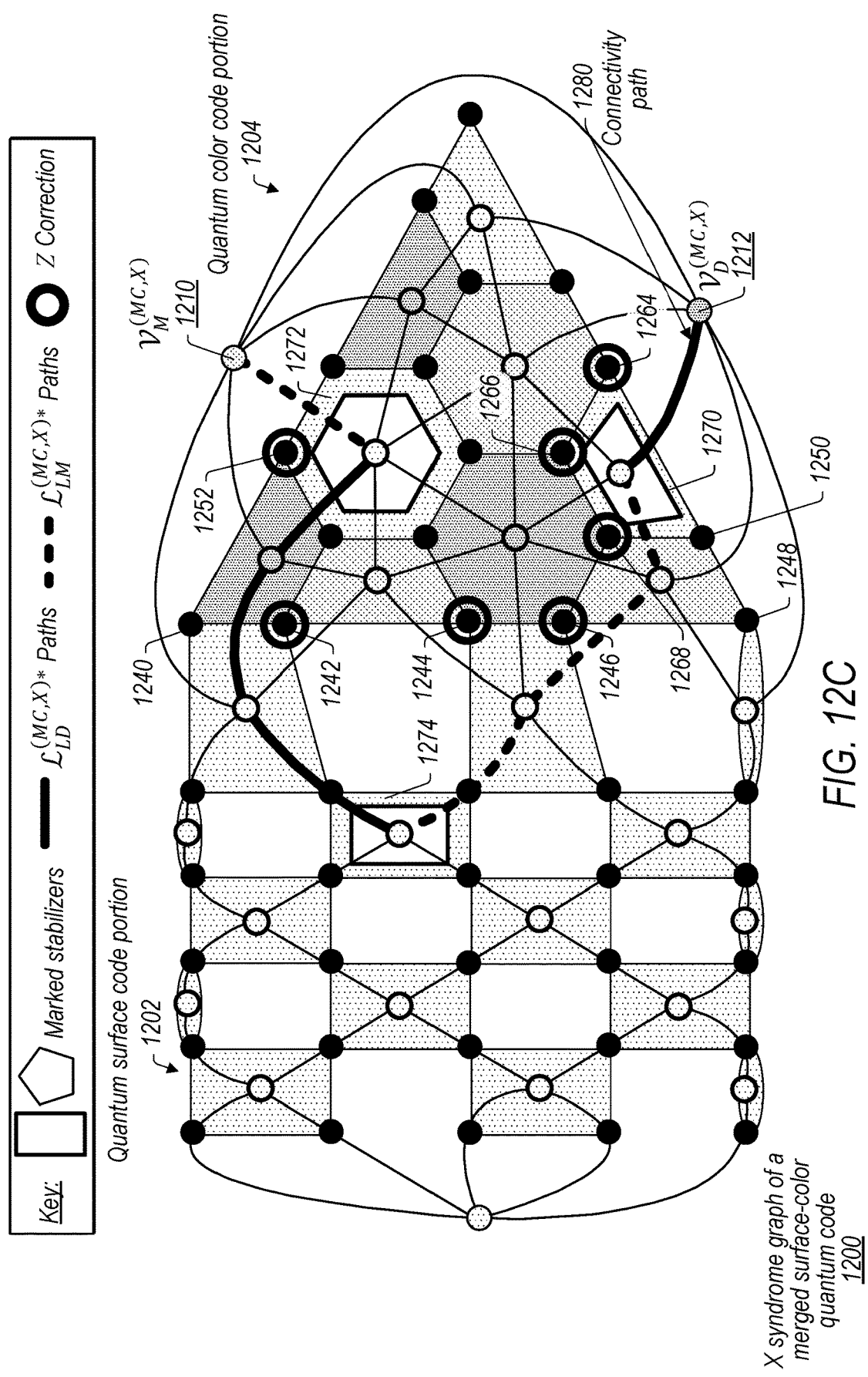
FIG. 12C illustrates yet another procedure for performing error correction on a syndrome graph of a merged surface and color quantum code for a given set of X stabilizer measurements, wherein the procedure comprises determining a connectivity path that crosses through both the quantum surface code and quantum color code portions of the merged code, and the procedure comprises determining specific qubits that receive error correction based on the connectivity path, according to some embodiments.

FIG. 12C illustrates yet another procedure for performing error correction on a syndrome graph of a merged surface and color quantum code for a given set of X stabilizer measurements, wherein the procedure comprises determining a connectivity path that crosses through both the quantum surface code and quantum color code portions of the merged code, and the procedure comprises determining specific qubits that receive error correction based on the connectivity path, according to some embodiments.

FIG. 12C follows the same procedure of FIG. 12A for identifying marked stabilizers 1270, 1272, and 1274, mapping connectivity path 1280, and applying Z-type correction to qubits 1242, 1244, 1246, and 1252. Also, FIG. 12C illustrates that, when selecting qubits within quantum color code portion 1204 to apply Z-type correction to due to the mapping of connectivity path 1280, it is equivalent to apply Z-type correction to qubits 1264, 1266, and 1268 instead of qubit 1250. (This error correction process for quantum color code portion 1204 may be referred to as completing a 'Lift' subroutine, which is described by Algorithm 2 in the following section.)

Figure 13:
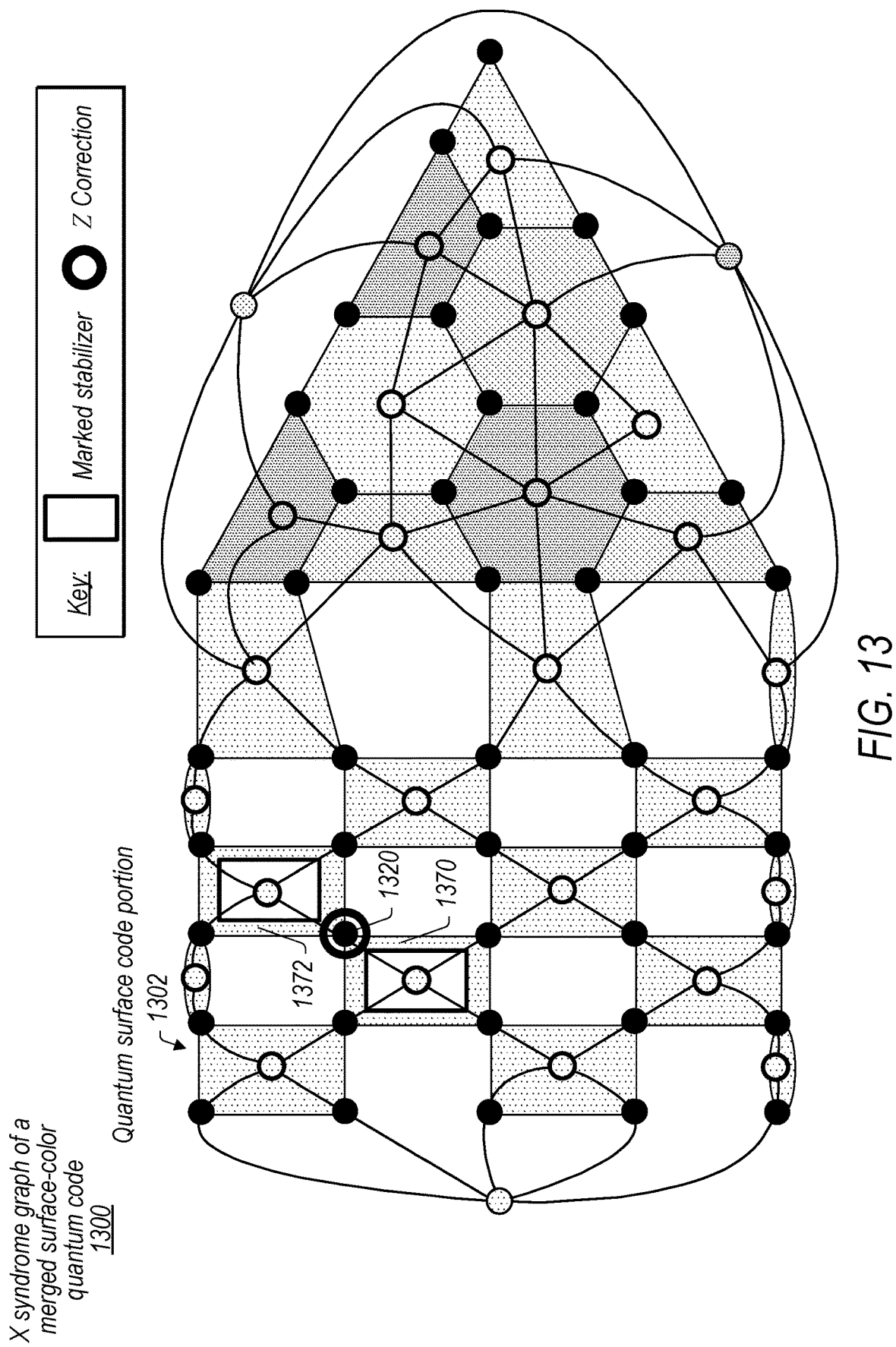
FIG. 13 illustrates a procedure for error correction on a syndrome graph of a merged surface and color quantum code for a given set of X stabilizer measurements in which a specific qubit within the quantum surface code portion of the merged surface and color quantum code receives error correction, according to some embodiments.

FIG. 13 illustrates a procedure for performing error correction on a syndrome graph of a merged surface and color quantum code for a given set of X stabilizer measurements in which a specific qubit within the quantum surface code portion of the merged surface and color quantum code receives error correction, according to some embodiments.

FIG. 13 illustrates X syndrome graph of a merged surface-color quantum code 1300 during the process of error correction of a given round of stabilizer measurements. The embodiments shown in FIG. 13 may relate to the error correction process described in blocks 1130, 1132, and 1134 of FIG. 11. In the example of FIG. 13, there are two light gray marked stabilizers, marked stabilizer 1370 and marked stabilizer 1372, both of which are located in quantum surface code portion 1302. Qubit 1320 receives Z-type correction, since qubit 1320 shares an edge with both marked stabilizer 1370 and marked stabilizer 1372.

Decoding a Merged Surface and Color Quantum Code: A Decoding Algorithm for Merged Surface and Color Quantum Code The embodiments above pertain to a process of decoding a merged surface-color code. In some embodiments, such as ones that will be discussed in this section, this process of decoding a merged surface-color code may be implemented using a decoding algorithm. In general, the decoding algorithm handles effects of one or more errors that occur at the border between the quantum surface code and quantum color code portions of the merged surface-color code, according to some embodiments. In some embodiments, the decoding algorithm may also handle errors that occur strictly within the quantum color code portion, and strictly within the of the quantum surface code portion of the merged surface-color code.

An explanation of such a decoding algorithm will now be prefaced by a few graph-theoretic notions which may be used in the given merged surface-color code decoding algorithm. For a graph G=(V, E) with edge weights $E \xrightarrow{w} \mathbb{R}$, $e \mapsto w(e)$, $S \subset E$ may be considered as a perfect matching (PM) if each vertex $v \in V$ has exactly one edge in the set S. More generally, for a subset $A \subset V$, it may be considered that $S \subset E$ is an A-perfect matching (A-PM) if each vertex $v \in A$ has exactly one edge in the set S. Note that this permits vertices $v \in V \backslash A$ to have any number of edges in the A-perfect matching. Note also that a V-perfect matching is simply a perfect matching. Finally, it may be considered that $S \subset E$ is a minimum-weight A-perfect matching if for all A-perfect matchings S', $\Sigma_{e \in S} w(e) \le \Sigma_{e \in S'} w(e)$. There exists a polynomial-time algorithm for finding a minimum-weight perfect matching of a graph. A minimum weight A-perfect matching can be found using a small modification and using that same algorithm as a subroutine. This is shown in Algorithm 2, in which the minimum-weight perfect matching algorithm is used as a subroutine in Line 17 of Algorithm 1.

Algorithm 1 is defined as the following procedure, which is also shown in FIG. 14. FIG. 14 illustrates an algorithm for decoding one or more rounds of stabilizer measurements of a merged surface and color quantum code, according to some embodiments.

---

Algorithm 1 Produces Z and X corrections $\xi'_Z$, $\xi'_X$ given X and Z syndromes $S_X(E_Z)$, $S_Z(E_X)$

---

1: for P ∈ {X, Z} do
2:   Let P' ∈ {X, Z}, P' ≠ P
3:   $\xi'_{P'} \leftarrow \emptyset$, Initialize empty partial correction
4:   Let $A = S_P(\xi'_P \xi_{P'})$
5:   for C ∈ {L, D, M} do
6:     Let $\{C_1, C_2\} = \{L, D, M\} \backslash \{C\}$
7:     $A_C \leftarrow A \cap L^{(MC,P)*}_{C_1 C_2}$
8:     $V_C \leftarrow A_C \cup \{v^{(MC,P)}_{C_1}, v^{(MC,P)}_{C_2}\}$
9:     $w_C \leftarrow \emptyset$
10:     for (u, v) ∈ $V_C \times V_C$ do
11:       $\Gamma_{u,v,c} \leftarrow$ MinWeightLegalPath(u, v, $L^{(MC,P)*}_{C_1 C_2}$)
12:       if $\Gamma_{u,v,c} =$ then
13:         $w_C(u, v) \leftarrow \infty$
14:       else
15:         $w_C(u, v) \leftarrow \Sigma_{e \in \Gamma_{u,v,c}} wt(e)$
16:     $G_C \leftarrow (V_C, E_C, w_C)$, Initialize Weighted C-Matching Graph
17:     $M_C$ min. weight $A_C$-PM of $G_C$ using Algorithm 2
18:     $\Gamma_C \leftarrow \oplus_{(u,v) \in M_C} \Gamma_{u,v,C}$
19:   $\Gamma_T \leftarrow \Gamma_L \cup \Gamma_D \cup \Gamma_M$
20:   for BCC $\theta = (\{v_i\}, \{\chi_i\})$ do
21:     $\Gamma_\theta \leftarrow \cup_{i=1}^{l-1} \Gamma_{v_i, v_{i+1}, \chi_i}$
22:     if $v_l \in \{v^{(MC,P)}_D, v^{(MC,P)}_L\}$ then
23:       Set color($\theta$) = M
24:     else
25:       Set color($\theta$) = L
26:     for u ∈ $\Gamma_\theta|_{color(\theta)}$ do
27:       $\xi'_{P'} \leftarrow \xi'_{P'} \oplus$ Lift(u, $\Gamma_\theta$)
28:     if color($\theta$) = L then
29:       $\xi'_{P'} \leftarrow \xi'_{P'} \oplus$ SCLightGrayLift($\Gamma_\theta$)
30:     Set $\Gamma_T \leftarrow \Gamma_T \oplus \Gamma_\theta$
31:   for u ∈ $\Gamma_T|_D$ do
32:     $\xi'_{P'} \leftarrow \xi'_{P'} \oplus$ Lift(u, $\Gamma_T$)
33:   $A \leftarrow S_P(\xi'_P \xi_{P'})$
34:   $\xi'_{P'} \leftarrow$ SurfaceCodeCorrecion(A)

---

Algorithm 2 is defined as the following procedure, and is also shown in FIG. 15. For example, FIG. 15 illustrates a 'Lift' subroutine of the algorithm described in FIG. 14, pertaining to minimum-weight perfect-matching done in a quantum color code, according to some embodiments.

---

Algorithm 2 Produces a minimum weight A-perfect matching M ⊂ E of a weighted graph G = (V, E) with A ⊂ V and edge weights w(u, v) for (u, v) ∈ E

---

1: Set $w(u_1, u_2) = \infty \Leftrightarrow (u_1, u_2) \notin E$
2: for v ∈ A do
3:   $q(v) \leftarrow \min_{u \in V \backslash A} w(v, u)$
4:   $n(v) \leftarrow \text{argmin}_{u \in V \backslash A} w(v, u)$
5: for $(u_1, u_2)$ ∈ E do
6:   $L(u_1, u_2) \leftarrow 0$
7:   $w'(u_1, u_2) \leftarrow q(u_1) + q(u_2)$
8:   if $w'(u_1, u_2) \le w(u_1, u_2)$ then
9:     $L(u_1, u_2) \leftarrow 1$
10:     $w(u_1, u_2) \leftarrow w'(u_1, u_2)$
11: $G' = (V', E') \leftarrow G \backslash (V \backslash A)$
12: if |V'| is odd then
13:   $G' \leftarrow G' \cup \{v_0\}$
14:   for u ∈ A do
15:     $G' \leftarrow G' = (u, v_0)$
16:     $w(u, v_0) \leftarrow q(u)$
17: Find a min. weight PM M' ⊂ E'
18: M ← ∅
19: for $(u_1, u_2)$ ∈ M' do
20:   if $v_0 \in \{u_1, u_2\}$ then
21:     Let u ∈ $\{u_1, u_2\} \backslash \{v_0\}$
22:     M ← M ∪ (u, n(u))

-continued

Algorithm 2 Produces a minimum weight A-perfect
matching M ⊂ E of a weighted graph G = (V, E) with
A ⊂ V and edge weights w(u, v) for (u, v) ∈ E

```
23:  else
24:    if L(u₁, u₂) ≠ ⊥ then
25:      M ← M ∪ (u₁, n(u₁))
26:      M ← M ∪ (u₂, n(u₂))
27:    else
28:      M ← M ∪ (u₁, u₂)
```

The following paragraphs describe embodiments pertaining to Algorithm 1 and Algorithm 2. For convenience within this section, specific numbered lines of Algorithm 1 may be referred to.

Let ε be a physical Pauli error operator on the data qubits with X and Z error syndromes $S_X(\varepsilon_Z), S_Z(\varepsilon_X)$ respectively. That is, the set $S_P(\varepsilon_{P'})$ is a subset of the real vertices of $\mathcal{L}(\mathcal{MCC} \cdot \mathcal{P})^*$. The X and Z syndromes are be decoded independently within Algorithm 1 to produce Z and X correction operators $\varepsilon'_Z, \varepsilon'_X$, respectively. Hence, in what follows, let P∈{X, Z}. Then, in Line 2 of Algorithm 1, fix P'∈{X, Z} and P'≠P. The correction operator $\varepsilon'_{P'}$ is then initialized such that $\varepsilon'_{P'}=\emptyset$ in Line 3 of Algorithm 1. Within Algorithm 1, $S_P(\varepsilon'_P \varepsilon_{P'})$ may refer to marked stabilizers. Note that as the correction operator is empty at the start of the algorithm, the initial set of marked stabilizers is the same as the P-syndrome input to the decoder.

An initial set of marked stabilizers $S_P(\varepsilon_P)$ is then decoded in two stages, which may be referred to as the quantum color code stage and the quantum surface code stage. The quantum color code stage corresponds to Line 4 through Line 32 of Algorithm 1, while the quantum surface code stage corresponds to Line 33 through Line 34 of Algorithm 1. These have also been labeled as Quantum color code stage 1400 and quantum surface code stage 1402 in FIG. 14, respectively.

The quantum color code stage produces a partial correction $\varepsilon'_{P'}$ which only contains qubits of the color code. This partial correction is used to update the P-syndrome marked stabilizers $S_P(\varepsilon'_P \varepsilon_{P'})$. At the end of the quantum color code stage, no color code stabilizers are marked except possibly some of the η-type stabilizers. In contrast, surface code stabilizers may still be marked. This is because no surface code qubits are contained in the partial correction $\varepsilon'_{P'}$ at this stage, and hence any initially-marked surface code stabilizers remain marked at the end of the quantum color code stage. To be more precise, the partial correction $\varepsilon'_{P'}$ at the end of the quantum color code stage is stored in the software implementing Algorithm 1, and does not need to be actively applied to the physical data qubits.

After the quantum color code stage of Algorithm 1, the quantum surface code stage of Algorithm 1 is run, beginning on $\varepsilon_{P'}$ of Algorithm 1. Generally speaking, the quantum surface code stage runs a similar process as was done in the quantum color code stage. It makes some final modifications to the partial correction $\varepsilon'_{P'}$ so that there are no marked merged surface-color quantum code stabilizers in the marked set $S_P(\varepsilon'_P \varepsilon_{P'})$. At this point the P' correction $\varepsilon'_{P'}$ is completed.

In more detail, the steps of the quantum color code stage are as follows: the first step is to produce three colored pairings $(M_C, \{\Gamma_{u,v,C}\})$ for each of C∈{L, D, M}. This is done in Line 5 through Line 18 of Algorithm 1. Fix any C∈{L, D, M}. Let {C₁, C₂}={L, D, M}\{C}. The colored pairing $(M_C, \{\Gamma_{u,v,C}\})$ consists of a set $M_C=\{(u, v)\}$ of pairs of vertices of $\mathcal{L}_{C_1 C_2}(\mathcal{MCC} \cdot \mathcal{P})^*$, along with a path $\Gamma_{u,v,C}$ for each pair (u, v)∈$M_C$. This path $\Gamma_{u,v,C}$ joins u and v through the restricted graph $\mathcal{L}_{C_1 C_2}(\mathcal{MCC} \cdot \mathcal{P})$. The path $\Gamma_{u,v,C}$ should reach the following conditions:

1. $\Gamma_{u,v,C}$ is a path from u to v through $\mathcal{L}_{C_1 C_2}(\mathcal{MCC} \cdot \mathcal{P})^*$.
2. Among the edges of $\Gamma_{u,v,C}$, there is at most one edge which is incident to any virtual vertex.
3. There is at most one virtual vertex visited by $\Gamma_{u,v,C}$.
4. If u and v are vertices in the quantum color code (including all the η stabilizers), then $\Gamma_{u,v,C}$ does not visit any vertices in the quantum surface code.

The minimum weight path is chosen to be $\Gamma_{u,v,C}$, which is found by the subroutine 'MinWeightLegalPath' in Line 11 of Algorithm 1. Specifically, 'MinWeightLegalPath' returns the minimum weight path if one exists, and returns the placeholder symbol ⊥ if no path exists that satisfies the above conditions. In some embodiments, the subroutine 'MinWeightLegalPath' may be implemented by modifying Dijkstra's pathfinding algorithm to take into account the conditions above. Specifically, during the Dijkstra search, the virtual boundary vertices may be treated as having zero out-edges, and if u and v are quantum color code vertices as defined above, then all edges to quantum surface code vertices are ignored.

A set of qubits in the quantum color code is then recovered through the enablement of colored pairings $M_C$, $\{\Gamma_{u,v,C}:(u, v)\in M_C\}$, which then may be added to the partial correction $\varepsilon'_{P'}$. Specifically, a subroutine 'Lift' is defined, which is applied at some of the vertices visited by the pairing paths. The Lift subroutine has arguments Lift(u, Γ). Here, u is a real (non-virtual) vertex of the graph $\mathcal{L}_{C_1 C_2}(\mathcal{MCC} \cdot \mathcal{P})^*$ and Γ is a path through (i.e. a subset of edges of) $\mathcal{L}_{C_1 C_2}(\mathcal{MCC} \cdot \mathcal{P})^*$. The Lift subroutine returns a set of qubits as follows: If u is a real vertex of the quantum surface code, then the 'Lift' subroutine returns the empty set. Otherwise u is vertex of the quantum color code and Lift(u, Γ) returns a set of face-qubits to add to $\varepsilon_{P'}$. More specifically, let $\Gamma|_u$ denote the set of edges contained in Γ which are incident to the vertex u. Then, $$\partial_{2Lift}(u,\Gamma) = \Gamma|_u,$$

in which $\partial_2$ denotes the one-boundary as described above. Note, however, that the behavior of the 'Lift' subroutine has not been yet defined for virtual boundary vertices $V_C^{(MC,P)}$. It must be taken care to never apply the 'Lift' subroutine to any such virtual boundary vertices decoding Algorithm 1, and so this is not an issue. (Note also that Γ has been used above as a placeholder for a general subset of edges through the graph $\mathcal{L}(\mathcal{MCC} \cdot \mathcal{P})^*$, and that Γ is not to be confused with the specific symbol $\Gamma_{u,v,C}$, which specifically denotes the minimum-weight path connecting u and v as described above.) Furthermore, it is impossible to correctly 'Lift' a vertex u with the path $\Gamma=\Gamma_{u,v,C}$, as for this path there would be no subset of face qubits such that $\partial_{2Lift}(u, \Gamma)=\Gamma|_u$ is satisfied. Therefore, it is ensured through the construction of Algorithm 1 that the 'Lift' subroutine is always used in such a way that it has a valid output satisfying $\partial_{2Lift}(u,\Gamma)=\Gamma|_u$.

'Lift' is applied on Line 27 and Line 32 of Algorithm 1 as follows:

$$\varepsilon'_{P'} \leftarrow \varepsilon'_{P'} \otimes \text{Lift}(u,\Gamma).$$

Above, the parity symbol ⊗ denotes the symmetric difference of the two sets $\varepsilon'_{P'}$ and Lift(u, Γ). That is, the partial correction is updated to be the set of qubits which are contained in exactly one of $\varepsilon'_{P'}$ or Lift(u, Γ).

Furthermore, 'Lifting' at virtual boundary vertices must be avoided because it decreases the effective distance of the decoder. To avoid lifting at virtual boundary vertices, the paths which visit the dark gray virtual stabilizer $v_D^{(MC,P)}$ are pre-processed. This pre-processing step takes place in Line 20 through Line 30 of Algorithm 1. To explain this pre-processing step, it is helpful to first describe the notion of a boundary-connected component (BCC). These BCCs are sequences of colored pairing paths which begin on the dark gray virtual stabilizer $v_D^{(MC,P)}$. Specifically, a BCC $\theta=(\{v_i\}, \{\chi_i\})$ of length $\ell$ is a sequence of vertices $v_i \in \mathcal{L}^{(\mathcal{MCC} \cdot \mathcal{P})*}$ and colors $\chi_i \in \{L, D, M\}$:

$$(v_1, v_2, v_3, \ldots, v\ell_{-1}, v\ell)(\chi_1, \ldots, \chi\ell_{-1})$$

for which
1. $v_1 = v_D^{(MC,P)}$
2. $v\ell = v_C^{(MC,P)} \in \{v_L^{(MC,P)}, v_D^{(MC,P)}, v_M^{(MC,P)}\}$ (including possibly $v_C^{(MC,P)} = v_D^{(MC,P)}$)
3. For each $i \in 1, \ldots, \ell-1$, it is defined that $(v_i, v_{i+1}) \in M_{\chi_i}$.
4. All of the $\ell-2$ pairs $(v_i, \chi_{i-1}), (v_i, \chi_i)$ for $i \in 2, \ldots, \ell-1$ are distinct.

Additionally, the pairs $(v_i, \chi_i)$ are unique across the BCCs. That is, if $\theta' = (\{v'_i\}, \{\chi'_i\})$ is any other BCC of length $\ell'$, and $i \in 2, \ldots, \ell-1$ and $j \in 2, \ldots, \ell'-1$, then $\{(v_i, \chi_i), (v_i, \chi_{i-1})\} \cap \{(v'_j, \chi'_j), (v'_j, \chi'_{j-1})\} = \emptyset$. The BCCs are obtained by doing a depth-first search starting from $v_D^{(MC,P)}$ through the colored multigraph with edges given by $M_L \cup M_D \cup M_M$. In this multigraph, each edge in $M_C$ is given color C. During the depth-first search starting from $v_D^{(MC,P)}$, each edge of color C is removed from the appropriate matching set $M_C$ as soon as it is crossed by the search. The depth-first search is halted when a virtual vertex $v_C^{(MC,P)}$ is reached. This is then set as the final vertex $v\ell = v_C^{(MC,P)}$ of the BCC. Following this implementation, the BCCs satisfy the above properties.

This process is not iterated over each BCC $\theta = (\{v_i\}, \{\chi_i\})$ in Line 20 through Line 30 of Algorithm 1. In Line 21 of Algorithm 1, the path (that is, the set of edges) along the minimum weight paths between subsequent $v_i$ is declared. That is, $$\Gamma_\theta = \cup_{i=1}^{\ell-1} \Gamma_{v_i, v_{i+1}, \chi_i}.$$

Then $\theta$ is assigned a color denoted by $\text{color}(\theta) \in \{L, M\}$ (Line 22 of Algorithm 1). This is done so that $\Gamma_\theta$ never visits the virtual vertex $v_{\text{color}(\theta)}^{(MC,P)}$. The Lift subroutine is then applied at each vertex visited by $\Gamma_\theta$ with color equal to color($\theta$). Recall that by definition, the 'Lift' subroutine returns the empty set when passed a surface code vertex. However, if the color of the BCC is set to light gray and its path $\Gamma_\theta$ crosses between the color and surface code, then some variant of the lift subroutine must be done to find an appropriate correction in the vicinity of these light gray surface code vertices. This is achieved by the subroutine SCLightGrayLift($\Gamma_\theta$). An example of applying 'SCLightGrayLift' has been described in FIGS. 12A-12C. Formally, the 'SCLightGrayLift' subroutine finds the ordered sequence of edges $$e_1, e_2, \ldots, e_{2m-1}, e_{2m} \in \Gamma_\theta,$$

which are incident to both surface code and color code stabilizer, and are ordered by increasing vertical position in the 2D layout. There must be an even number of such edges, since by construction the path $\Gamma_\theta$ must connect between $v_D^{(MC,P)}$ and $v_M^{(MC,P)}$ so $\Gamma_\theta$ must move from the quantum color code to the quantum surface code an even number of times. Now for two such crossing edges $(e_i, e_{i+1})$, let SandwichedQubits($e_i, e_{i+1}$) denote the set of qubits which line between $e_i$ and $e_{i+1}$, and are contained in the intersection of the quantum color code X-stabilizers and the $\zeta$-type X-stabilizers of the merged surface-color quantum code. Then SCLightGrayLift($\Gamma_\theta$) returns the union of these sandwiched qubits across all the pairs:

$$SCLightGrayLife(\Gamma_\theta) = \bigcup_{i=1}^{m} \text{Sandwich Qubits } (e_{2i-1}, e_{2i}).$$

After applying the appropriate 'Lift' subroutine procedure (Line 27 of Algorithm 1) and 'SCLightGrayLift' subroutine procedure (Line 29 of Algorithm 1) as appropriate, the BCC paths $\Gamma_\theta$ may be removed from the combined pairing paths (Line 30 of Algorithm 1). After finishing this for all the BCCs $\theta$, the pre-processing step is complete.

By carefully processing the BCCs as described above and updating the partial correction $\varepsilon'_{P'}$ with lifts, lifting at $v_D(MC,P)$ or any other virtual boundary vertex may be avoided, and all of the paths to $v_D^{(MC,P)}$ may be removed from the pairing paths (due to Line 30 of Algorithm 1). The final step of the quantum color code stage is to iterate through the remaining pairing paths in Line 32 of Algorithm 1, applying the aforementioned lift operation to all of the dark gray vertices visited by the paths. Since all paths to $v_D^{(MC,P)}$ have been removed in the pre-processing step, 'Lift' is not applied at any virtual stabilizers in this final step.

After the quantum color code stage is concluded on Line 32 of Algorithm 1, the quantum surface code stage is run on Line 33 through Line 34 of Algorithm 1. Firstly, the set of marked vertices is update to $A = S_P(\varepsilon'_{P}, \varepsilon_{P'})$ based on the partial P'-type correction produced by the previous stage (Line 33 of Algorithm 1). A set of qubits is then obtained, SurfaceCodeCorrection(A), using a surface code decoder on Line 34 of Algorithm 1. That is, $V_{SC}$ is set to $V_{SC} = A \cup \{v_R^{(MC,P)}, v_B^{(MC,P)}\}$, and for each pair $(u, v) \in V_{SC} \times V_{SC}$ such that $u \neq v$, $\Gamma_{u,v}$ is set to be the minimum weight path which joins u and v through $\mathcal{L}^{(\mathcal{MCC} \cdot \mathcal{P})*}|_{SC \cup \{\eta_i\}}$ (or else $\perp$ if none exists), and set $w(u, v) = \Sigma_{e \in \Gamma_{u,v}} wt(e)$. Then, $G_{SC}$ is defined as a weighted graph such that $G_{SC} = (V_{SC}, E_{SC}, w)$. A minimum weight A-perfect matching $M_{SC}$ of the graph $G_{SC}$ is then found, and for each $(u, v) \in M_{SC}$, $\varepsilon'_P \leftarrow \varepsilon'_P \otimes \Gamma_{u,v}$. This concludes the quantum surface code stage. After this point there are no more marked vertices and $\varepsilon'_{P'}$ is completed.

By avoiding all lifts at virtual boundary vertices, the merged surface-color quantum code decoder described by Algorithm 1 and Algorithm 2 obtains excellent performance under a code capacity depolarizing noise model. More specifically, this given embodiment of a merged surface-color quantum code decoder is able to maintain the full effective X distance $d_X$ of a given quantum surface code decoder, and the combined effective Z distance $$\left(1 + \frac{2}{3}\right) d_Z$$

of a given quantum surface code decoder along with the given quantum color code decoder.

Embodiments of the present disclosure may be described in view of the following clauses:
  1. A method, comprising:
     encoding a Clifford circuit design problem as a Satisfiability Modulo Theories (SMT) decision problem, wherein said encoding the Clifford circuit design problem as the SMT decision problem comprises:

determining one or more symbolic bit matrix representations for one or more elements of the Clifford circuit design problem;
determining one or more constraint equations for modeling one or more Clifford circuits; and
constructing an encoded SMT protocol for the SMT decision problem, based at least in part on:
the determined one or more symbolic bit matrix representations; and
the determined one or more constraint equations;
providing the encoded SMT protocol to an SMT solver;
returning one or more Clifford circuit solutions found by the SMT solver; and
implementing the one or more Clifford circuit solutions on a quantum hardware device.
2. The method of clause 1, wherein the Clifford circuit design problem is to implement a quantum algorithm.
3. The method of clause 1, wherein the Clifford circuit design problem is to implement a quantum error-correcting code.
4. The method of clause 1, wherein the one or more elements of the Clifford circuit design problem of which respective symbolic bit matrix representations are determined comprise:
a plurality of qubits; and
a plurality of gates acting on one or more respective qubits of the plurality of qubits,
wherein the plurality of qubits and the plurality of gates are used to implement a quantum error-correcting code to be executed within a given number of time steps.
5. The method of clause 4, wherein the Clifford circuit design problem comprises gate connectivity information for the layout of the plurality of qubits in the quantum error-correcting code.
6. The method of clause 4, wherein the constraint equations for modeling the one or more Clifford circuits comprise a constraint wherein the constraint is that respective qubits of the plurality of qubits are assigned one respective functionality from a plurality of functionalities, the functionalities comprising two or more of: a data qubit, an ancilla qubit, a root ancilla qubit, or a flag qubit.
7. The method of clause 4, wherein the constraint equations for modeling the one or more Clifford circuits comprise a further constraint wherein the further constraint is that at most one gate is assigned to act on a given respective qubit of the plurality of qubits at any given time step of the number of time steps.
8. The method of clause 4, wherein the Clifford circuit design problem is a Clifford circuit design problem for determining one or more Hadamard ($|H\rangle$-type) magic states implemented via the one or more Clifford circuits in the quantum error-correcting code, wherein the quantum error-correcting code comprises a quantum color code.
9. The method of clause 8, wherein the one or more Clifford circuits that implement one or more Hadamard ($|H\rangle$-type) magic states are prepared via measuring a logical Hadamard operator of the quantum color code and performing at least one round of X or Z stabilizer measurements for error detection.
10. The method of clause 9, wherein the constraint equations for modeling the one or more Clifford circuits comprise a further constraint wherein:
respective qubits of the plurality of qubits are assigned one respective functionality from a plurality of functionalities, the functionalities comprising a data qubit, an ancilla qubit, a root ancilla qubit, and a flag qubit; and
at most one qubit of the plurality of qubits is assigned the functionality of root ancilla qubit.
11. The method of clause 1, wherein the SMT protocol is further configured to exclude candidate Clifford circuit solutions that do not include a v-flag, wherein a non-trivial measurement of the v-flag indicates a presence of a number of errors greater than a given threshold.
12. The method of clause 1, wherein said returning the one or more Clifford circuit solutions further comprises:
verifying that one or more Clifford circuit solutions found by the SMT solver do not satisfy a v-flag property; and
wherein the method further comprises:
in response to the one or more Clifford circuit solutions found by the SMT solver not satisfying the v-flag property, adding one or more additional constraint equations to the Clifford circuit design problem;
constructing an updated encoded SMT protocol for an updated version of the Clifford circuit design problem that includes the added one or more additional constraint equations; and
providing the updated encoded SMT protocol to the SMT solver,
wherein the method comprises iteratively performing said verifying, said adding one or more additional constraint equations, and said repeating the constructing of respective updated encoded SMT protocols and said providing of the respective updated encoded SMT protocols to the SMT solver until one or more Clifford circuit solutions are returned that satisfy the v-flag property.
13. The method of clause 1, wherein the one or more Clifford circuit solutions implemented on the quantum hardware device are implemented on a quantum color code, and said quantum color code is merged with a quantum surface code on the quantum hardware device.
14. The method of clause 13, wherein the quantum color code merged with the quantum surface code is decoded using a decoder for correcting one or more errors for a merged surface and color quantum code.
15. A system, comprising:
one or more computing devices configured to:
encode a Clifford circuit design problem as a Satisfiability Modulo Theories (SMT) decision problem, wherein said encode the Clifford circuit design problem as the SMT decision problem comprises:
determining one or more symbolic bit matrix representations for one or more elements of the Clifford circuit design problem;
determining one or more constraint equations for modeling one or more Clifford circuits; and
constructing an encoded SMT protocol for the SMT decision problem, based at least in part on:
the determined one or more symbolic bit matrix representations; and
the determined constraint equations for modeling the one or more Clifford circuits.
16. The system of clause 15, wherein the one or more elements of the Clifford circuit design problem of which respective symbolic bit matrix representations are determined comprise:
a plurality of qubits; and
a plurality of gates acting on one or more respective qubits of the plurality of qubits, wherein the plurality of qubits and the plurality of gates are used to implement a quantum error-correcting code to be executed within a given number of time steps.

17. The system of clause 16, wherein the SMT protocol is further configured to exclude candidate Clifford circuit solutions that do not include a v-flag, wherein a non-trivial measurement of the v-flag indicates a presence of a number of errors greater than a given threshold.

18. The system of clause 15, further comprising:
the one or more computing devices further configured to:
provide the encoded SMT protocol to an SMT solver; and
return one or more Clifford circuit solutions found by the SMT solver; and one or more quantum hardware devices configured to:
implement the one or more Clifford circuit solutions.

19. A non-transitory, computer-readable, medium storing program instructions that, when executed on or across one or more processors, cause the one or more processors to:
encode a Clifford circuit design problem as a decision problem, wherein said encode the Clifford circuit design problem as the decision problem comprises:
determining one or more symbolic bit matrix representations for one or more elements of the Clifford circuit design problem;
determining one or more constraint equations for modeling one or more Clifford circuits; and
constructing an encoded protocol for the decision problem, based at least in part on:
the determined one or more symbolic bit matrix representations; and the determined one or more constraint equations.

20. The non-transitory, computer-readable medium of clause 19, wherein to encode the Clifford circuit design problem as the decision problem, the program instructions further cause the one or more processors to:
implement a quantum error-correcting code comprising a plurality of qubits and a plurality of gates acting on one or more respective qubits of the plurality of qubits to be executed within a given number of time steps.

Illustrative Computer System

Figure 16:
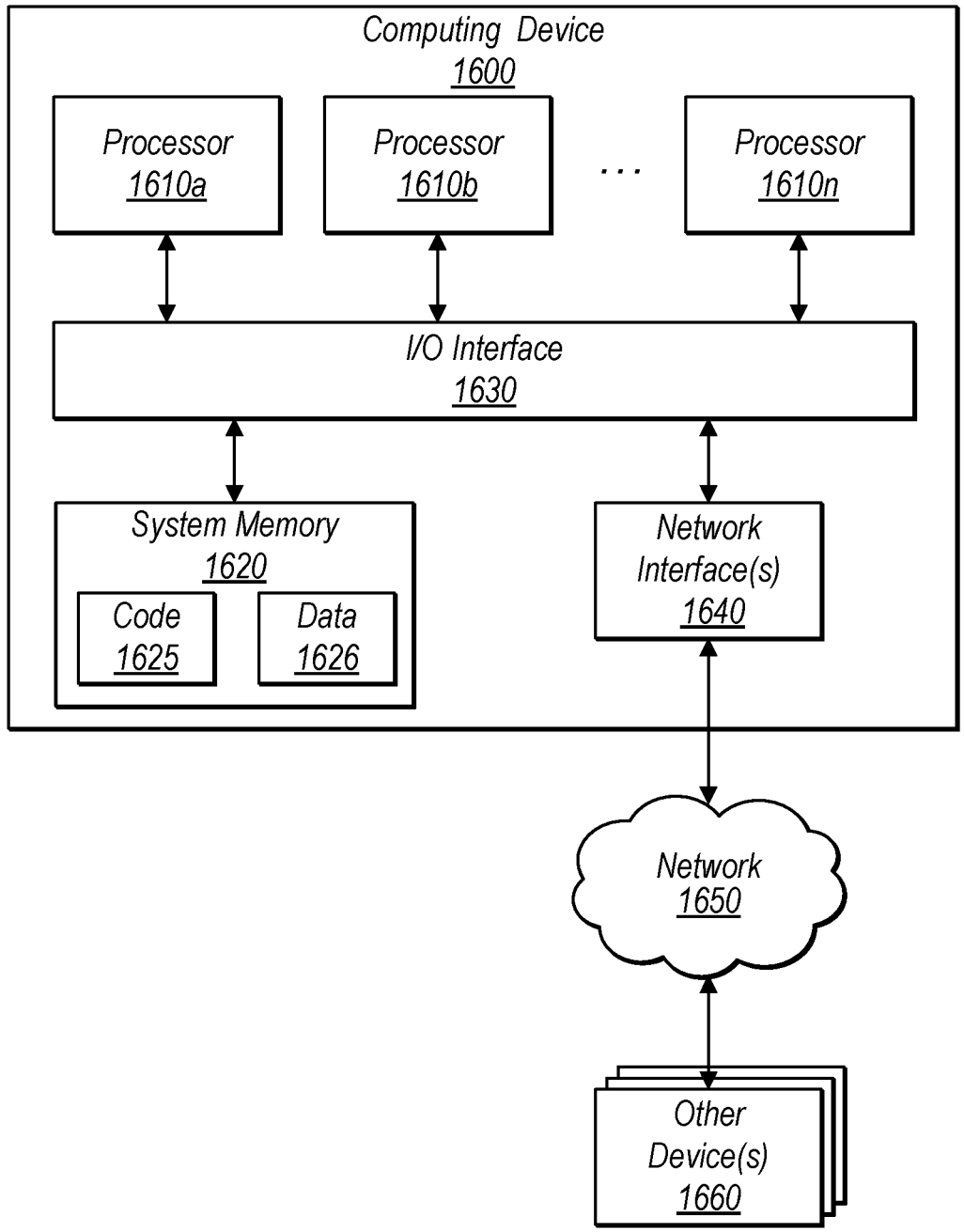
FIG. 16 is a block diagram illustrating an example computing device that may be used in at least some embodiments.

FIG. 16 is a block diagram illustrating an example computing device that may be used in at least some embodiments. In some embodiments, the computing device 1600 shown in FIG. 16 may be used to implement any of the techniques described above in FIGS. 1A-15.

FIG. 16 illustrates such a general-purpose computing device 1600 as may be used in any of the embodiments described herein. In the illustrated embodiment, computing device 1600 includes one or more processors 1610 coupled to a system memory 1620 (which may comprise both non-volatile and volatile memory modules) via an input/output (I/O) interface 1630. Computing device 1600 further includes a network interface 1640 coupled to I/O interface 1630. Classical computing functions such as encoding and decoding Pauli measurements, controlling a quantum hardware device, and other non-quantum operations as described herein may be performed on a classical computer system, such as computing device 1600.

In various embodiments, computing device 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA. In some implementations, graphics processing units (GPUs) may be used instead of, or in addition to, conventional processors.

System memory 1620 may be configured to store instructions and data accessible by processor(s) 1610. In at least some embodiments, the system memory 1620 may comprise both volatile and non-volatile portions; in other embodiments, only volatile memory may be used. In various embodiments, the volatile portion of system memory 1620 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magneto resistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1620 as code 1625 and data 1626.

In some embodiments, I/O interface 1630 may be configured to coordinate I/O traffic between processor 1610, system memory 1620, and any peripheral devices in the device, including network interface 1640 or other peripheral interfaces such as various types of persistent and/or volatile storage devices. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computing device 1600 and other devices 1660 attached to a network or networks 1650, such as other computer systems or devices. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks such as Fibre Channel SANs, or via any other suitable type of network and/or protocol.

In some embodiments, system memory 1620 may represent one embodiment of a computer-accessible medium configured to store at least a subset of program instructions and data used for implementing the methods and apparatus discussed in the context of FIG. 1A through FIG. 15. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1600 via I/O interface 1630. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1600 as system memory 1620 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1640. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures above and described herein represent exemplary embodiments of methods. The methods may be implemented in software, hardware, or a combination thereof. The order of method may be changed, and various elements may be added, reordered, combined, omitted, modified, etc.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more quantum hardware devices configured to:
implement, via lattice surgery, a merged surface and color quantum code comprising a plurality of qubits and a plurality of stabilizers; and
one or more computing devices configured to:
receive one or more stabilizer measurements of the merged surface and color quantum code;
identify, for a syndrome graph of the respective stabilizer measurements, one or more locations of non-trivial stabilizer measurement outcomes, wherein at least one location is within a quantum surface code portion of the merged surface and color quantum code;
map, via the one or more locations, a connectivity path, whose origin is at a first virtual stabilizer of the merged surface and color quantum code and whose terminus is at a second virtual stabilizer of the merged surface and color quantum code; and
perform an error correction onto one or more selected qubits of a given number of qubits located at the border of the quantum surface code portion and a quantum color code portion of the merged surface and color quantum code, the selected qubits comprising qubits located at the border and between the origin and the terminus of the connectivity path.

2. The system of claim 1, wherein the plurality of stabilizers comprises X stabilizers and, wherein for said perform an error correction, the error correction comprises a Z error correction.

3. The system of claim 1, wherein the plurality of stabilizers comprises Z stabilizers and, wherein for said perform an error correction, the error correction comprises a X error correction.

4. The system of claim 1, wherein the one or more computing devices are further configured to:
perform another error correction onto one or more selected qubits of a given number of qubits located within the quantum surface code portion of the merged surface and color quantum code; and
perform an additional error correction onto one or more selected qubits of a given number of qubits located within the quantum color code portion of the merged surface and color quantum code.

5. The system of claim 1, wherein the one or more computing devices are further configured to:
encode a Clifford circuit design problem as a Satisfiability Modulo Theories (SMT) decision problem, wherein said Clifford circuit design problem comprises constraints for encoding a magic state in a quantum color code;
construct an encoded SMT protocol for the SMT decision problem;
provide the encoded SMT protocol to an SMT solver; and
receive a Clifford circuit design for a quantum surface code and the quantum color code to be implemented on the one or more quantum hardware devices and to be merged via the lattice surgery to form the merged surface and color quantum code.

6. A method, comprising:
merging a quantum color code and a quantum surface code into a merged surface-color code comprising a plurality of qubits and a plurality of stabilizers; and decoding the merged surface-color code via one or more stabilizer measurements of the merged surface-color code.

7. The method of claim 6, wherein said merging further comprises:
preparing an encoded magic state in the quantum color code using a bottom-up procedure without magic state distillation.

8. The method of claim 7, further comprising:
teleporting the encoded magic state from the quantum color code to the quantum surface code, wherein said teleporting comprises said merging the quantum color code and the quantum surface code.

9. The method of claim 6, wherein said decoding further comprises:
identifying, for a syndrome graph of the one or more stabilizer measurements of the merged surface-color code, one or more locations of non-trivial stabilizer measurement outcomes, wherein at least one location is within a quantum surface code portion of the merged surface-color code.

10. The method of claim 9, wherein said decoding further comprises:
mapping, via the one or more locations, a connectivity path, whose origin is at a first virtual stabilizer of the merged surface-color code and whose terminus is at a second virtual stabilizer of the merged surface-color code.

11. The method of claim 10, wherein said decoding further comprises:
performing an error correction onto selected qubits of a given number of qubits located at a border of the quantum surface code portion and a quantum color code portion of the merged surface-color code, the selected qubits comprising qubits located at the border and between the origin and the terminus of the connectivity path.

12. The method of claim 11, further comprising:
wherein for said identifying, the one or more stabilizer measurements comprise X stabilizer measurements; and
wherein for said performing an error correction, said error correction comprises a Z error correction.

13. The method of claim 11, further comprising:
wherein for said identifying, the one or more stabilizer measurements comprise Z stabilizer measurements; and
wherein for said performing an error correction, said error correction comprises an X error correction.

14. The method of claim 6, wherein said decoding further comprises:
performing another error correction onto one or more selected qubits of a given number of qubits located within a quantum surface code portion of the merged surface-color code.

15. The method of claim 6, wherein said decoding further comprises:
performing an additional error correction onto one or more selected qubits of a given number of qubits located within a quantum color code portion of the merged surface-color code.

16. A non-transitory, computer-readable, medium storing program instructions that, when executed on or across one or more processors, cause the one or more processors to:
receive one or more stabilizer measurements of a merged surface and color quantum code comprising a plurality of qubits and a plurality of stabilizers; and
decode the one or more stabilizer measurements of the merged surface and color quantum code, wherein to decode the one or more stabilizer measurements, the program instructions further cause the one or more processors to:
perform an error correction onto one or more selected qubits of a given number of qubits located at a border of a quantum surface code portion and a quantum color code portion of the merged surface and color quantum code;
perform another error correction onto one or more selected qubits of a given number of qubits located within the quantum surface code portion; and
perform an additional error correction onto one or more selected qubits of a given number of qubits located within the quantum color code portion.

17. The non-transitory, computer-readable medium of claim 16, wherein the one or more stabilizer measurements comprise X stabilizer measurements and, wherein for said perform an error correction, the error correction comprises a Z error correction.

18. The non-transitory, computer-readable medium of claim 16, wherein the one or more stabilizer measurements comprise Z stabilizer measurements and, wherein for said perform an error correction, the error correction comprises a X error correction.

19. The non-transitory, computer-readable medium of claim 16, wherein to perform the error correction, the program instructions further cause the one or more processors to:
identify, for a syndrome graph of the one or more stabilizer measurements of the merged surface and color code, one or more locations of non-trivial stabilizer measurement outcomes, wherein at least one location is within the quantum surface code portion.

20. The non-transitory, computer-readable medium of claim 19, wherein to perform the error correction, the program instructions further cause the one or more processors to:
map, via the one or more locations, a connectivity path, whose origin is at a first virtual stabilizer of the merged surface and color quantum code and whose terminus is at a second virtual stabilizer of the merged surface color quantum code; and
perform the error correction onto the one or more selected qubits located at the border comprising qubits located at the border and between origin and the terminus of the connectivity path.

* * * * *